United States Patent
Takahashi

(10) Patent No.: US 7,185,283 B1
(45) Date of Patent: Feb. 27, 2007

(54) SCREEN CONTROL METHOD

(75) Inventor: Yasushi Takahashi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/914,104

(22) PCT Filed: Feb. 24, 2000

(86) PCT No.: PCT/JP00/01065

§ 371 (c)(1),
(2), (4) Date: Jan. 25, 2002

(87) PCT Pub. No.: WO00/51346

PCT Pub. Date: Aug. 31, 2000

(30) Foreign Application Priority Data

Feb. 24, 1999 (JP) ................................ 11/089505

(51) Int. Cl.
*G06F 3/00* (2006.01)
(52) U.S. Cl. ...................... 715/723; 715/721; 715/719; 715/725; 725/37; 725/41
(58) Field of Classification Search ................ 715/721, 715/723, 719, 725; 725/41, 37
See application file for complete search history.

(56) References Cited

U.S. PATENT DOCUMENTS 5,035,624 A * 7/1991 Hosoya et al. ............... 434/309
5,982,364 A * 11/1999 Beckwith .................... 715/723
6,353,632 B1 * 3/2002 Moeller et al. ......... 375/240.01
6,366,296 B1 * 4/2002 Boreczky et al. ........... 715/719

FOREIGN PATENT DOCUMENTS

| EP | 810794   | 12/1997 |
|----|----------|---------|
| JP | 9-139913 | 5/1997  |
| JP | 9-181910 | 7/1997  |
| JP | 9-298684 | 11/1997 |
| JP | 9-322111 | 12/1997 |

(Continued)

OTHER PUBLICATIONS

Zhong, Di et al. "Clustering Methods for Video Browsing and Annotation", 1997, Institute of Science pp. 1-9.*

*Primary Examiner*—Kristine Kincaid
*Assistant Examiner*—Ryan Pitaro
(74) *Attorney, Agent, or Firm*—Frommer Lawrence & Haug LLP; William S. Frommer; Thomas F. Presson

(57) ABSTRACT

A feature video image vdt and a thumbnail picture sdt read from a receiving section C10 are recorded onto a mass storage medium M1, and meta information mdt is recorded into a high-speed storage unit C12. Semantic browser means C1 extracts a partial video image from the feature video image on the basis of the meta information mdt so as to organize a preview video image, and also displays a semantic graph and a current position on the screen on the basis of the meta information and replays the feature video image or the preview video image from that position when there is a position designation input. Furthermore, when there is a browsing instruction input, the semantic browser means C1 carries out browsing between the feature video image and the preview video image, or browsing within the feature video image or within the preview video image. An accounting section C18 carries out accounting processing.

2 Claims, 21 Drawing Sheets

FOREIGN PATENT DOCUMENTS

| | | |
|---|---|---|
| JP | 10-23362 | 1/1998 |
| JP | 10-98675 | 4/1998 |
| JP | 10-108071 | 4/1998 |
| JP | 10-269704 | 10/1998 |
| JP | 11-261946 | 9/1999 |
| JP | 2000-69420 | 3/2000 |
| JP | 2000-125253 | 4/2000 |

* cited by examiner

FIG.20A

FEATURE VIDEO IMAGE

| a | b | c | d | e | f | g |

SUMMARY VIDEO IMAGE

| a | e | g |

HIGHLIGHT SUMMARY OF ACTOR A

HIGHLIGHT SUMMARY OF ACTOR B

HIGHLIGHT SUMMARY OF ACTOR C

SCREEN CONTROL METHOD

TECHNICAL FIELD

This invention relates to a screen control method, a screen control device, a video image replaying method, a video image replaying device, a video image information recording method, a video image information recording device, and a computer-readable recording medium. Particularly, it relates to a screen control method, a screen control device, a video image replaying method, a video image replaying device, a video image information recording method, a video image information recording device, and a computer-readable recording medium which include a semantic browsing function,

BACKGROUND ART

Video image programs having stories like movies, television dramas and documentary programs are provided as merchandise through broadcasting programs such as ground wave/satellite broadcast and CATV, through network systems such as the Internet, or through DVD and other package media. Viewers obtain desired ones of such video image programs by purchasing them. Such video image programs are referred to and handled as video image titles.

In viewing such a video image title having a story, viewing a preview before viewing the feature video image of the video image title is not only useful for understanding the contents but also provides an effective reference for determining whether to purchase the feature video image or not. Therefore, on some disc media for the current video image players and DVD players, a preview video image which is prepared in advance is readably recorded separately from a feature video image.

Also, some disc media for DVD is provided with a function to introduce a summary video image of the contents of each chapter and enable direct access to the start point of a designated chapter.

Moreover, it has recently become possible to store a plurality of video image titles in a home server as a library. It has been attempted to make available a browser having thumbnails of still images and motion picture images for title selection, as a system operating on a computer, and some of such browsers are provided.

However, in the structure where a preview view as a short video image prepared separately from a feature video image is recorded on a disc medium as described above, scenes of the preview video image and scenes of the feature video image do not correspond to each other and there is no function to enable a viewer to immediately shift to a position in the feature video image corresponding to a scene found in the preview video image and to view the feature video image at that position.

Conventionally, the images of the preview video image attached to various media are not necessarily included in the feature video image, and therefore, even when the viewer finds a video image portion of interest in the preview video image, the viewer cannot replay the feature video image at the corresponding position.

Even the function to introduce a summary video image of the contents of each chapter and enable direct access to the start point of a designated chapter, provided on the above-described disc media, cannot meet the user's demand to view the feature video image from a desired position while grasping the flow of the entire feature video image.

Meanwhile, the browser having thumbnail pictures for selecting a plurality of video image titles does not have a structure for displaying the flow and configuration of the story and therefore is not necessarily suitable for providing sufficient knowledge about future development of the currently displayed video image or still picture.

Moreover, in general, conventional receiving/replaying devices such as television receivers, video image players and DVD players neither have the structure for displaying the flow and development of the story nor include the function to enable selection of an arbitrary replaying position.

DISCLOSURE OF THE INVENTION

In view of the foregoing status of the art, it is an object of the present invention to provide a screen control method, a screen control device, a video image replaying method, a video image replaying device, a video image information recording method, a video image information recording device, and a computer-readable recording medium which display the flow and development of an entire story and enable selection of an arbitrary replaying position, and which also enable free transition between a feature video image and a preview video image.

In order to solve the problems of the conventional technique as described above, a screen control method according to the present invention, applied to a continuous video image display phase for displaying on a screen a feature video image consisting of continuous video images and an extracted video image display phase for sequentially displaying on the screen a plurality of sets of extracted video images obtained by extracting predetermined parts of the feature video image, includes the steps of: displaying a first screen having at least a first video image display area, a first video image transition display area and a first switch input area, in the extracted video image display phase; displaying one of the plurality of sets of extracted video images replayed on the basis of a current video image recording position, in the first video image display area; displaying, in the first video image transition display area, a video image transition graph showing the transition of the video image recording position of the feature video image, a mark superimposed on the graph at the video image recording position corresponding to each of the extracted video images, and a cursor which constantly updates with the lapse of time the current video image recording position in the extracted video image currently displayed in the first video image display area and which enables shift of the current video image recording position to an arbitrary video image recording position in an arbitrary one of the extracted video images; displaying in the first switch input area a first button which enables input of an instruction to shift from the first screen to a second screen displayed in the continuous video image display phase while cutting out and holding the current video image recording position; displaying a second screen having at least a second video image display area, a second video image transition display area and a second switch input area, in the continuous video image display phase; displaying the feature video image replayed on the basis of the current video image recording position, in the second video image display area; displaying, in the second video image transition display area, a video image transition graph showing the transition of the video image recording position of the feature video image, and a cursor which constantly updates with the lapse of time the current video image recording position in the feature video image currently displayed in the second video image display area and which enables shift of the current video image recording position to an arbitrary video image recording position in the feature video image; displaying in the second switch input area a second button which enables input of an instruction to shift from the second screen to the first screen displayed in the extracted video image display phase while cutting out and holding the current video image recording position; and shifting between the extracted video image display phase and the continuous video image display phase on the basis of each of the instructions inputted during the display of the first button or the second button, so as to display either the first screen or the second screen.

A video image replaying method according to the present invention is capable of replaying a feature video image constituted by connecting at least a plurality of shots or scenes in a predetermined order, where a shot is a basic unit of a dynamic image and a scene is a unit of a dynamic image containing at least one shot. The method comprises the steps of: on the basis of meta information including recording position information of the shots or the scenes constituting the feature video image and information specifying extracted shots or extracted scenes extracted from the shots or scenes at a threshold value setting a disclosure level; sequentially replaying the corresponding extracted shots or extracted scenes in the predetermined order.

A video image replaying method according to the present invention is capable of replaying a feature video image constituted by connecting at least a plurality of shots or scenes in a predetermined order, where a shot is a basic unit of a motion picture image and a scene is a unit of a motion picture image containing at least one shot. The method includes the steps of: on the basis of meta information including recording position information of the shots or the scenes constituting the feature video image and an index value preset for each of the shots or for each of the scenes; determining the scene or the shot having the index value reaching a threshold value setting a disclosure level as an extracted shot or an extracted scene, and sequentially replaying the corresponding extracted shots or extracted scenes in the predetermined order.

A video image replaying method according to the present invention is capable of replaying a feature video image constituted by connecting at least a plurality of shots or scenes in a predetermined order, where a shot is a basic unit of a motion picture image and a scene is a unit of a motion picture image containing at least one shot. The method includes the steps of: on the basis of meta information including recording position information of the shots or the scenes constituting the feature video image and an index value preset for each of the shots or for each of the scenes; displaying on a screen a graph of a value produced by sequentially integrating the index values of the respective shots or the respective scenes in the predetermined order; and when an arbitrary position on the graph is designated, sequentially replaying the feature video image after the designated position.

A video image replaying method according to the present invention is capable of replaying a feature video image constituted by connecting at least a plurality of shots or scenes in a predetermined order, where a shot is a basic unit of a motion picture image and a scene is a unit of a motion picture image containing at least one shot. The method includes the steps of: on the basis of meta information including recording position information of the shots or the scenes constituting the feature video image, an index value preset for each of the shots or for each of the scenes, and information specifying an extracted shot or an extracted scene extracted from the shots or the scenes in accordance with a predetermined condition; displaying on a screen a graph of a value produced by sequentially integrating the index values of the respective shots or the respective scenes in the predetermined order; displaying marks indicating the extracted shot or the extracted scene on the graph; and when one of the displayed marks is designated, sequentially replaying the portion corresponding to the extracted shot or the extracted scene at and after the mark portion from the feature video image.

A video image replaying method according to the present invention is capable of replaying a feature video image constituted by connecting at least a plurality of shots or scenes in a predetermined order, where a shot is a basic unit of a motion picture image and a scene is a unit of a motion picture image containing at least one shot. The method includes the steps of: on the basis of meta information including recording position information of the shots or the scenes constituting the feature video image and an index value preset for each of the shots or for each of the scenes, determining the scene or the shot having the index value reaching a designated threshold value as an extracted shot or an extracted scene; displaying on a screen a graph of a value produced by sequentially integrating the index values of the respective shots or the respective scenes in the predetermined order; displaying marks indicating the extracted shot or the extracted scene on the graph; and when one of the displayed marks is designated, sequentially replaying the portion corresponding to the extracted shot or the extracted scene at and after the mark portion from the feature video image.

A video image replaying method according to the present invention is capable of replaying a feature video image constituted by connecting at least a plurality of shots or scenes in a predetermined order, where a shot is a basic unit of a motion picture image and a scene is a unit of a motion picture image containing at least one shot. The method includes the steps of: on the basis of meta information including recording position information of the shots or the scenes constituting the feature video image, an index value preset for each of the shots or for each of the scenes, and information specifying an extracted shot or an extracted scene extracted from the shots or the scenes in accordance with a predetermined condition; displaying on a screen a graph of a value produced by sequentially integrating the index values of the respective shots or the respective scenes in the predetermined order; displaying marks indicating the extracted shot or the extracted scene on the graph; when an arbitrary position on the graph is designated and replay of the feature video image is instructed, replaying the feature video image after the corresponding position, and when replay of the extracted shot or the extracted scene is instructed during the replay of the feature video image, switching to replay of the extracted shot or the extracted scene after the current position; and when one of the marks indicating the extracted shot or the extracted scene on the graph is designated and replay of the extracted shot or the extracted scene is instructed, replaying the extracted shot or the extracted scene after the corresponding position, and when replay of the feature video image is instructed during the replay, switching to replay of the feature video image after the current position.

A video image replaying method according to the present invention is capable of replaying a feature video image constituted by connecting at least a plurality of shots or scenes in a predetermined order, where a shot is a basic unit of a motion picture image and a scene is a unit of a motion picture image containing at least one shot. The method includes the steps of: on the basis of meta information including recording position information of the shots or the scenes constituting the feature video image and an index value preset for each of the shots or for each of the scenes, determining the scene or the shot having the index value reaching a designated threshold value as an extracted shot or an extracted scene; displaying on a screen a graph of a value produced by sequentially integrating the index values of the respective shots or the respective scenes in the predetermined order; displaying marks indicating the extracted shot or the extracted scene on the graph; when an arbitrary position on the graph is designated and replay of the feature video image is instructed, replaying the feature video image after the corresponding position, and when replay of the extracted shot or the extracted scene is instructed during the replay of the feature video image, switching to replay of the extracted shot or the extracted scene after the current position; and when one of the marks indicating the extracted shot or the extracted scene on the graph is designated and replay of the extracted shot or the extracted scene is instructed, replaying the extracted shot or the extracted scene after the corresponding position, and when replay of the feature video image is instructed during the replay, switching to replay of the feature video image after the current position.

A screen control device according to the present invention, adapted for displaying a second screen in a continuous video image display phase for displaying a feature video image consisting of continuous video images as the second screen, and for displaying a first screen in an extracted video image display phase for sequentially displaying a plurality of sets of extracted video images obtained by extracting predetermined parts of the feature video image as the first screen, includes: means for displaying at least a first video image display area, a first video image transition display area and a first switch input area in the first screen; means for displaying one of the plurality of sets of extracted video images replayed on the basis of a current video image recording position, in the first video image display area; means for displaying, in the first video image transition display area, a video image transition graph showing the transition of the video image recording position of the feature video image and a mark superimposed on the graph at the video image recording position corresponding to each of the extracted video images; means for displaying a cursor which constantly updates with the lapse of time the current video image recording position in the extracted video image currently displayed in the first video image display area with the cursor superimposed on the video image transition graph and which enables shift of the current video image recording position to an arbitrary video image recording position in an arbitrary one of the extracted video images; means for displaying in the first switch input area a first button which enables input of an instruction to shift from the first screen to the second screen displayed in the continuous video image display phase while cutting out and holding the current video image recording position at the timing of the instruction; means for arranging at least a second video image display area, a second video image transition display area and a second switch input area in the second screen; means for displaying the feature video image replayed on the basis of the current video image recording position, in the second video image display area; means for displaying, in the second video image transition display area, a video image transition graph showing the transition of the video image recording position of the feature video image; means for displaying a cursor which constantly updates with the lapse of time the current video image recording position in the feature video image currently displayed in the second video image display area with the cursor superimposed on the video image transition graph and which enables shift of the current video image recording position to an arbitrary video image recording position in the feature video image; means for displaying in the second switch input area a second button which enables input of an instruction to shift from the second screen to the first screen displayed in the extracted video image display phase while cutting out and holding the current video image recording position at the timing of the instruction; and means for shifting between the extracted video image display phase and the continuous video image display phase on the basis of each of the instructions inputted during the display of the first button or the second button, so as to display either the first screen or the second screen.

A video image replaying device according to the present invention is capable of replaying a feature video image constituted by connecting at least a plurality of shots or scenes in a predetermined order, where a shot is a basic unit of a motion picture image and a scene is a unit of a motion picture image containing at least one shot. The device includes: means for, on the basis of meta information including recording position information of the shots or the scenes constituting the feature video image and information specifying an extracted shot or an extracted scene from the shots or the scenes at a threshold value setting disclosure level, replaying an extracted video image produced by connecting the corresponding extracted shots or extracted scenes in the predetermined order.

A video image replaying device according to the present invention is capable of replaying a feature video image constituted by connecting at least a plurality of shots or scenes in a predetermined order, where a shot is a basic unit of a motion picture image and a scene is a unit of a motion picture image containing at least one shot. The device includes: means for, on the basis of meta information including recording position information of the shots or the scenes constituting the feature video image and an index value preset for each of the shots or for each of the scenes, determining the shot or the scene having the index value reaching a threshold value setting a disclosure level as an extracted shot or an extracted scene; and means for replaying an extracted video image produced by connecting the corresponding extracted shots or extracted scenes in the predetermined order.

A video image replaying device according to the present invention is capable of replaying a feature video image constituted by connecting at least a plurality of shots or scenes in a predetermined order, where a shot is a basic unit of a motion picture image and a scene is a unit of a motion picture image containing at least one shot. The device includes: means for, on the basis of meta information including recording position information of the shots or the scenes constituting the feature video image and an index value preset for each of the shots or for each of the scenes, displaying on a screen a graph of a value produced by sequentially integrating the index values of the respective shots or the respective scenes in the predetermined order; and means for, when an arbitrary position on the graph is designated, sequentially replaying the feature video image after the designated position.

A video image replaying device according to the present invention is capable of replaying a feature video image constituted by connecting at least a plurality of shots or scenes in a predetermined order, where a shot is a basic unit of a motion picture image and a scene is a unit of a motion picture image containing at least one shot. The device includes: means for, on the basis of meta information including recording position information of the shots or the scenes constituting the feature video image, an index value preset for each of the shots or for each of the scenes, and information specifying an extracted shot or an extracted scene extracted from the shots or the scenes in accordance with a predetermined condition, displaying on a screen a graph of a value produced by sequentially integrating the index values of the respective shots or the respective scenes in the predetermined order; means for displaying marks indicating the extracted shot or the extracted scene on the graph; and means for, when one of the displayed marks is designated, sequentially replaying the portion corresponding to the extracted shot or the extracted scene at and after the mark portion from the feature video image.

A video image replaying device according to the present invention is capable of replaying a feature video image constituted by connecting at least a plurality of shots or scenes in a predetermined order, where a shot is a basic unit of a motion picture image and a scene is a unit of a motion picture image containing at least one shot. The device includes: means for, on the basis of meta information including recording position information of the shots or the scenes constituting the feature video image and an index value preset for each of the shots or for each of the scenes, determining the scene or the shot having the index value reaching a designated threshold value as an extracted shot or an extracted scene; means for displaying on a screen a graph of a value produced by sequentially integrating the index values of the respective shots or the respective scenes in the predetermined order; means for displaying marks indicating the extracted shot or the extracted scene on the graph; and means for, when one of the displayed marks is designated, sequentially replaying the portion corresponding to the extracted shot or the extracted scene at and after the mark portion from the feature video image.

A video image replaying device according to the present invention is capable of replaying a feature video image constituted by connecting at least a plurality of shots or scenes in a predetermined order, where a shot is a basic unit of a motion picture image and a scene is a unit of a motion picture image containing at least one shot. The device includes: means for, on the basis of meta information including recording position information of the shots or the scenes constituting the feature video image, an index value preset for each of the shots or for each of the scenes, and information specifying an extracted shot or an extracted scene extracted from the shots or the scenes in accordance with a predetermined condition, displaying on a screen a graph of a value produced by sequentially integrating the index values of the respective shots or the respective scenes in the predetermined order; means for displaying marks indicating the extracted shot or the extracted scene on the graph; means for, when an arbitrary position on the graph is designated and replay of the feature video image is instructed, replaying the feature video image after the corresponding position; means for, when replay of the extracted shot or the extracted scene is instructed during the replay of the feature video image, switching to replay of the extracted shot or the extracted scene after the current position; means for, when one of the marks indicating the extracted shot or the extracted scene on the graph is designated and replay of the extracted shot or the extracted scene is instructed, replaying the extracted shot or the extracted scene after the corresponding position; and means for, when replay of the feature video image is instructed during the replay, switching to replay of the feature video image after the current position.

A video image replaying device according to the present invention is capable of replaying a feature video image constituted by connecting at least a plurality of shots or scenes in a predetermined order, where a shot is a basic unit of a motion picture image and a scene is a unit of a motion picture image containing at least one shot. The device includes: means for, on the basis of meta information including recording position information of the shots or the scenes constituting the feature video image and an index value preset for each of the shots or for each of the scenes, determining the scene or the shot having the index value reaching a designated threshold value as an extracted shot or an extracted scene; means for displaying on a screen a graph of a value produced by sequentially integrating the index values of the respective shots or the respective scenes in the predetermined order; means for displaying marks indicating the extracted shot or the extracted scene on the graph; means for, when an arbitrary position on the graph is designated and replay of the feature video image is instructed, replaying the feature video image after the corresponding position; means for, when replay of the extracted shot or the extracted scene is instructed during the replay of the feature video image, switching to replay of the extracted shot or the extracted scene after the current position; means for, when one of the marks indicating the extracted shot or the extracted scene on the graph is designated and replay of the extracted shot or the extracted scene is instructed, replaying the extracted shot or the extracted scene after the corresponding position; and means for, when replay of the feature video image is instructed during the replay, switching to replay of the feature video image after the current position.

A computer-readable recording medium according to the present invention has recorded thereon a program for causing a computer to function as means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and information specifying an extracted shot or an extracted scene from the shots or the scenes at a threshold value setting a disclosure level, replaying an extracted video image produced by connecting the corresponding extracted shot or extracted scene in the predetermined order.

A computer-readable recording medium according to the present invention has recorded thereon a program for causing a computer to function as: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and an index value preset for each of the shots or for each of the scenes, determining the shot or the scene having the index value reaching a threshold value setting a disclosure level as an extracted shot or an extracted scene; and means for replaying an extracted video image produced by connecting the corresponding extracted shots or extracted scenes in the predetermined order.

A computer-readable recording medium according to the present invention has recorded thereon a program for causing a computer to function as: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and an index value preset for each of the shots or for each of the scenes, displaying on a screen a graph of a value produced by sequentially integrating the index values of the respective shots or the respective scenes in the predetermined order; and means for, when an arbitrary position on the graph is designated, sequentially replaying the feature video image after the designated position.

A computer-readable recording medium according to the present invention has recorded thereon a program for causing a computer to function as: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, an index value preset for each of the shots or for each of the scenes, and information specifying an extracted shot or an extracted scene extracted from the shots or the scenes in accordance with a predetermined condition, displaying on a screen a graph of a value produced by sequentially integrating the index values of the respective shots or the respective scenes in the predetermined order; means for displaying marks indicating the extracted shot or the extracted scene on the graph; and means for, when one of the displayed marks is designated, sequentially replaying the portion corresponding to the extracted shot or the extracted scene at and after the mark portion from the feature video image.

A computer-readable recording medium according to the present invention has recorded thereon a program for causing a computer to function as: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and an index value preset for each of the shots or for each of the scenes, determining the scene or the shot having the index value reaching a designated threshold value as an extracted shot or an extracted scene; means for displaying on a screen a graph of a value produced by sequentially integrating the index values of the respective shots or the respective scenes in the predetermined order; means for displaying marks indicating the extracted shot or the extracted scene on the graph; and means for, when one of the displayed marks is designated, sequentially replaying the portion corresponding to the extracted shot or the extracted scene at and after the mark portion from the feature video image.

A computer-readable recording medium according to the present invention has recorded thereon a program for causing a computer to function as: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, an index value preset for each of the shots or for each of the scenes, and information specifying an extracted shot or an extracted scene extracted from the shots or the scenes in accordance with a predetermined condition, displaying on a screen a graph of a value produced by sequentially integrating the index values of the respective shots or the respective scenes in the predetermined order; means for displaying marks indicating the extracted shot or the extracted scene on the graph; means for, when an arbitrary position on the graph is designated and replay of the feature video image is instructed, replaying the feature video image after the corresponding position; means for, when replay of the extracted shot or the extracted scene is instructed during the replay of the feature video image, switching to replay of the extracted shot or the extracted scene after the current position; means for, when one of the marks indicating the extracted shot or the extracted scene on the graph is designated and replay of the extracted shot or the extracted scene is instructed, replaying the extracted shot or the extracted scene after the corresponding position; and means for, when replay of the feature video image is instructed during the replay, switching to replay of the feature video image after the current position.

A computer-readable recording medium according to the present invention has recorded thereon a program for causing a computer to function as: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and an index value preset for each of the shots or for each of the scenes, determining the scene or the shot having the index value reaching a designated threshold value as an extracted shot or an extracted scene; means for displaying on a screen a graph of a value produced by sequentially integrating the index values of the respective shots or the respective scenes in the predetermined order; means for displaying marks indicating the extracted shot or the extracted scene on the graph; means for, when an arbitrary position on the graph is designated and replay of the feature video image is instructed, replaying the feature video image after the corresponding position; means for, when replay of the extracted shot or the extracted scene is instructed during the replay of the feature video image, switching to replay of the extracted shot or the extracted scene after the current position; means for, when one of the marks indicating the extracted shot or the extracted scene on the graph is designated and replay of the extracted shot or the extracted scene is instructed, replaying the extracted shot or the extracted scene after the corresponding position; and means for, when replay of the feature video image is instructed during the replay, switching to replay of the feature video image after the current position.

A video image information recording method according to the present invention includes the steps of: on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and an index value preset for each of the shots or for each of the scenes, displaying a graph of a value produced by sequentially integrating the index values of the respective shots or the respective scenes in the predetermined order; and when an arbitrary position on the graph is designated and an instruction to determine the designated position on the graph as a position for inserting a marker is inputted, additionally recording at least the recording position information corresponding to the designated position on the graph as a marker position to the meta information.

A video image information recording device according to the present invention includes: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and an index value preset for each of the shots or for each of the scenes, displaying a graph of a value produced by sequentially integrating the index values of the respective shots or the respective scenes in the predetermined order; means for designating an arbitrary position on the graph; means for inputting an instruction to determine the designated position on the graph as a position for inserting a marker; and means for additionally recording at least the recording position information corresponding to the designated position on the graph as a marker position to the meta information.

A computer-readable recording medium according to the present invention has recorded thereon a program for causing a computer to function as: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and an index value preset for each of the shots or for each of the scenes, displaying a graph of a value produced by sequentially integrating the index values of the respective shots or the respective scenes in the predetermined order; means for designating an arbitrary position on the graph; means for inputting an instruction to determine the designated position on the graph as a position for inserting a marker; and additionally recording at least the recording position information corresponding to the designated position on the graph as a marker position to the meta information.

A video image replaying method according to the present invention includes the steps of: on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and information specifying at least one of the shots or at least one of the scenes as a marker position; retrieving the information specifying the marker position from the meta information when retrieval of the marker position is instructed; and replaying the video image from the recording position corresponding to the retrieved marker position.

A video image replaying device according to the present invention is capable of reading out meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and information specifying at least one of the shots or at least one of the scenes as a marker position. The device includes: input means for instructing retrieval of the marker position; means for retrieving the information specifying the marker position from the meta information on the basis of the input of the retrieval instruction; and means for replaying the video image from the recording position corresponding to the retrieved marker position.

A computer-readable recording medium according to the present invention has recorded thereon a program for causing a computer to function as: means for, on the basis of meta information including recording position information of shots or scenes of a feature video image constituted by connecting at least a plurality of shots or scenes in a predetermined order, where a shot is a basic unit of a motion picture image and a scene is a unit of a motion picture image containing at least one shot, and information specifying at least one of the shots or at least one of the scenes as a marker position, retrieving the information specifying the marker position when retrieval of the marker position is instructed; and means for replaying the video image from the recording position corresponding to the retrieved marker position.

BRIEF DESCRIPTION OF THE DRAWINGS

FIGS. 20A to 20C schematically show an example of production of a summary video image using the semantic code.

BEST MODE FOR CARRYING OUT THE INVENTION

Figure 1:
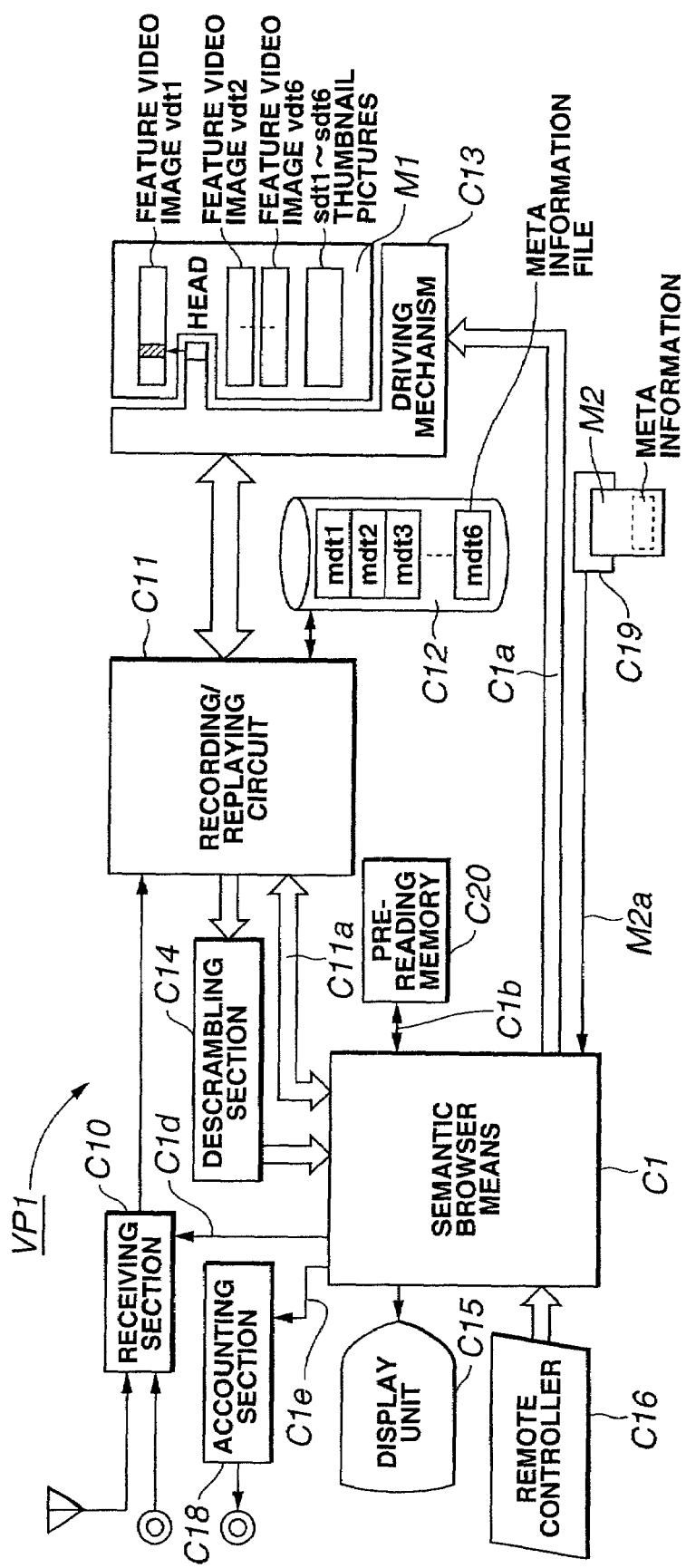
FIG. 1 is a block diagram showing the structure of an embodiment of a video image replaying device according to the present invention.

Preferred embodiments of the present invention will now be described in detail with reference to the drawings. The following embodiments are some of preferred embodiments for realizing the essential structure and effect of the present invention, and therefore various limitations suitable for the technical configuration may be provided. However, it should be noted that the scope of the present invention is not limited to these embodiments unless so described in the following explanation.

The present invention provides a method, device and recording medium which enable new interactive video image browsing such as retrieval of an intended content part or alternate replay of a preview video image and a feature video image, by displaying within a semantic browsing screen a semantic graph which enables intuitive grasping of tranquillization and complication of the story and easy grasping of development of the story or an episode in viewing a video image title of a certain story such as a movie, a television drama or a documentary program, or its preview video image, through a browsing interface having a GUI (graphical user interface) function, and thus realizing interactive transmission and reception of information between a user and a system through the semantic browsing screen.

Prior to the description of the embodiments, definition and explanation of terms will now be made. As a matter of course, the following terms include the technical configuration of the present invention. Therefore, each of the terms is applied only to the present invention and may have a meaning different from that used in the conventional technique.

A shot is a minimum unit of continuous motion picture images. It is equivalent to a film shot of a movie. Shots might be discontinuous, including a plurality of shots produced by splitting a scene and shots of still images. A segment can be defined as a lower level of the hierarchy than a shot.

A scene is a collection of several shots and is a unit of motion picture images for constituting the semantics of a story.

Recording position information is the information indicating the recording position on a recording medium, of scene and shots recorded on the recording medium. It includes all the information related to the recording position such as absolute sector number, absolute track number, time code, absolute record number and the like.

A feature video image is a collection of plural scenes and shots constituting each video image title (e.g., one broadcasting program or one film/drama) and is formed in time width from the beginning to the end of the video image title. A video image title distributed through a broadcasting program or through a network, or a video image title recorded and provided on a cassette magnetic tape or a package-based recording medium like an optical disc is usually constituted by such a feature video image.

An extracted video image is a video image partially extracted from a feature video image, and a preview video image is a short video image such as an abstract corresponding to the purpose, which is constituted by connecting such extracted video images. That is, a preview video image includes at least a video image produced by extracting and connecting such scenes and shots that one or both of a semantic evaluation value and a video image characteristic evaluation value meet predetermined conditions, from scenes and shots constituting a feature video image.

Therefore, a preview video image may be constituted by connecting only extracted scenes extracted from a feature video image, or by connecting only extracted shots extracted from a feature video image, or by connecting extracted shots and scenes extracted from a feature video image in a mixed manner. The same video image as that constituting the preview video image necessarily exists in the feature video image.

That is, extracted scenes and extracted shots constituting a preview video image correspond, one to one, to scenes and shots constituting a feature video image. In the present invention, this characteristic is utilized to carry out free shift between a preview video image and a feature video image, that is, browsing.

A mode is the type of a preview video image corresponding to each application or purpose. Therefore, if there are plural types of applications or purposes, plural types of modes exist.

Such modes may be an outline mode, a highlight mode, a key word mode, an actor-oriented mode and the like. For one feature video image, there are plural types of preview video images such as a preview video image of an outline mode, a preview video image of a highlight mode, a preview video image of a key word mode, and a preview video image of an actor-oriented mode.

Semantic evaluation of a video image is the evaluation with respect to the impact of the video image on the course of the story. The semantic evaluation is made by an evaluator or is automatically made in conformity with a predetermined standard. The evaluation value of the video image in this evaluation is provided as semantic evaluation information of the video image. The semantic evaluation information of the video image is one mode of index value.

Therefore, in the present invention, the semantic evaluation information of the video image is handled as a "provided condition".

While the semantic evaluation information of the video image is normally provided for each scene, it may be provided for each shot.

Video image characteristic evaluation is the evaluation with respect to characteristics of the video image, for example, the evaluation with respect to the presence/absence of speech of actors and special effects such as a large acoustic effect. The evaluation value of the video image characteristics is provided as video image characteristic evaluation information. The video image characteristic evaluation information is one mode of index value.

This evaluation is made by an evaluator, or the evaluation value is automatically calculated in conformity with a predetermined standard. Alternatively, an evaluator confirms the presence/absence of a single or a plurality of video image characteristic items, and on the basis of the presence/absence information as a provided condition, the evaluation value is automatically calculated.

While the video image characteristic evaluation information is normally provided for each shot, it may be provided for each scene.

Meta information is a collection of information related to each video image title (e.g., one broadcasting program or one movie/drama). The meta information is constituted by connecting the following information (1), (2) and (3).

(1) Feature Video Image Comment Information:
1.1) text data, still image data, or audio data of an introductory or explanatory text for the entire feature video image; and
1.2) text data, still image data, or audio data of an introductory or explanatory text for each chapter constituted by connecting a plurality of scenes.

(2) Shot/Scene Information:
2.1) recording position information of each shot constituting the feature video image;
2.2) recording position information of each scene;
2.3) evaluation value and attribute information of each shot; and
2.4) evaluation value and attribute information of each scene.

(3) Correlation information:
3.1) link information between the scene number and the shot number of each shot constituting the scene; and
3.2) integration value of respective evaluation values along the transition of the video image for each scene, for each shot, or for mixture of scenes and shots.

In addition to the information (1), (2) and (3), the meta information may also include at least one item of the following information (4).

(4) Accounting Instruction Information:
4.1) instruction information including the accounting level for accounting with respect to the whole feature video image as a unit;
4.2) instruction information including the accounting level for accounting with respect to the feature video image by meter rate, that is, by quantity (length of time) of intake or length of time of replay;
4.3) instruction information including the accounting level for accounting with respect to the feature video image by chapter, by scene, or by shot;
4.4) instruction information including the accounting level for accounting with respect to a video image processed from the feature video image (e.g., a preview video image); and
4.5) instruction information including the accounting level for accounting with respect to the meta information itself.

The meta information is exemplified by the following semantic score or semantic code.

A semantic score is the information in the form of a table in which the semantic evaluation value (scene score) as a provided condition is associated with all the scenes constituting the feature video image of a video image title while the video image characteristic evaluation value (shot score) is associated with all the shots or at least a part of the shots, and in which these pieces of information are associated with at least the recording position information or the time lapse information (time code) of each scene and each shot and recorded as respective items. Also, various attributes of each scene and each shot are recorded in this table.

On the basis of the contents of the semantic score, the corresponding scene is extracted from the feature video image, and shots are selected and connected from the extracted scene so as to organize a preview video image. Accounting is also carried out.

In this manner, the semantic score is one type of meta information of the feature video image. It is used for constituting an interactive semantic browsing screen as will be described later, which enables editing and automatic production of a preview video image from the feature video image and intuitively expresses the course of the story.

A semantic code is the information in the form of a code, constituted by selecting at least a part of all the items of the semantic score and coding the contents thereof. Therefore, in the semantic code, for example, the recording position information or the time lapse information and the result of video image characteristic evaluation, of a selected shot in a selected scene are described as respective codes. Such information can be easily distributed through a network.

Such a semantic code is edited as meta information for each video image title and provides an efficient data code for carrying out automatic production of a preview video image by a video image replaying device and interactive browsing which intuitively expresses the course of the story. For example, on the basis of the semantic code, the corresponding shots of the feature video image are extracted and connected to form a preview video image. Accounting is also carried out.

A phase is a concept representing each processing process of the video image replaying method according to the present invention or each operation state of the video image replaying device according to the present invention. Transition between phases is made. There are a video image title intake recording phase, a video image title selection phase, a preview video image mode selection phase, a video image browsing viewing phase, a feature video image viewing phase, and an accounting phase.

Semantic browsing is a function to enable designation of an arbitrary replaying position or shift to an arbitrary replaying position by the user in replaying a preview video image or a feature video image, and switch/transition between the preview video image and the feature video image at arbitrary timing. Moreover, semantic browsing includes a function to allow the user to update a threshold value and set an arbitrary disclosure level for the preview video image.

Semantic browsing is carried out on the basis of the input by the user using a semantic browsing screen as will be later. Particularly, it is carried out by semantic browser software (semantic browser means), described later, through selection buttons and a semantic graph, described later.

A semantic browser screen is a screen related to the semantic browsing function and is a control screen provided for each phase. Therefore, it has a plurality of screen structures. For example, in the semantic browsing screen as a control screen displayed in the video image browsing viewing phase, a window, selection buttons, and a semantic graph (main graph and enlarged graph), described later, are displayed. In the window, a thumbnail picture, the preview video image and the feature video image are displayed.

A semantic graph is mainly displayed within the semantic browsing screen as a control screen displayed in the video image browsing viewing phase. The semantic graph is for displaying the evaluation value of each scene (i.e., an example of index value) arbitrarily set in advance with respect to the complication and tranquillization of the story in the form of a time series graph on the screen. The course of the story or development of the episode is displayed in the form of a graph. The semantic graph is constituted by a main graph, a cursor, and an enlarged graph.

The main graph is a main part of the semantic graph and shows a value produced by sequentially integrating the index values of the respective shots or scenes in a predetermined order, in the form of a segmented graph.

The enlarged graph is a graph showing a part of the main graph in an enlarged view. The enlarged part is displayed as a segmented graph. The scale can be arbitrarily designated by the user.

The user can designate arbitrary positions on the main graph and the enlarged graph. Semantic browsing is carried out on the basis of at least the designated position information.

A browsing interface function is a function to carry out operation of interactive transmission and reception of information based on instructions and displays between the user and the system in semantic browsing, or to manage this operation. The browsing interface function is realized at least by software (browsing interface means) for displaying an icon, button and graph on the screen and detecting/identifying the input from the user operating the icon, button and graph.

The semantic browser software (semantic browser means) is adapted for realizing semantic browsing, and is constituted as a computer-readable/executable program including software for the browsing interface function (browsing interface means), management software for the semantic browsing screen (control screen), and control software for various processing means.

Prior to the description of the structure of the video image replaying device according to the present invention, the outline of the video image replaying method according to the present invention will be explained with reference to FIG. 3.

In the video image replaying method according to the present invention, the video image signal processing process includes a plurality of phases corresponding to the stage of the processing. The control screens are displayed for the respective phases and the processing proceeds through these control screens. Transition between the phases is made.

The respective phases represent the respective stages in the operation of the video image replaying device according to the present invention.

Figure 3:
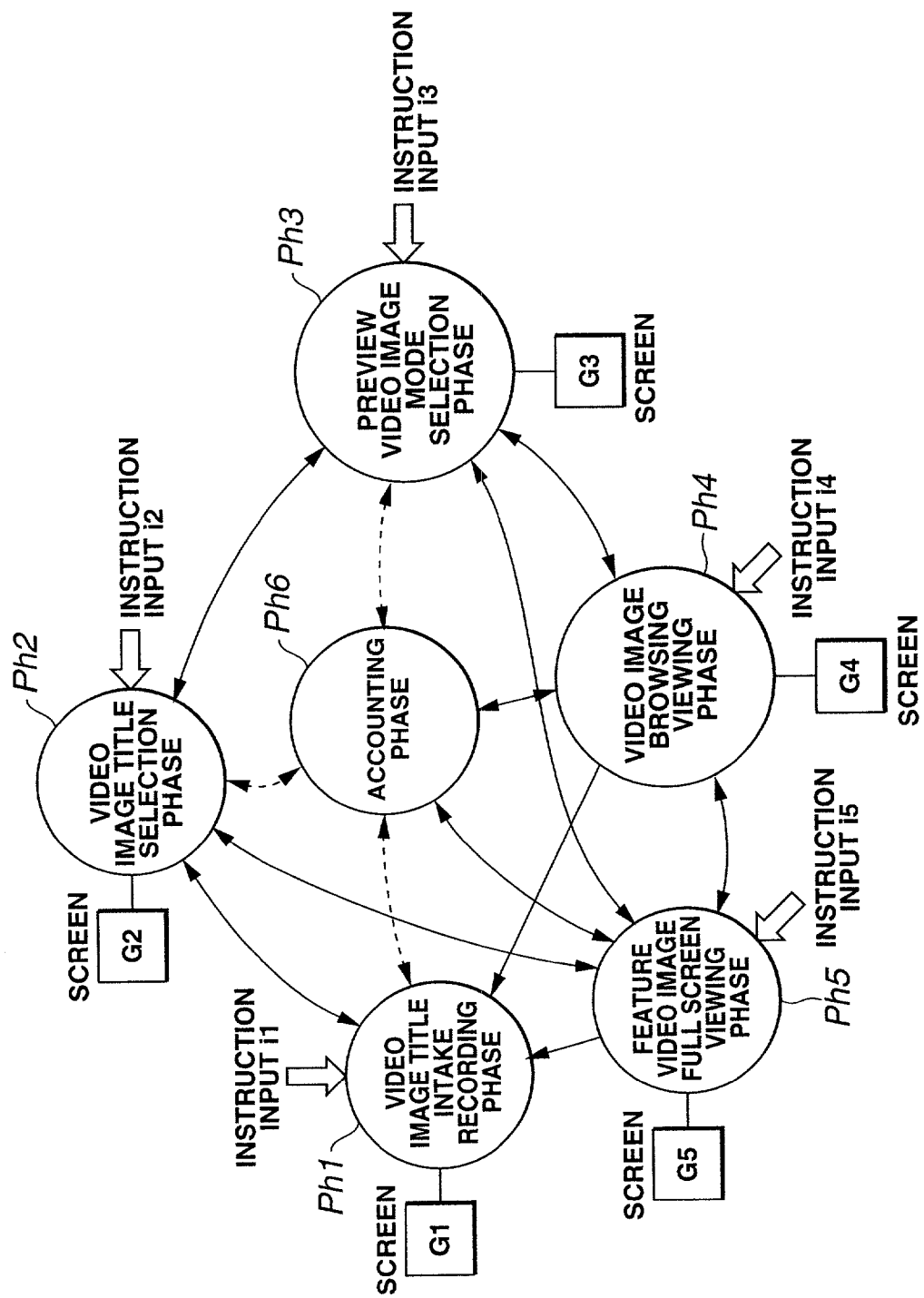
FIG. 3 shows the transition of state of the video image replaying device according to the present invention.

These phases are a video image title intake recording phase Ph1 as a stage of taking feature video images of various video image titles from outside and recording them to a mass storage unit, a video image title selection phase Ph2 as a stage for the user to select a desired video image from the various video image titles that are taken in, a preview video image mode selection phase Ph3 as a stage for the user to select a desired preview video image mode with respect to the selected video image title and view the preview video image, a video image browsing viewing phase Ph4 as a stage of carrying out various types of video image browsing and updating extraction conditions, a feature video image full screen viewing phase Ph5 as a stage of viewing the feature video image on the full screen, and an accounting phase Ph6 as a stage of accounting with respect to the feature video image and the preview video image, as shown in FIG. 3.

It should be noted that the phase configuration shown in FIG. 3 is one example and that omission of a phase or phases or addition of another phase is possible. For example, in the case where intake of video image titles from outside has already been done and a desired video image title is immediately determined, the video image title intake recording phase Ph1 and the video image title selection phase Ph2 are omitted. Similarly, in the case where the system is not to carry out accounting, the accounting phase Ph6 is omitted.

In the video image title intake recording phase Ph1, a first phase control screen G1 is displayed, which is a control screen for the operation of this phase. In the first phase control screen G1, a button for a title intake instruction input i1 is provided so as to accept the title intake instruction input i1 from the user. In accordance with the instruction input i1 thus accepted, the phase shifts to the video image title selection phase Ph2 for allowing the user to select a video image title.

In the case where the system is to carry out accounting at the time of intake of the video image title, the phase shifts to the accounting phase Ph6. Then, when accounting processing is started or completed, the phase shifts again to the video image title intake recording phase Ph1.

In the video image title selection phase Ph2, a second phase control screen G2 is displayed, which is a control screen for the operation of this phase. In the second phase control screen G2, a button for a title selection instruction input i2 is provided so as to accept the title selection instruction input from the user. After accepting the title selection instruction input, the phase shifts to the preview video image mode selection phase Ph3.

In the case where the user wants to view the feature video image immediately after the title selection in the video image title selection phase Ph2, the user can input an instruction to shift to the feature video image full screen viewing phase Ph5. As this instruction input is made, the phase shifts to the feature video image full screen viewing phase Ph5.

In the case where the system is to carry out accounting at the time of selection of the video image title, the phase shifts to the accounting phase Ph6. Then, when accounting processing is started or completed, the phase shifts again to the video image title selection phase Ph2.

In the preview video image mode selection phase Ph3, a third phase control screen G3 is displayed, which is a control screen for the operation of this phase. Transition from the video image browsing viewing phase Ph4 is accepted.

In the third phase control screen G3, a window for video image display and a button for an instruction input i3 are provided so as to accept the instruction input i3.

As the user inputs a mode designation input i31 for a desired preview video image while watching the third phase control screen G3, the preview video image of the mode instructed by the designation input i31 (see FIG. 2) is displayed in the window. This preview video image is organized and replayed on the basis of a default threshold value predetermined for each mode.

In the case where the user watches the preview video image and purchases the video image title, the user makes an input i32 for purchase instruction and viewing phase instruction. Then, the phase shifts to the accounting phase Ph6 and accounting is carried out. After that, the phase shifts to the video image browsing viewing phase Ph4 or to the feature video image full screen viewing phase Ph5.

The input i32 for purchase instruction and viewing phase instruction is made by clicking an "S. graph" button (see FIG. 7) on the screen.

Normally, viewing of the preview video image is free of charge. However, in the case where the system is to carry out accounting for replay of the preview video image, the phase shifts to the accounting phase Ph6. Then, when accounting processing is started or completed, the phase shifts again to the preview video image mode selection phase Ph3.

In the video image browsing viewing phase Ph4, a fourth phase control screen G4 is displayed, which is a control screen for the operation of this phase, and an instruction input i4 is accepted. In the fourth phase control screen G4, a window for replaying and displaying the feature video image or the preview video image, and a display area for the semantic graph characterizing the present invention are provided. In the semantic graph, a chart, a cut position and a cursor are displayed. The chart shows the flow of the whole feature video image. The cut position represents a plurality of cut positions for each mode of the preview video image on the chart. The cursor displays the current replaying position while shifting it with the lapse of time. Moreover, the cursor is movable to a desired position on the chart.

In addition to the above, various buttons for instruction inputs i4 and video image control buttons for start, pause, resume, stop, rewind, fast feed and the like of the video image replay are provided in the fourth phase control screen G4. By making various instruction inputs i4, the user can enjoy various browsing and viewing (browsing of both the feature video image and the preview video image), as will be later described in detail.

When replay of the preview video image is instructed, the preview video image of that mode is replayed in the window. If there is an input of cursor shift during the replay of the preview video image, it is determined that shift browsing from one portion to another of the preview video image of that mode is instructed. Thus, replay the preview video image of that mode is continued after shifting to the corresponding portion. By clicking inside the window during the replay of the preview video image in the window, the replayed video image can be expanded onto the entire screen.

When replay of the feature video image is instructed, the feature video image is replayed in the window. If there is an input of cursor shift during this replay, it is determined that shift browsing from one portion to another of the feature video image is instructed. Thus, replay of the feature video image is continued after shifting the corresponding portion. Replay of the feature video image is carried out by clicking a "whole video image" button (see FIG. 8) on the screen. Also, the replayed video image can expanded onto the entire screen by clicking inside the window during replay of the feature video image in the window.

In the video image browsing viewing phase Ph4, an input for updating (restricting or moderating) the "threshold value" as the video image extraction condition for the corresponding mode of the preview video image can be made on the basis of the instruction input from the user.

When the update of the "threshold value" is inputted, the "threshold value" is updated and the preview video image of that mode based on the new "threshold value" is replayed.

Meanwhile, if the contents of the instruction input i4 is to instruct switch browsing from the preview video image to the feature video image or to instruct switch browsing from the feature video image to the preview video image, the video image in the window is switched every time, with the current replaying position maintained.

If the contents of the instruction input i4 is to instruct feature video image full screen display, the phase shifts from the browsing phase to the feature video image full screen viewing phase Ph5. The instruction for feature video image full screen display is made by clicking an arbitrary position in the window at the time of replay of the whole video image.

If the contents of the instruction input i4 is to instruct return to the preview video image mode selection phase Ph3, the phase shifts to the preview video image mode selection phase Ph3.

In the feature video image full screen viewing phase Ph5, the feature video image is displayed on the entire screen.

In the case where the phase shifted directly from the video image title selection phase Ph2 as described above, the phase shifts to the accounting phase Ph6 for accounting processing. When accounting processing is started or completed, the phase shifts again to the feature video image full screen viewing phase Ph5.

In the feature video image full screen viewing phase Ph5, an instruction input i5 of an instruction for browsing start or an instruction for return to the video image title intake recording phase Ph1 is accepted. If this instruction input i5 is to instruct browsing start, the phase shifts to the video image browsing viewing phase Ph4 with the current replaying position information provided thereon.

If the contents of the instruction input i5 is to instruct return to the video image title intake recording phase Ph1, the current replay is stopped and the phase shift to the video image title intake recording phase Ph1.

An embodiment of the video image replaying device according to the present invention will now be described.

Figure 2:
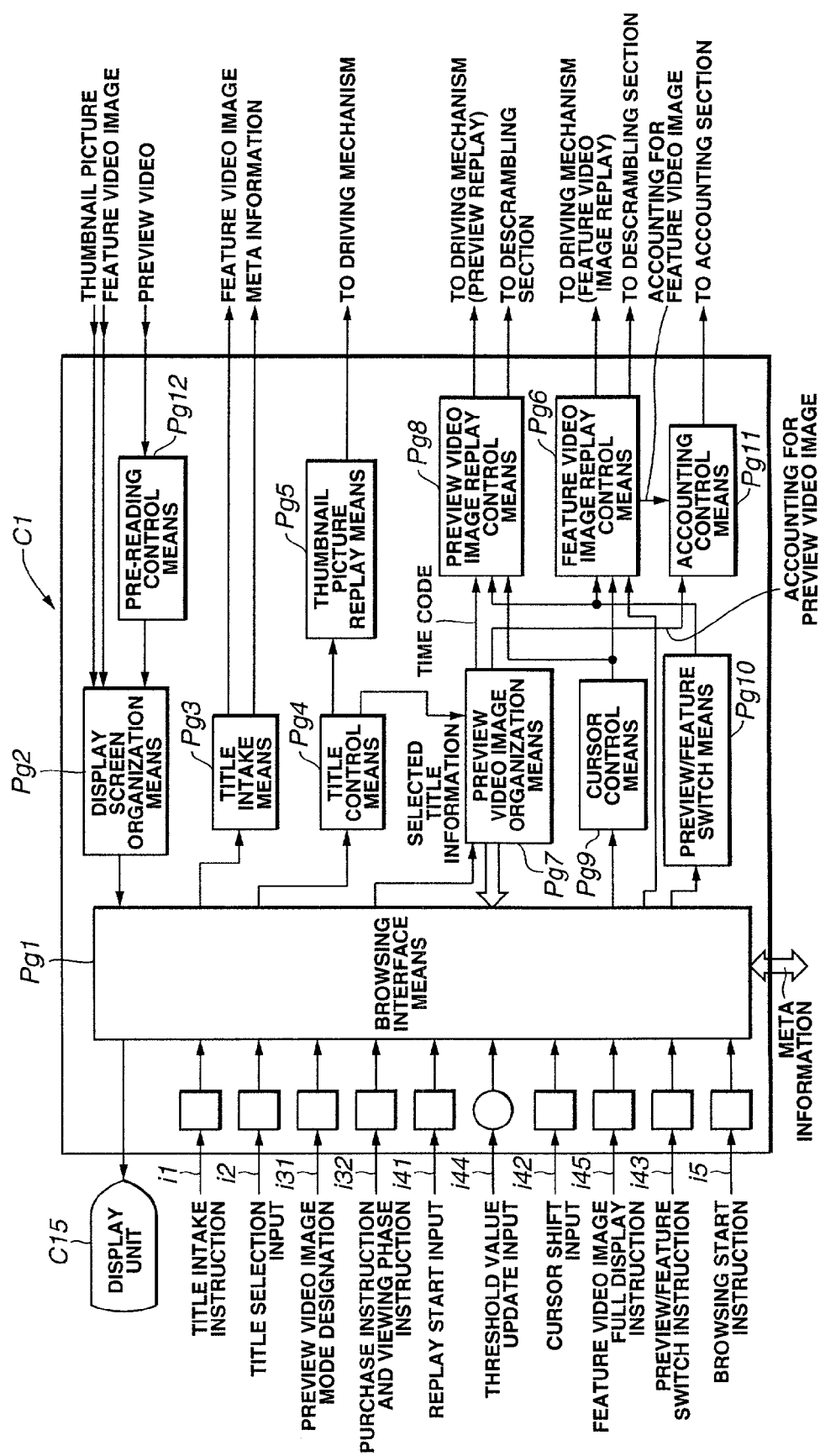
FIG. 2 is a block diagram showing the structure of semantic browser means shown in FIG. 1.

FIG. 1 is a block diagram showing the structure of an embodiment of a video image replaying device according to the present invention. FIG. 2 is a block diagram showing the structure of semantic browser means shown in FIG. 1.

As shown in FIG. 1, a video image replaying device VP1 according to the present invention has semantic browser means C1, a receiving section C10, a recording/replaying circuit C11, a high-speed storage unit C12, a driving mechanism C13, a descrambling section C14, a display unit C15, a remote controller C16, and an accounting section 18.

In addition, the video image replaying device VP1 can also have a drive mechanism C19 and a pre-reading memory C20.

The driving mechanism C13 has a write/read head and a rotation mechanism section. A mass storage medium M1 such as a rewritable DVD medium like DVD+RAM is to be loaded on the driving mechanism C13 so as to record and replay data.

The mass storage medium M1 is a recording medium on which video image signals (in the present invention, video image-related signals and audio-related signals are collectively referred to as "video image signals" as a matter of convenience) are recorded or recordable together with recording position information related to the recording position of the video image signals. As this recording medium, an optical recording medium or a tape- or disc-shaped magnetic recording medium having a format of recording the recording position information is suitable.

Such recording position information is recorded in the form of sector number or track number on an optical disc/magneto-optical disc medium or a hard magnetic disc medium. The recording position information is outputted as the current address at the time of replay, and is searched for when it is determined as a target address at which replay should be started.

In a video image tape medium, the absolute track number related to the inclined track or the time code is accessibly recorded on the inclined track or longitudinal track.

In the drive mechanism C19, a data carrier unit such as a memory stick or a memory card unit is loaded.

The semantic browser means C1 automatically produces a preview video image from a feature video image and carries out replay in various preview modes. Also, the semantic browser means C1 carries out browsing such as linked replay of the preview video image and the feature video image and executes various control operations. The structure and operation of the semantic browser means C1 will be later described in detail with reference to FIG. 2.

The receiving section C10 is connected to a network system such as the Internet as well as a broadcasting system of radio broadcast like satellite digital broadcast or ground wave digital broadcast, or wired broadcast like CATV, and receives feature video image data of various video image titles and their meta information data. The receiving section C10 is made up of a tuner circuit or an AGC circuit, a detector circuit, and a demultiplexer.

The receiving section C10, controlled by a control signal from the semantic browser means C1, separates the data on which receiving processing has been carried out, and sends the data to the recording/replaying circuit C11.

Meta information is prepared for each video image title and includes data specifying the video image title, the shot evaluation value for each shot constituting the video image title (i.e., shot score), the scene evaluation value for each scene (i.e., scene score), the time code of each shot, the time code of each scene, the list of shots belonging to each scene, thumbnail picture data of the video image title, and attributes and accounting information with respect to the video image title.

The meta information data is supplied as a semantic code produced by organizing these data in the form of code.

The structure and use of the semantic code as an example of meta information applied in the present invention will now be described.

Figure 19:
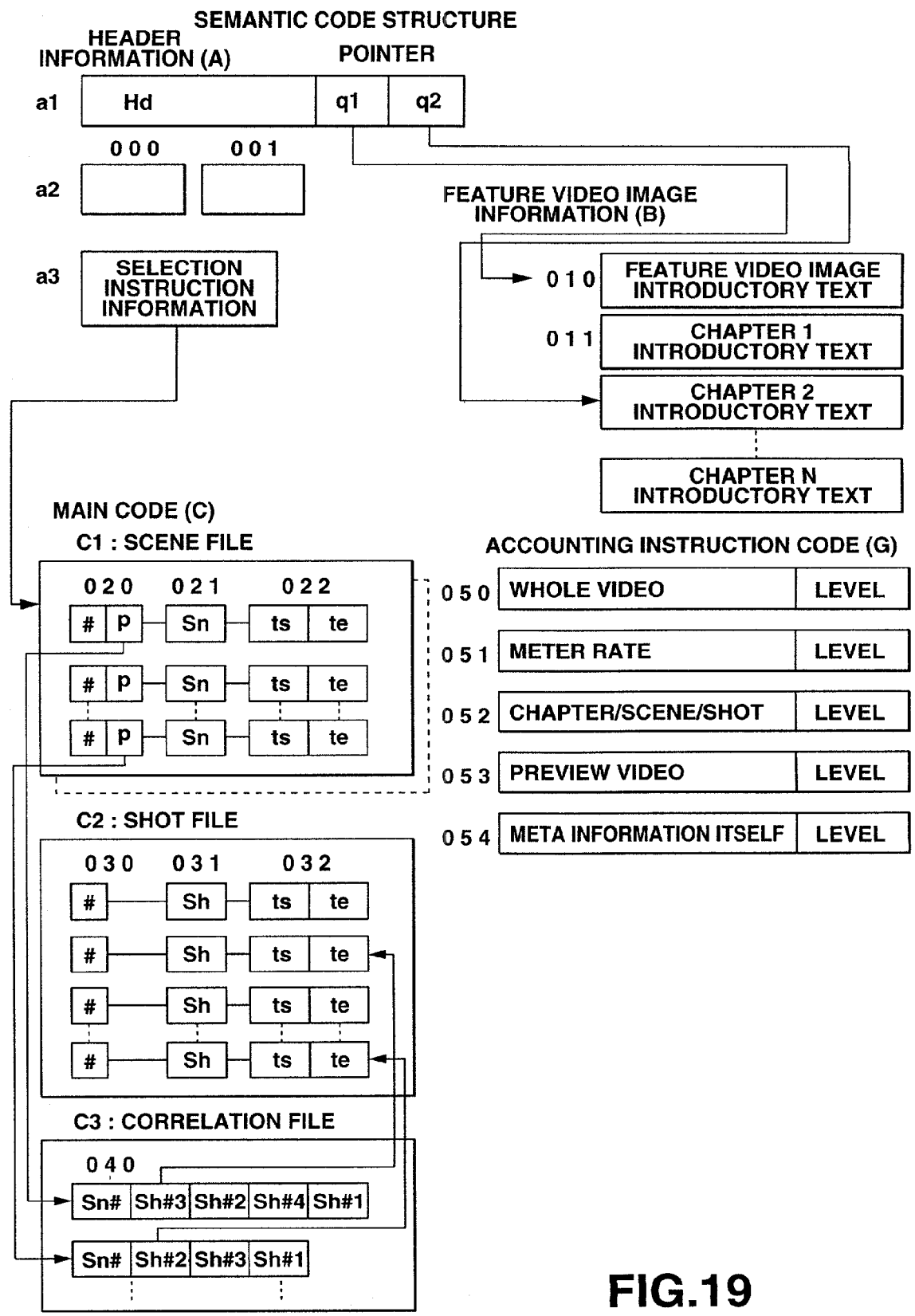
FIG. 19 is an explanatory view showing an exemplary structure of a semantic code applied to the present invention.

FIG. 19 is an explanatory view showing the structure of the semantic code as meta information, in the form of logical structure of data.

The semantic code is made up of a code (A) related to header information, feature video image information (B) consisting of a code related to video image title comment information, and a main code (C) including shot/scene information of the feature video image. Specifically, the feature video image information (B) consisting of a code related to video image title comment information is the information specifying the feature video image, and the main code (C) includes predetermined information related to shots or scenes.

A. Header Information a1: general information related to the program (name of program, program code, broadcasting channel, broadcasting date and time, genre of program, etc.), and pointer q1 of the address of item 010 of the feature video image information or pointer q2 of the address of item 011 of the feature video image information a2: item information of attributes;
   000=presence/absence flag of attributes
   001=application or preview mode a3: selection instruction information for carrying out main code selection instruction; in accordance with this selection instruction information, one or two or more scene files (C1) in the main code (C) can be selectively designated.

B. Feature Video Image Information

010=text data, still image data (thumbnail picture data), or audio data of introductory text or explanatory text of the whole feature video image

011=text data, still image data (thumbnail picture data), or audio data of introductory text or explanatory text of each chapter constituted by connecting a plurality of scenes C. Main Code A scene file, a shot file, and a correlation file are recorded in the main code.

C1: scene file; records the following for each scene
   020=scene number # and pointer p
   021 scene evaluation value Sn
   022=time code (start point ts, end point te)

C2: shot file; records the following for each shot
   030=shot number #
   031=shot evaluation value Sh, other attributes (application, etc.)
   032=time code (start point ts, end point te)

This time code 032 can designate one section of a shot. For example, in the case where only one of the start point ts and the end point te is designated, or in the case where the start point ts and the end point te have the same value, a still image is shown.

C3: correlation file
   040=link data of scene number Sn# and shot number Sh#

In this case, the shot numbers of a plurality of shots Sh#1, Sh#2 and the like included in one scene of the scene number Sn# are linked to this scene number. This link data 040 is the link data in the weighting sort order or in the temporal order, and can represent skip by "null".

In addition, a code (G) related to an accounting instruction as described hereinafter can be connected.

G. Accounting Instruction Code

050=instruction information including the accounting level for accounting with respect to the whole feature video image as a unit

051=instruction information including the accounting level for accounting with respect to the feature video image by meter rate, that is, by quantity (length of time) of intake or length of time of replay

052=instruction information including the accounting level for accounting with respect to the feature video image by chapter, by scene, or by shot

053=instruction information including the accounting level for accounting with respect to a video image processed from the feature video image (e.g., a preview video image)

054=instruction information including the accounting level for accounting with respect to the meta information itself In the above description, a plurality of shots having various meanings can be included in the link data 040 on the basis of the description of the attendant attribute of the shot evaluation value 031.

Also, to save the data volume of the semantic code, the data of the shot file C2 can be limited to only the shots included in the scene having a predetermined or higher scene evaluation value 021 (within the scene file).

As the data of the shot file C2, all the shots 030 with respect to all the scenes 020 and the evaluation values 031 of the shots can be included. Particularly, it is effective as authoring data.

In the scene file C1, each scene evaluation value 021 and time code 022 are associated with the scene number 020 of this scene. The pointer p attached to the scene number 020 indicates the leading address of the corresponding link data 040 of the correlation file C3.

With this data structure, as the scene to be selected is determined by checking the scene evaluation value 021, the pointer p attached to the scene number 020 enables quick entry of the scene to the corresponding link data 040.

In the link data 040, if a plurality of shot numbers Sh#n (n=1, 2, . . . ) exist for one scene number Sn#, it is preferred to arrange the plurality of shot numbers in the sorting order on the basis of the shot evaluation value 031 and record them as the link data 040 in producing the semantic code.

With this data structure, when selecting a representative shot from the scene of the scene number 020, a jump to the corresponding link data 040 in the correlation file C3 can be made using the pointer p of the scene number 020, and the leading shot of the shots of the shot numbers Sh#n arranged in the link data 040. Thus, the shot selection time is reduced.

Moreover, on the basis of the selected shot number, the start point ts and the end point te are read out from the corresponding time code 032 of the shot 030 coincident with the shot number in the shot file C2. On the basis of this time code 032, the corresponding shot video image is extracted from the feature video image.

Also, in the case where two or more shots are to be selected from a scene of one scene number 020 by adjusting the length of time of the preview video image, a jump to the corresponding link data 040 can be made and the necessary number of shots can be sequentially taken out from the leading shot of the shots arranged in the link data 040. Thus, the shot selection time can be reduced.

The above-described technique is used for selecting the shot belonging to the corresponding scene after the selection of the scene based on the scene evaluation value and for extracting the shot video image from the start point to the end point. However, in place of this, the above-described technique can also be used for extracting the video image of each scene. In the case of the video image of each scene, the scene is selected on the basis of the scene evaluation value 021 in the scene file C1 and the time code 022 (start point ts and end point te) of that scene is read out. On the basis of this time code 022, the corresponding scene video image is extracted from the feature video image. Similarly, it can be used for extracting the scene video image and the shot video image in a mixed manner.

For example, with respect to a feature video image as shown in FIG. 20A including a plurality of shots a, b, c, d, e, f and g constituting a summary video image, the plurality of shots a, b, c, d, e, f and g constituting the summary video image are defined in the shot file C3, and the scene file C1 and the shot file C2 in the main code (C) selected in accordance with the selection instruction information a3 for carrying out the main code selection instruction are associated with each other by the correlation file C3, as shown in FIG. 20B. Thus, the summary video image (a, e, g) can be constituted as shown in FIG. 20C. In this case, definitions for associating the scene A1 and the shot a, for associating the scene A2 and the shot e, and for associating the scene A3 and the shot g are made in the correlation file C3.

Figure 21A:
FIGS. 21A to 21G schematically show an example of production of a plurality of summary video images using the semantic code.
Figure 21B:
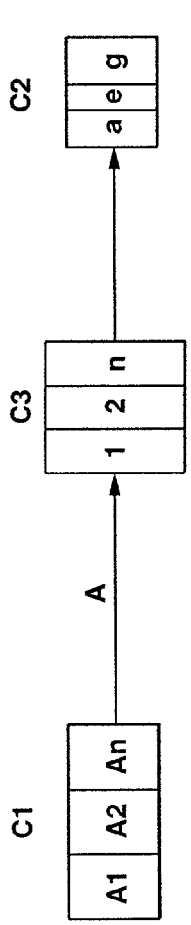
Figure 21C:
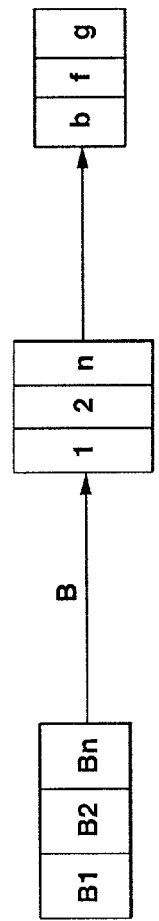
Figure 21D:
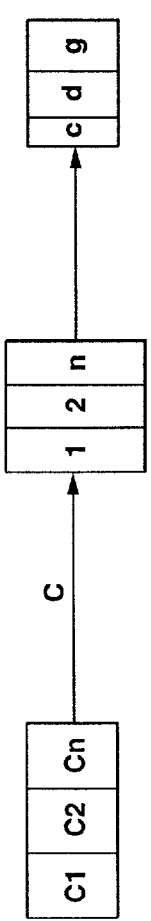
Figure 21E:
Figure 21F:
Figure 21G:

As a plurality of scene files C1, shot files C2 and correlation files C3 are provided, a plurality of summary video images can be produced from the same title. For example, with respect to a feature video image as shown in FIG. 21A including a plurality of shots a, b, c, d, e, f and g constituting a highlight summary for each actor, the plurality of shots a, b, c, d, e, f and g constituting the highlight summary for each actor are defined in the shot files C3, and the three scene files C1 and shot files C2 in the main code (C) selected by the selection instruction information a3 for carrying out the main code selection instruction are associated with each other by the correlation files C3, as shown in FIGS. 21B to 21D. Thus, the highlight summaries (a, e, g), (b, f, g) and (c, d, g) for actors A, B and C, respectively, can be constituted as shown in FIGS. 21E to 21G. In this case, definitions for associating the shots a, e and g constituting the highlight summary (a, e, g) for actor A with the scenes A1, A2 and A3, for associating the shots b, f and g constituting the highlight summary (b, f, g) for actor B with the scenes B1, B2 and B3, and for associating the shots c, d and g constituting the highlight summary (c, d, g) for actor C with the scenes C1, C2 and C3 are made in the correlation files C3.

Figure 22:
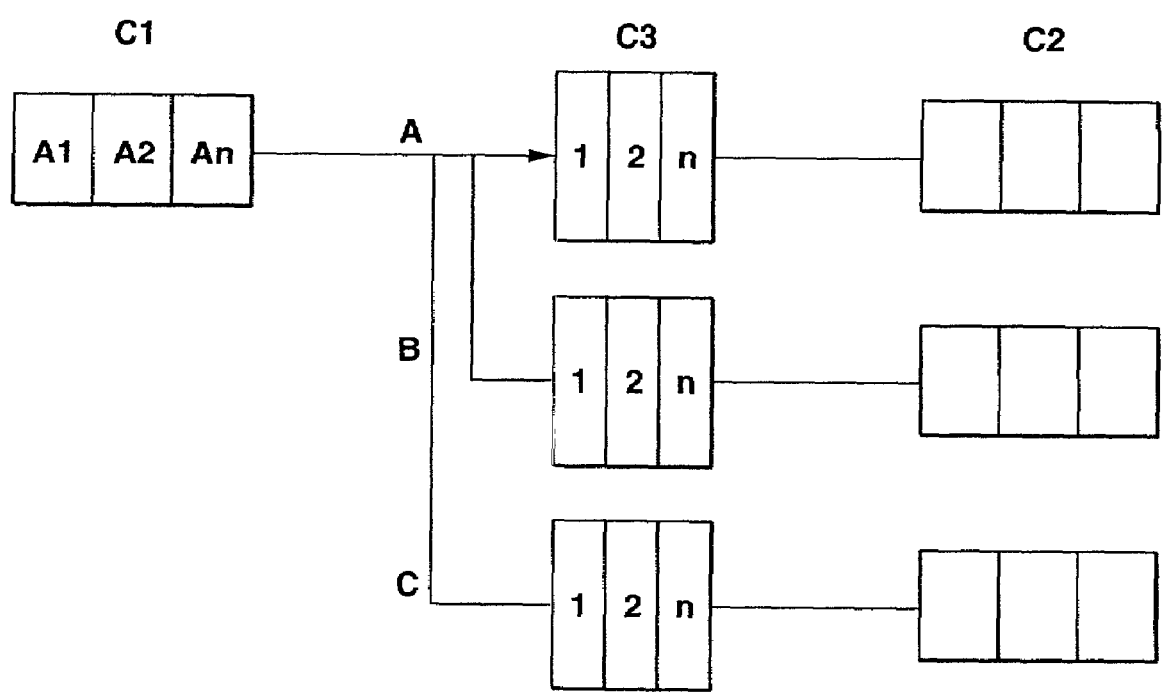
FIG. 22 schematically shows another example of production of a summary video image using the semantic code.

As a plurality of correlation files C3 and shot files C2 are provided for one scene file C1, as shown in FIG. 22, summaries having various features which, for example, realize discrimination of time and contents in accordance with the accounting level, can be produced.

Figure 23A:
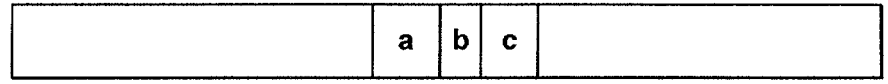
FIGS. 23A to 23F schematically show an example of production of a plurality of regular versions using the semantic code.
Figure 23B:
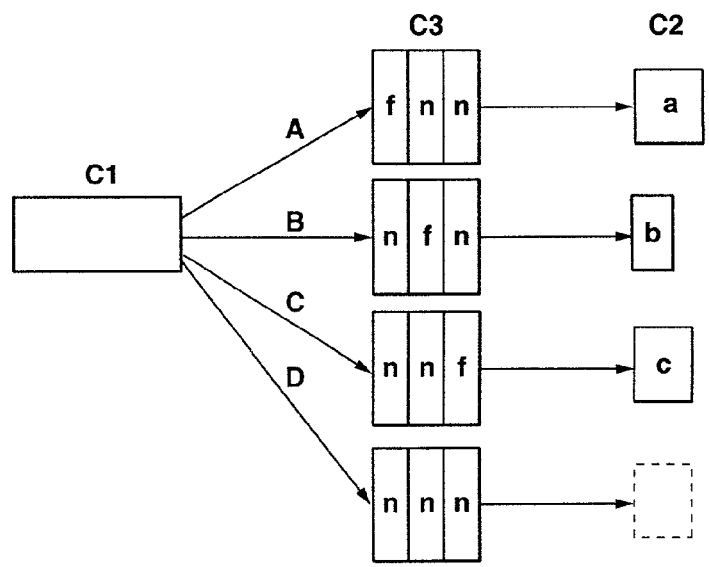
Figure 23C:
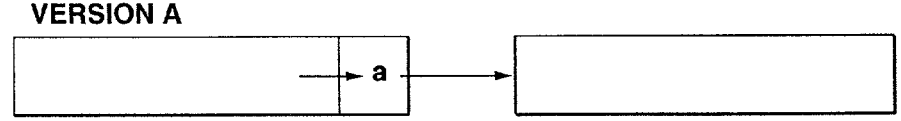
Figure 23D:
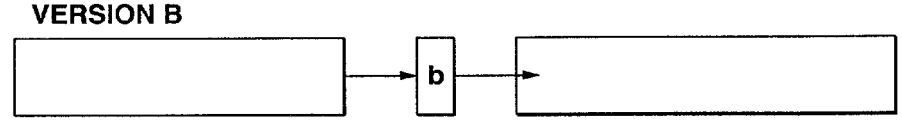
Figure 23E:
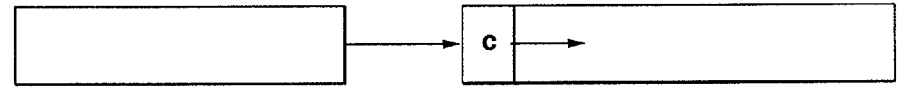
Figure 23F:

As a plurality of correlation files C3 are provided for one scene file C1, various feature video image versions can be produced. Specifically, an option of limited mode is provided by a3 (item information of attribute) of the header information, and replay is carried out while skipping a portion that is not to be shown, by using the descriptive data of C1 (scene file), C2 (shot file) and C3 (correlation file) of the main code. C1 (scene file), C2 (shot file) and C3 (correlation file) of the main code designate the portion that is not to be shown. As the viewer makes selection and designation when purchasing the title, it becomes possible to present the contents which are of the same feature video image data but suitable for the age, religion, and other conditions of the viewer. For example, with respect to a feature video image as shown in FIG. 23A including a plurality of shots a, b and c which are selectively limited by the difference of nation or culture or by rating, the plurality of shots a, b and c are defined in the correlation files C3, and one scene file C1 and one shot file C2 in the main code (C) selected by the selection instruction information a3 for carrying out the main code selection instruction are associated with each other by the plurality of correlation files C3, as shown in FIG. 23B. Thus, various feature video image versions can be produced as shown in FIGS. 23C to 23F.

In this case, a correlation file A for associating the scene of the feature video image defined by the scene file C1 with the shot a and for nullifying the association with the shots b and c, a correlation file B for associating the scene of the feature video image defined by the scene file C1 with the shot b and for nullifying the association with the shots a and c, a correlation file C for associating the scene of the feature video image defined by the scene file C1 with the shot c and for nullifying the association with the shots a and b, and a correlation file D for nullifying the association of the scene of the feature video image defined by the scene file C1 with all the shots a, b and c are defined in the correlation files C3.

For evaluation of a scene, video image semantic evaluation method is employed. For example, a scene representing the complication of the story has a (+) value and a scene representing the tranquillization has a (−) value, with the degree represented by real number values of absolute values 0.1 to 1.0. The complication means the occurrence of a new problem and the rise of psychological complications of the characters as a result thereof. The tranquillization means the solution of the problem and the psychological release and catharsis of the characters as a result thereof.

Most of the previews of movies and television programs show the scenes representing the complications such as the occurrence of a problem and the development of a new situation or new human relations so as to appeal to the viewers, but do not show the scenes representing the tranquillization such as the solution of the problem and the conclusion. Therefore, as default threshold values for scene selection, a scene evaluation value Sn(+) reflecting a complication scene is set to Sn(+)≧0.6 and a scene evaluation value Sn(−) reflecting a tranquillization scene is set to Sn(−)≦−0.8. In the case of a movie or a television program, the explanation of the situation of the story or the beginning of the drama is casually provided in the introductory portion. Therefore, the default threshold value of the introductory portion is lowered by 0.1 point, so that the scene evaluation value Sn(+) reflecting a complication scene is set to Sn(+) ≧0.5 while the scene evaluation value Sn(−) reflecting a tranquillization scene is set to Sn(−)≦−0.7.

In the case where the scene evaluation value Sn is thus provided as a real number value, the position of a peak scene is to be calculated by an algorithm.

The scene evaluation value Sn can also be provided as a binary value (0, 1). In this case, Sn=1 represents high-score scenes and peak scenes. By providing the scene evaluation value Sn as a binary value (0, 1), the data structure and arithmetic processing can be simplified. Also, the video image portions that may be shown can be clearly defined on the transmitting side. The meaning of the scene evaluation value Sn=1 need not be based on the semantic score but can be intentionally selected by the transmitting side. For example, scenes which the transmitting side does not want to show in consideration of the portrait right and rating are to be removed from the summary video image even if it has a high scene score. On the contrary, there are scenes which the transmitting side wants to show in consideration of marketing even if it has a low semantic score.

The scene evaluation value Sn can also be provided as an integer value (0, 1, 2, 3). In this case, Sn=1 represents high-score scenes, Sn=2 represents peak scenes, and Sn=3 represents scenic scenes. As the scene evaluation value Sn is thus provided as an integer value (0, 1, 2, 3), the necessary presentation seconds and position in the shot can be designated, with the link to the shot file C2 changed in accordance with the type of the scene.

Moreover, the scene evaluation value Sn can also be provided as an integer value (0, 1, 2, 3, 4) indicating the disclosure level. In this case, by substituting the integer value (0, 1, 2, 3, 4) as a result of simple ranking at the stage of coding on the transmitting side, rather than calculating the score and then selecting the scene corresponding to the disclosure level, the burden at the time of execution can be reduced. The ranking is made also in consideration of high-score scenes, peak scenes and scenic scenes.

In the case of organizing a preview video image by extracting a part of a feature video image, that is, a shot video image from the feature video image, for example, in the case of producing a summary video image of one to two minutes from a feature video image of two hours, it is not possible to employ many cuts if a shot or a scene of the feature video image is used as it is. Therefore, the shot file C2 at the stage of coding prescribes a section that can be disclosed, in the shot. Thus, the transmitting side can selectively present only the cut which it truly wants to show, in the shot. Many video image cuts used for commercial previews have a length of one to two seconds or less, and contain video images of tense situations. These are only a part which is cut out from a feature video image shot of several seconds to several tens seconds. In general, the beginning of the shot often contains an explanatory or introductory video image and the end portion of the shot often contains the most impressive presentation or solution of a problem. Therefore, as an algorithm for automatically extracting a summary video image from a shot or a scene, it is effective to cut out a portion of prescribed seconds from the end.

The recording/replaying circuit C11 sends the meta information data of the video image title, of the data inputted from the receiving section C10, to the high-speed storage unit C12 and causes the high-speed storage unit C12 to record the meta information data. The recording/replaying circuit C11 sends the feature video image data of the video image title to the driving mechanism C13. This feature video image data is recorded and stored onto the mass storage medium M1 by the write/read head provided in the driving mechanism C13.

The recording/replaying circuit C11 also sends the feature video image data of the video image title inputted from the receiving section C10, directly to the descrambling section C14, or reads out the feature video image data from the mass storage medium M1 via the driving mechanism C13 and sends it to the descrambling section C14.

Moreover, the recording/replaying circuit C11 sends the meta information data of the video image title separately inputted from the receiving section C10, directly to the semantic browser means C1 as data C11a, or reads out the meta information data from the high-speed storage unit C12 and sends it to the semantic browser means C1 as data C11a.

The high-speed storage unit C12 is made of a rigid magnetic disk unit of a medium-scale storage capacity having a high-speed time seek property, and stores the meta information data mdt1, mdt2, . . . , mdt6 of each video image title. The meta information data mdt1, mdt2, . . . , mdt6 of the video image title are inputted from the receiving section C10 through the recording/replaying circuit C11 as described above.

Alternatively, the meta information data mdt1, mdt2, . . . , mdt6 are inputted from the memory stick M2 storing the meta information data mdt1, mdt2, . . . , mdt6, through the drive mechanism 19, the semantic browser means C1 and the recording/replaying means C11 as will be described later.

The meta information data mdt1, mdt2, . . . , mdt6 inputted to the high-speed storage unit C12 are recorded as meta information files. These meta information files can be freely read and updated.

It is also possible to disperse the meta information data and to record and store picture data of thumbnail pictures or the like of each video image title in the meta information onto the mass storage medium M1 as thumbnail picture groups sdt1 to sdt6.

Moreover, if the mass storage medium M1 and the driving mechanism C13 are suitable for high-speed access, it is possible to record and store the meta information data mdt1, mdt2, . . . , mdt6 together with the feature video image data onto the mass storage medium M1, omitting the high-speed storage unit C12.

In the case where each meta information data does not contain the picture data like thumbnail pictures, it is possible to use a semiconductor memory such as a DRAM or flash memory.

The driving mechanism C13 has the mass storage medium M1 loaded therein or built therein, and has a function to read out video image signals accessed on the basis of the recording position information from the mass storage medium M1, as replay signals.

In the case where the mass storage medium M1 is an optical disc medium such as a DVD or a rigid magnetic disc medium such as an HDD, a mechanism of rotational driving system like a motor and a write/read head are provided and are actuated in response to a control signal from the semantic browser means C1 so as to write the recording data received from the recording/replaying circuit C11 to the mass storage medium M1 or to output the read out data to the recording/replaying circuit C11.

For example, in the case of replay, the current address is constantly outputted during the replay on the basis of the output signal from the write/read head, and on receiving a target address inputted from outside, the write/read head is shifted to the position of that address.

The descrambling section C14 receives the scrambled feature video image data via the recording/replaying circuit C11, edits the feature video image data to produce descrambled feature video image data, and outputs the descrambled feature video image data to the semantic browser means C1. The descrambling section C14 is constituted as a program which is readable and executable by a central processing unit (microcomputer), not shown, and is actuated in response to a control instruction (not shown) from the semantic browser means C1.

The semantic browser means C1 is constituted as a program which is readable and executable by a central processing unit (microcomputer), not shown. The semantic browser means C1 issues a control instruction C1$d$ to the receiving section C10 to control the intake of video image signals, and issues a control instruction to the driving mechanism C13 to control the access to the mass storage medium M1. Also, the semantic browser means C1 issues a control instruction together with the signal C11$a$ to the recording/replaying circuit C11 so as to indirectly control the high-speed storage unit C12 via the recording/replaying circuit C11.

Moreover, the semantic browser means C1 takes therein the meta information data received and separated by the receiving section C10 together with the signal C11$a$ via the recording/replaying circuit C11, or takes therein the meta information recorded in the high-speed storage unit C12 together with the signal C11$a$. The semantic browser means C1 also takes therein the descrambled feature video image data from the descrambling section C14 and displays the feature video image or the preview video image onto the display unit C15 on the basis of an input signal C16$a$ received from the remote controller C16.

The preview video image is a video image having a preview function, in which extracted video images of predetermined portions extracted from the feature video image data are connected.

Also, the semantic browser means C1 issues a control instruction C1$e$ to the accounting section C18 to execute batched accounting prior to the replay of the feature video image or the preview video image, or to execute meter-rate accounting based on the replay time or the number of times of replay of the feature video image or the preview video image.

The semantic browser means C1 provisionally records the preview video image data as a signal C1$b$ to the pre-reading memory C20 made of a flash memory or the like, and reads the preview video image data again with a certain time difference. The semantic browser means C1 thus performs first-in first-out control, thereby enabling elimination of interruption of the video image at the connection of video image portions.

In the above description, the meta information data is received from the receiving section C10 or taken out from the high-speed storage unit C12. However, it is also possible to take out the meta information data recorded on the memory stick M2 as a signal M2$a$ through the drive mechanism C19.

It is also possible to record and save the meta information data received from the receiving section C10 to the memory stick M2 capable of writing.

Hereinafter, the structure and operation of the semantic browser means C1 will be described in detail with reference to FIG. 2. The semantic browser means C1 (specifically, semantic browser software) includes a GUI function and is adapted for taking therein the meta information data as the semantic code through the broadcasting program or through the Internet, for recording the meta information data to a medium accessible at a high speed such as a hard disk or a DVD, for replaying the semantic code and the preview video image of the outline mode, highlight mode or each actor mode automatically produced from the feature video image, for replaying the feature video image, for enabling browsing between the feature video image and the preview video image, and for carrying out the above-described various types of accounting.

The semantic browser means C1 has browsing interface means Pg1, display screen organization means Pg2, title intake means Pg3, title control means Pg4, thumbnail picture replay means Pg5, feature video image replay control means Pg6, preview video image organization means Pg7, preview video image replay control means Pg8, cursor control means Pg9, and preview/feature video image switch means Pg10, as shown in FIG. 2.

The semantic browser means C1 also has accounting control means Pg11 for controlling the accounting section C18 (FIG. 1) which carries out batched accounting with respect to the feature video image or the preview video image or carries out meter-rate accounting in accordance with the replay time or the number of times of replay of the regular or preview video image.

The semantic browser means C1 also has pre-reading control means Pg12 for carrying out first-in first-out control of picture data so as to smooth the flow of the video image by preventing interruption of the video image at the connection part of extracted scenes, which may occur in discrete access to extracted scenes on the sector in a DVD player or the like when replaying the preview video image. The pre-reading control means Pg12 controls the pre-reading memory C20 (FIG. 1).

The semantic browser means C1 may also have marker insertion/retrieval means P13 for inserting a marker at a desired recording position of the feature video image or the preview video image and for executing replay of the position of the inserted marker.

Each of the above-described means will now be described.

The browsing interface means Pg1 is triggered at the time when the power source is tuned on or by an actuation signal provided from an OS (operating system), and displays a starting semantic browsing screen (not shown), which is a default screen corresponding to the start, onto the display unit C15 (FIG. 1). Then, the browsing interface means Pg1 waits for an input by the user using the button on the starting semantic browsing screen. When an input is made by the user, the browsing interface means Pg1 provides interfaces with the respective means, as will be described later. The browsing interface means Pg1 also carries out data transmission/reception with the respective means and issues control instructions.

The details of the function of the browsing interface means Pg1 will be clarified in the following description.

The display screen organization means Pg2 receives the descrambled feature video image, the preview video image and the thumbnail picture. The display screen organization means Pg2 receives a layout instruction from the browsing interface means Pg1 and causes the display unit C15 to display a screen of the instructed constitution.

The descrambled feature video image is supplied from the descrambling section C14 and the thumbnail picture is supplied from the mass storage medium M1 or the high-speed storage unit C12 in which it is stored.

The preview video image is received from the mass storage medium M1 as a video image which is sent intermittently before and after a seek time or an idle time due to the occurrence of a latency time, or as a video image from which the idle time has been removed via the pre-reading control means Pg12.

The title intake means Pg3 receives, from the browsing interface means Pg1, intake instruction information organized by the browsing interface means Pg1 on the basis of a video image title intake instruction i1 inputted by the user, and takes therein the feature video image (motion picture image and sound) and the thumbnail picture (still image) received by the receiving section C10 and the meta information (data). The title intake means Pg3 records the feature video image and the thumbnail picture to the mass storage medium M1 and stores the meta information to the high-speed storage unit C12.

Alternatively, the title intake means Pg3 records the feature video image to the mass storage medium M1 and stores the meta information with the thumbnail picture incorporated therein to the high-speed storage unit C12.

The recorded or stored meta information is read out by the browsing interface means Pg1.

As the video image title, video images from any supply system such as CATV, the Internet broadcast or the package system as well as programs of radio broadcast such as ground wave broadcast or satellite broadcast may be employed.

The title control means Pg4 sends a trigger signal to the thumbnail picture replay means Pg5 to instruct display of a video image title. The title control means Pg4 receives a video image title selection input i2 from the user via the browsing interface means Pg1 and sends selected title information to the preview video image organization means Pg7.

On receiving the trigger signal from the title control means Pg4, the thumbnail picture replay means Pg5 reads out the thumbnail picture recorded on the mass storage medium M1 or the high-speed storage unit C12 and sends the thumbnail picture to the display screen organization means Pg2.

The feature video image replay control means Pg6 receives a feature video image replay instruction from the browsing interface means Pg1, or receives a preview/feature video image switch instruction i43 from the user via the preview/feature video image switch means Pg10, and receives current or designated replaying position information from the cursor control means Pg9. After that, the feature video image replay control means Pg6 sends the driving mechanism C13 a signal for controlling replay of the feature video image from the time code (i.e., recording position information) corresponding to the designated replaying position.

The preview video image organization means Pg7 receives the selected title information from the title control means Pg4, then receives a preview video image mode instruction i31 from the user via the browsing interface means Pg1, and also receives the semantic code (i.e., meta information) of the selected video image title from the browsing interface means Pg1. On the basis of a predetermined video image extraction condition provided therein, the preview video image organization means Pg7 selects extracted video images (shots or scenes) constituting the corresponding mode of the video image title. The preview video image organization means Pg7 sends the time code (i.e, recording position information) to the preview video image replay control means Pg8 and sends the accounting data to the accounting control means Pg11.

The video image extraction condition is led out from a "threshold value" on the basis of a predetermined algorithm. The predetermined algorithm is included in the preview video image organization means Pg7.

The "threshold value" is taken from the semantic code supplied from the browsing interface means Pg1. Normally, a default value is used as the "threshold value". However, if the "threshold value" is updated by the user, this updated "threshold value" is taken and used.

The preview video image replay control means Pg8 receives the time code from the preview video image organization means Pg7 or receives the preview/feature video image switch instruction i43 from the user via the preview/feature video image switch means Pg10, and receives the current or designated time code from the cursor control means Pg9. After that, the preview video image replay control means Pg8 sequentially sends the driving mechanism C13 a control signal for partially replaying the feature video image from the designated time code.

The cursor control means Pg9 receives a cursor shift input i24 from the user via the browsing interface means Pg1 and also receives the recording position information of each shot or each scene in the semantic code from the browsing interface means Pg1. The cursor control means Pg9 sends the time code of the scene or shot at the cursor position to the preview video image replay control means Pg8 or the feature video image replay control means Pg6.

The preview/feature video image switch means Pg10 receives the preview/feature video image switch instruction i43 from the user via the browsing interface means Pg1 and sends the current time code to either the feature video image replay control means Pg6 or the preview video image replay control means Pg8.

The accounting control means Pg11 receives the accounting data for the feature video image from the feature video image replay control means Pg6 or receives the accounting data for the preview video image from the preview video image organization means Pg7. On the basis of the contents of the received data, the accounting control means Pg11 sends the accounting section C18 a control instruction as to which of batched accounting and meter-rate accounting should be carried out for the feature video image or the preview video image.

In addition to the above-described processing, the browsing interface means Pg1 provisionally stores the accepted semantic code (including the default "threshold value") to the buffer memory. Moreover, on receiving a "threshold value" update input i44 from the user in the video image browsing viewing phase Ph4, the browsing interface means Pg1 updates the "threshold value" which is provisionally stored in the buffer memory.

In addition to the above-described processing, on receiving the a purchase instruction and viewing phase instruction input i32 from the user, the browsing interface means Pg1 sends the accounting data to the accounting control means Pg11 via the feature video image replay control means Pg6, and sends control instructions to the feature video image replay control means Pg6, the preview video image replay control means Pg8, the cursor control means Pg9 and the preview/feature video image switch means Pg10 so as to present the screen for video image browsing or the screen for feature video image full display replay.

On receiving a browsing start instruction i5 from the user during the feature video image full display replay, the browsing interface means Pg1 sends control instructions to the feature video image replay control means Pg6, the preview video image replay control means Pg8, the cursor control means Pg9 and the preview/feature video image switch means Pg10 so as to present the screen for video image browsing.

On receiving a feature video image full display instruction i45 from the user, the browsing interface means Pg1 sends a control instruction to the display screen organization means Pg2 so as to present the feature video image full screen display.

The operation of the video image replaying device VP1 will now be described.

As the user uses a button on the starting semantic browsing screen and inputs an intake instruction i1 for a video image from a broadcasting program or a network system, the browsing interface means Pg1 receives this instruction and updates the screen to the semantic browsing screen (control screen G1 shown in FIGS. 3 and 4) of the video image title intake recording phase Ph1. Then, the browsing interface means Pg1 sends video image title intake instruction information to the title intake means Pg3.

On receiving the video image title intake instruction information, the title intake means Pg3 sends a control signal to the receiving section C10 and takes therein the feature video image (motion picture image, sound and thumbnail picture (still image)) and the meta information (data) received by the receiving section C10. The title intake means Pg3 sends the feature video image and thumbnail picture to the driving mechanism C13 and records them to the mass storage medium M1. The title intake means Pg3 sends and records the meta information to the high-speed storage unit C12.

As the above-described intake of the video image title is repeated, for example, the feature video images vdt1 to vdt6 of six types of video image titles and their respective thumbnail pictures sdt1 to sdt6 are stored onto the mass storage medium M1.

The meta information mdt1 to mdt6 of the six types of video image titles are recorded in the high-speed storage unit C12. The meta information is not necessarily taken in together with the feature video image, but may be taken in at different timing from the intake of the feature video image or through a different system.

It is also possible to include the thumbnail picture in the meta information. In this case, the thumbnail picture is stored into the high-speed storage unit C12.

Then, as the user instructs the display of the video image title by remote controller input from the screen G1 (FIG. 3) of the video image title intake recording phase Ph1, the browsing interface means Pg1 takes this instruction, then shifts to the video image title selection phase Ph2, and sends an instruction to the title control means Pg4. The title control means Pg4 actuates the thumbnail picture replay means Pg5.

The thumbnail picture replay means Pg5 drives the driving mechanism C13, then reads out the thumbnail pictures sdt1 to sdt6 recorded on the mass storage medium M1, and sends the thumbnail pictures sdt1 to sdt6 to the display screen organization means Pg2. In the case where the thumbnail pictures sdt1 to sdt6 are stored in the high-speed storage unit C12, the thumbnail picture replay means Pg5 reads out the thumbnail pictures from the high-speed storage unit C12 and sends them to the display screen organization means Pg2.

The display screen organization means Pg2 distributes the inputted thumbnail pictures sdt1 to sdt6 to the respective windows and displays the them onto the display unit C15 via the browsing interface means Pg1. In this manner, a screen is displayed in which the thumbnail pictures (still images) of the respective video image titles appear in the six windows. This screen is the screen of the video image title selection phase Ph2 (i.e., screen G2 shown in FIGS. 3, 4 and 6).

Then, as the user inputs a selection input i2 for a desired video image title from this screen, the browsing interface means Pg1 receives the selected title information and holds and displays the selected title information on the screen.

Figure 6:
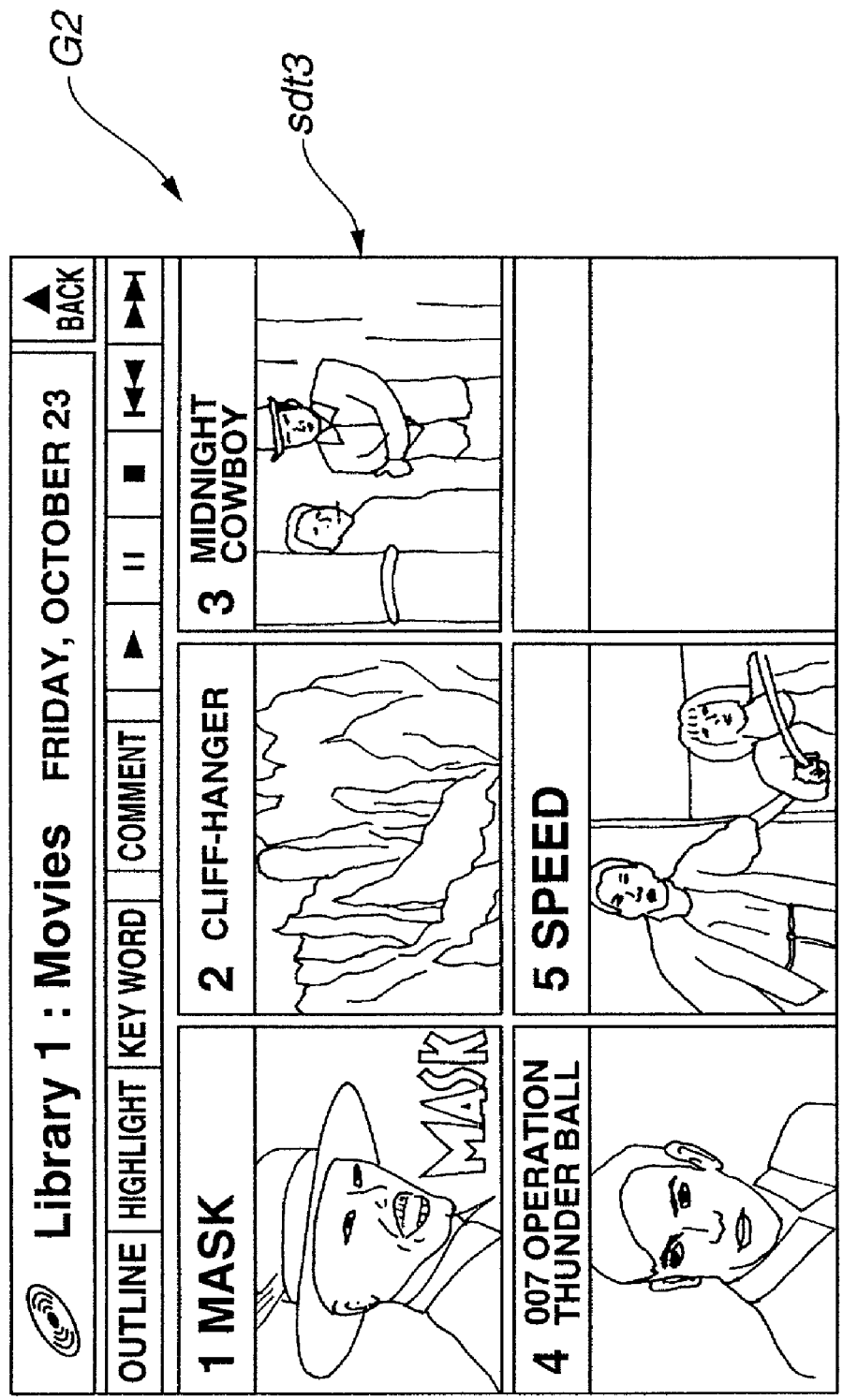
FIG. 6 shows an exemplary screen displayed in a video image title selection phase.

When the user inputs an instruction i31 of the preview video image mode of that video image title (using the button of "outline", "highlight" or the like shown in FIG. 6), the browsing interface means Pg1 shifts to the preview video image mode selection phase Ph3. Then, the browsing interface means Pg1 takes therein the meta information of the corresponding video image title from the high-speed storage unit C12 on the basis of the selected title information, and displays data related to the designated mode (e.g., the actor modes for two actors are prepared with respect to this video image title) and an introductory short text (text information) of the video image title onto the display unit C15. The video image title may be provided for each mode.

Figure 4:
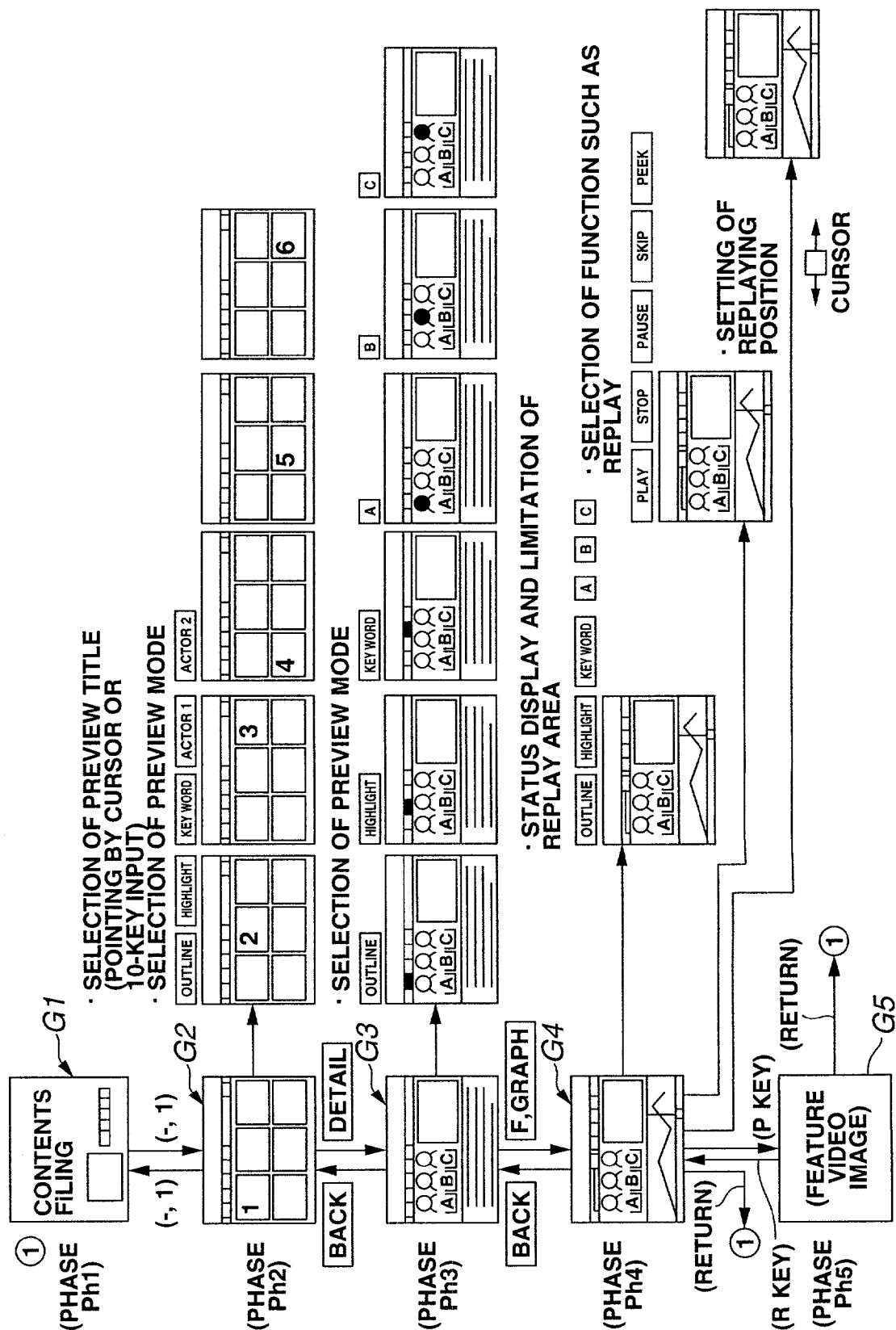
FIG. 4 is an explanatory view showing each operation phase and the structure of each control screen of one embodiment of the video image replaying device according to the present invention.
Figure 7:
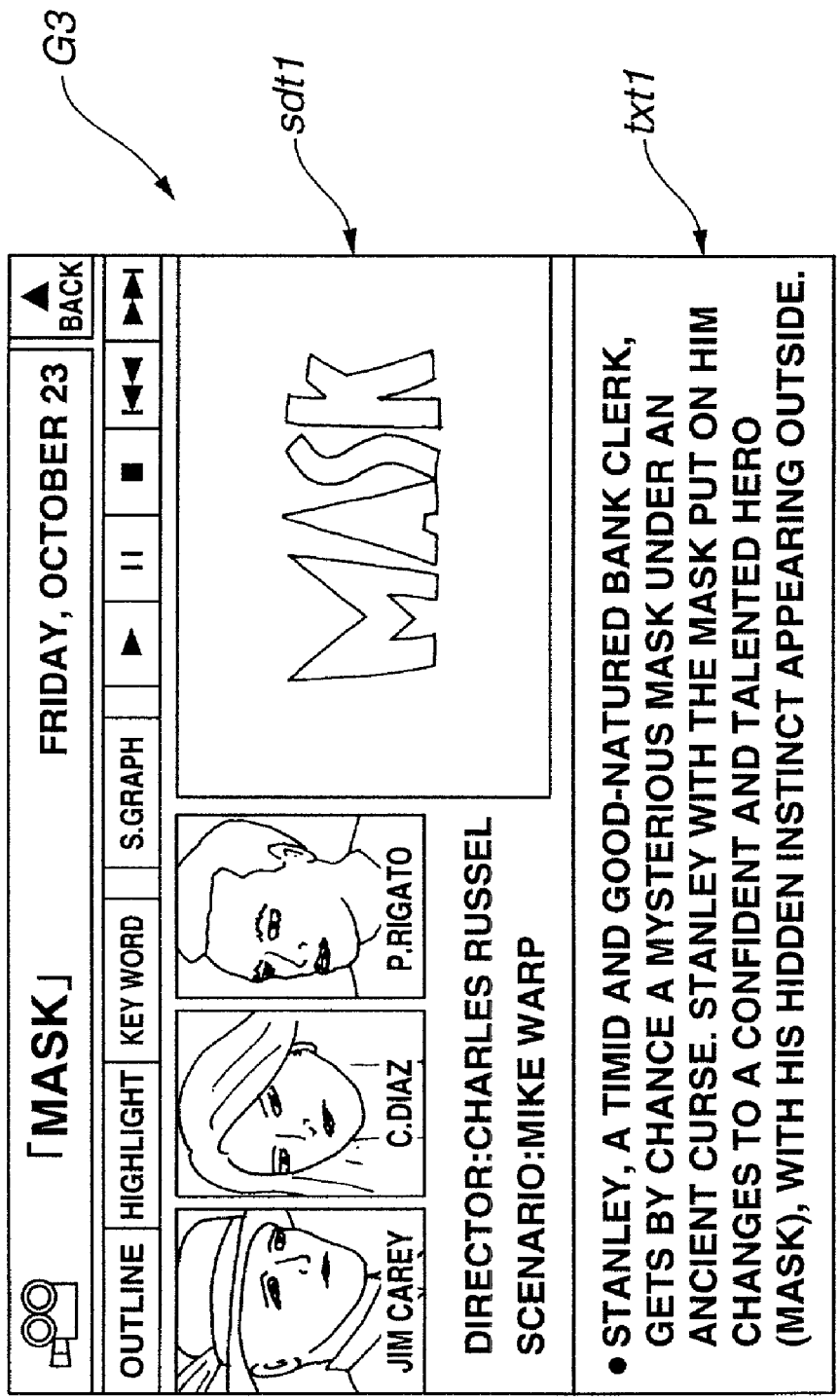
FIG. 7 shows an exemplary screen displayed in a preview video image mode selection phase.

This screen is the screen of the preview video image mode selection phase Ph3 (i.e., screen G3 shown in FIGS. 3, 4 and 7).

In this screen, mode selection/display buttons (buttons of "outline", "highlight" and the like shown in FIG. 7) and other buttons (e.g., "S. graph" button or a control button shown in FIG. 7), a window (area where sdt1 is displayed as shown in FIG. 7), and an introductory short text (txt1 shown in FIG. 7) are displayed.

At this stage, replay of the preview video image is not started yet. A still image of the video image title is displayed in the window on the screen. Of the mode selection/display buttons, the button corresponding to the mode designated in the previous phase is highlighted.

Then, as the user operates a control button to make an input to start replay of the preview video image, replay of the preview video image in this mode is started and motion picture images of the preview video image are displayed in the window.

Normally, accounting is not carried out for replay of the preview video image. However, it is possible to carry out accounting depending on the system.

When the buttons other than the highlighted button corresponding to the mode designated in the previous phase, of the mode selection/display buttons, are operated, the mode designated in the previous phase is canceled and automatically switched to a newly operated mode. Thus, replay of the preview video image in the latter mode is made possible.

As the user thus watches the preview video image of the video image title, then decides to purchase the feature video image of the video image title, and inputs an input i32 for designating either the video image browsing viewing phase Ph4 or the feature video image full screen viewing phase Ph5 as the viewing phase by using the corresponding button, the phase shifts from the preview video image mode selection phase Ph3 to either the video image browsing viewing phase Ph4 or the feature video image full screen viewing phase Ph5.

For example, in order to shift to the video image browsing viewing phase Ph4 at the same time as the decision to purchase, the user operates the corresponding button (in FIG. 7, "S. graph" button). Alternatively, in order to shift to the feature video image full screen viewing phase Ph5 at the same time as the decision to purchase, the user operates the corresponding button (in FIG. 7, "MASK" button).

When the shift to the vide browsing viewing phase Ph4 is made, the semantic browsing screen (screen G4 shown in FIGS. 3, 4 and 8) of the video image browsing viewing phase Ph4 is displayed. This screen G4 includes a selected mode confirmation button, a window for displaying the preview video image or the feature video image, a semantic graph of the whole feature video image, the position of the preview video image, and a cursor. This screen G4 is displayed on the display unit C15.

Figure 5:
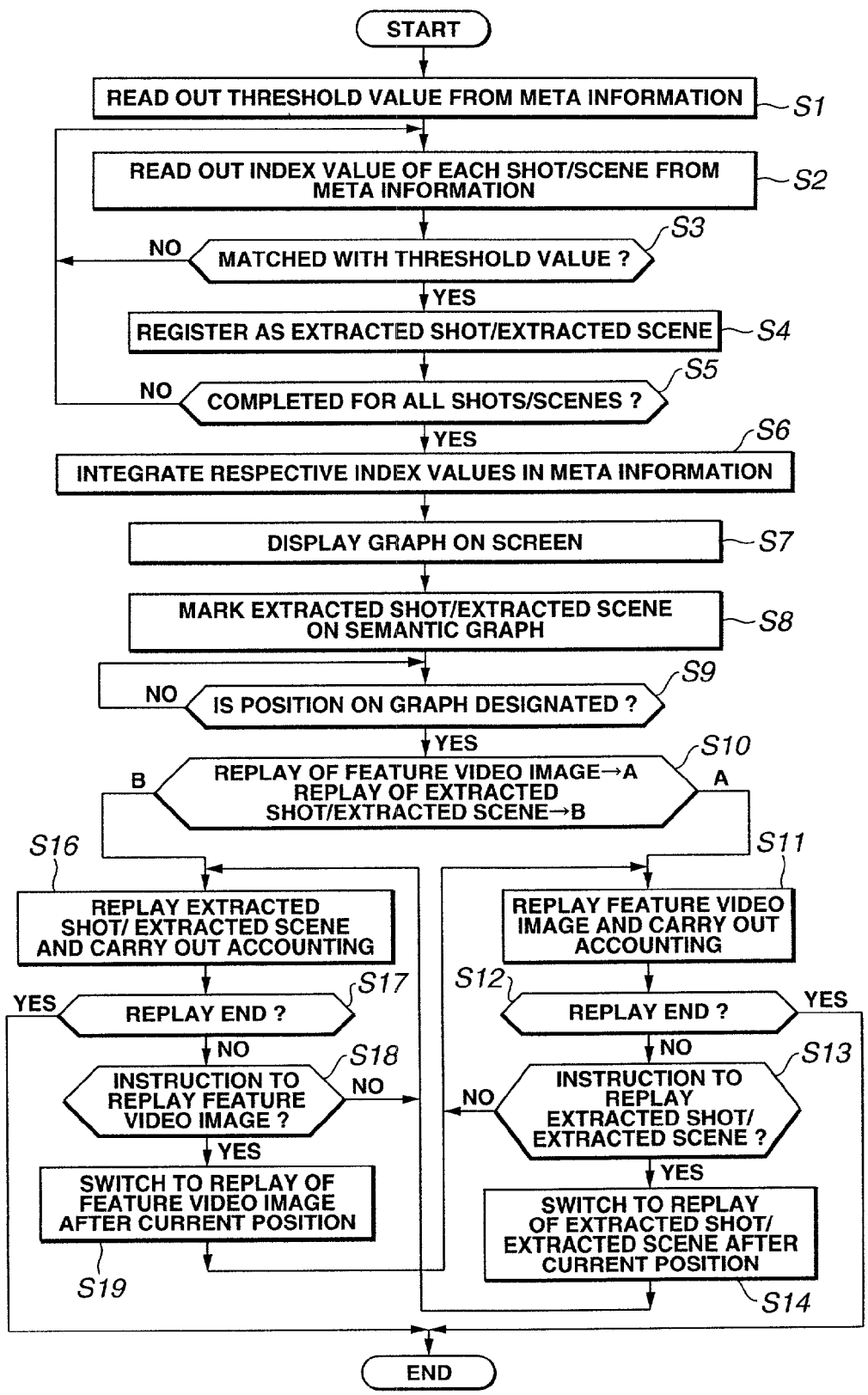
FIG. 5 is a flowchart showing the operation of one embodiment of the video image replaying device according to the present invention.

The operation of the video image browsing viewing phase Ph4 will be described with reference to the flowchart of FIG. 5.

The browsing interface means Pg1 sends the selection mode information and the meta information to the preview vide organization means Pg7. The preview video image organization means Pg7 reads out the threshold value from the meta information (step S1), and reads out the index value of each shot or each scene (step S2). The preview video image organization means Pg7 extracts a shot or a scene matched with the threshold value from among the shots or scenes (step S3) and registers the extracted shot or extracted scene (step S4). This processing is executed for all the shots or scenes (step S5).

The browsing interface means Pg1 integrates the index values of the respective shots or scenes taken out from the meta information (step S6) and displays on the screen the result of integration as a semantic graph of the video image title (step S7).

Then, a mark is put at the position on the semantic graph corresponding to each extracted scene or extracted shot registered by the preview video image organization means Pg7 (step S8). At the same time, the slidable cursor is displayed at an initial position.

If the user shifts the cursor to a desired position on the semantic graph, the position on the semantic graph is designated by the cursor control means Pg9 (step S9). If the user does not shift the cursor, the initial position is regarded as the designated position.

Then, the browsing interface means Pg1 waits for either the start of replay of the preview video image or the start of replay of the feature video image in accordance with a replay start instruction i41 from the user (step S10).

If the instruction for replay of the feature video image is inputted in accordance with the replay start instruction i41, the browsing interface means Pg1 sends a control instruction to the feature video image replay control means Pg6 and replay of the descrambled feature video image is started at the position of the cursor. At the same time, the feature video image replay control means Pg6 sends a control instruction to the accounting control means Pg11. On the basis of this control instruction, the accounting control means Pg11 instructs the accounting section C18 to carry out accounting processing, thus carrying out either batched accounting or meter-rate accounting for this replay of the feature video image (step S11).

Then, replay of the feature video image is continued at step S11 while monitoring whether the feature video image has ended or not (step S12) and also monitoring whether a preview/feature video image switch instruction i43 is inputted or not (step S13).

If the feature video image ends (step S12), the operation ends.

If the preview/feature video image switch instruction i43 is inputted (step S13), the preview/feature video image switch means Pg10 determines that it is the instruction to replay the preview video image after the current position, and instructs the preview video image replay control means Pg8 to shift to step S16 (step S14). Thus, browsing from the feature video image to the preview video image is carried out.

On the other hand, if the preview replay start instruction i41 is inputted in accordance with the replay start instruction i41 at step S10, the preview video image organization means Pg7 sends the time code of the extracted shot nearest to the cursor position, which is read out from the meta information, to the preview video image replay control means Pg8. The preview video image replay control means Pg8 sends a control signal for instructing replay of the scene of the time code to the driving mechanism C13 and also sends an actuation signal to the descrambling section C14.

The signal which is read out and replayed by the driving mechanism C13 is descrambled by the descrambling section C14 and buffered by the pre-reading control means Pg12. The signal then is organized to a window size by the display screen organization means Pg2 and is displayed in the window of the screen of the display unit C15 via the browsing interface means Pg1 (step S16).

If the disclosure level of the preview video image is suitable for accounting, the preview video image organization means Pg7 inputs a preview accounting signal to the accounting control means Pg11. On the basis of this preview accounting signal, the accounting control means Pg11 instructs the accounting section C18 to carry out accounting processing (step S16).

Then, replay of the preview video image is continued at step S16 while monitoring whether the preview vide has ended or not (step S17) and also monitoring whether the preview/feature video image switch instruction i43 is inputted or not (step S18).

If the preview video image ends (step S17), the operation ends.

If the preview/feature video image switch instruction i43 is inputted (step S18), the preview/feature video image switch means Pg10 determines that it is the instruction for replay of the feature video image after the current position, and shifts to step S11 so as to input the current time code to the feature video image replay control means Pg6 (step S19).

At the same time, the operation of the preview video image organization means Pg7 is stopped. After that, replay of the feature video image is continuously carried out.

Thus, browsing from the preview video image to the feature video image is carried out.

If the user inputs a cursor shift instruction i42 in the above-described process, interrupt handling is carried out to enter step S9. The cursor control means Pg9 sends the time code of the shot corresponding to that position to the feature video image replay control means Pg6 in the case of replay of the feature video image, or sends the time code to the preview video image replay control means Pg8 in the case of replay of the preview video image.

The feature video image replay control means Pg6 sends the driving mechanism C13 an instruction to replay from the shot of the updated time code. Since the feature video image is being replayed, it is not necessary to newly send an actuation signal to the descrambling section C14. The subsequent feature video image replay operation is similar to the above-described operation.

Alternatively, the preview video image replay control means Pg8 sends the driving mechanism C13 an instruction to replay from the extracted shot which is nearest to the updated time code. The subsequent preview video image replay operation is similar to the above-described operation.

The structure and operation of the video image replaying device VP1 according to the present embodiment are described above. Next, an embodiment of the screen control device and method will be described.

The screen control device according to the present embodiment includes the semantic browser means C1 which is constituted as a computer-readable/executable program, described in the foregoing embodiment, and a microcomputer, not shown, for reading and executing the program.

The semantic browser means C1 displays a feature video image consisting of continuous video images, as a second screen, and displays a preview video image consisting of plural sets of extracted video images obtained by extracting predetermined parts of the feature video image, as a first screen.

In the first screen, at least a first video image display area, a first video image transition display area and a first switch input area are displayed. In this case, the display screen organization means Pg2 displays the preview video image in the first video image display area on the basis of the result of selection and replay by the preview video image organization means Pg7 and the preview video image replay control means Pg8 shown in FIG. 2.

In the first video image transition display area, the browsing interface means Pg1 arranges and displays a video image transition graph showing the transition of the video image recording position of the feature video image and a mark superimposed on the video image transition graph at the video image recording position corresponding to each extracted video image.

Also, in the first video image transition display area, a cursor indicating the current video image recording position of the currently displayed preview video image is superimposed on the video image transition graph and constantly updated with the lapse of time, as the browsing interface means Pg1 sends information to the cursor control means Pg9.

This cursor is shifted to an arbitrary position in response to a cursor shift input i42 from the user. Specifically, as the browsing interface means Pg1 sends cursor shift information to the cursor control means Pg9 in response to the cursor shift input i42, the cursor control means Pg9 controls the current position on the basis of the cursor shift information.

Moreover, the browsing interface means Pg1 displays a first button for inputting an instruction for transition from the first screen to the second screen displayed in the continuous video image display phase, in the first switch input area, while cutting our and holding the current video image recording position at designated timing. The result of operation of this button is processed by the preview/feature video image switch means Pg10.

Similarly, in the second screen, at least a second video image display area, a second video image transition display area and a second switch input area are displayed. In this case, the display screen organization means Pg2 displays the feature video image in the second video image display area on the basis of the result of replay by the feature video image replay control means Pg6.

In the second video image transition display area, the browsing interface means Pg1 displays a video image transition graph showing the transition of the video image recording position of the feature video image.

By an instruction from the user, it is possible to superimposed and display a mark on the video image transition graph displayed in the second video image transition display area, at the video image recording position corresponding to each of the extracted video images.

Also, in the second video image transition display area, a cursor indicating the current video image recording position of the currently displayed feature video image is superimposed on the video image transition graph and constantly updated with the lapse of time, as the browsing interface means Pg1 sends information to the cursor control means Pg9.

This cursor is shifted to an arbitrary position in response to a cursor shift input i42 from the user. Specifically, as the browsing interface means Pg1 sends cursor shift information to the cursor control means Pg9 in response to the cursor shift input i42, the cursor control means Pg9 controls the current position on the basis of the cursor shift information.

Moreover, the browsing interface means Pg1 displays a second button for inputting an instruction for transition from the second screen to the first screen showing the preview video image, in the second switch input area, while cutting out and holding the recording position of the currently displayed feature video image at designated timing. The result of operation of this button is processed by the preview/feature video image switch means Pg10.

In this manner, the browsing interface means Pg1 shifts between the extracted video image display phase and the feature video image display phase on the basis of each instruction inputted during the display of the first button or the second button and thus displays either the first screen or the second screen.

With the above-described constitution, the transition of the video image recording position of the feature video image is shown by the video image transition graph displayed in the first video image transition display area in the extracted video image display phase, and the structure of the whole feature video image is thus presented. By superimposing the mark on the video image transition graph at the video image recording position corresponding to each extracted video image, the positional relation of the respective extracted video images in the whole feature video image is clarified.

Also, the shift of the current position with the lapse of time of the extracted video image being displayed in the first video image display area is constantly updated by automatic shift of the cursor on the video image transition graph, and the state of shift of the current position on the video image transition graph is thus clarified.

Moreover, if the cursor is shifted to an arbitrary position on the video image transition graph, the recording position information of the shot or the scene corresponding to that position on the video image transition graph is referred to and the extracted video image nearest to the recording position information is sequentially replayed in the first video image display area.

At the point when an instruction to operate the first button is inputted, the current position indicated by the cursor is cut out and held, and transition is made from the currently displayed first screen of the preview video image to the second screen showing the feature video image. Thus, replay and display of the feature video image corresponding to the position of the cursor that has been held is carried out.

Similarly, the transition of the video image recording position of the feature video image is shown by the video image transition graph displayed in the second video image transition display area in the continuous video image display phase, and the structure of the whole feature video image is thus presented.

Also, the shift of the current position with the lapse of time of the feature video image being displayed in the second video image display area is constantly updated by automatic shift of the cursor on the video image transition graph, and the state of shift of the current position on the video image transition graph is thus clarified.

Moreover, if the cursor is shifted to an arbitrary position on the video image transition graph, the recording position information of the shot or the scene corresponding to that position on the video image transition graph is referred to and the video image after the recording position of the corresponding feature video image is sequentially replayed in the second video image display area.

At the point when an instruction to operate the second button is inputted, the current position indicated by the cursor is cut out and held, and transition is made from the currently displayed second screen to the first screen showing the preview video image. Thus, replay and display of the nearest extracted video image corresponding to the position of the cursor that has been held is carried out.

In this manner, as the instruction to operate the first button or the second button is inputted, transition is made between the first screen displaying the preview view and the second screen displaying the feature video image while the current position indicated by the cursor at that timing is cut out and held.

The structure and method for screen control of the video image replaying device VP1 according to the present embodiment are described above. The structure of the main screen will be described hereinafter.

Figure 8:
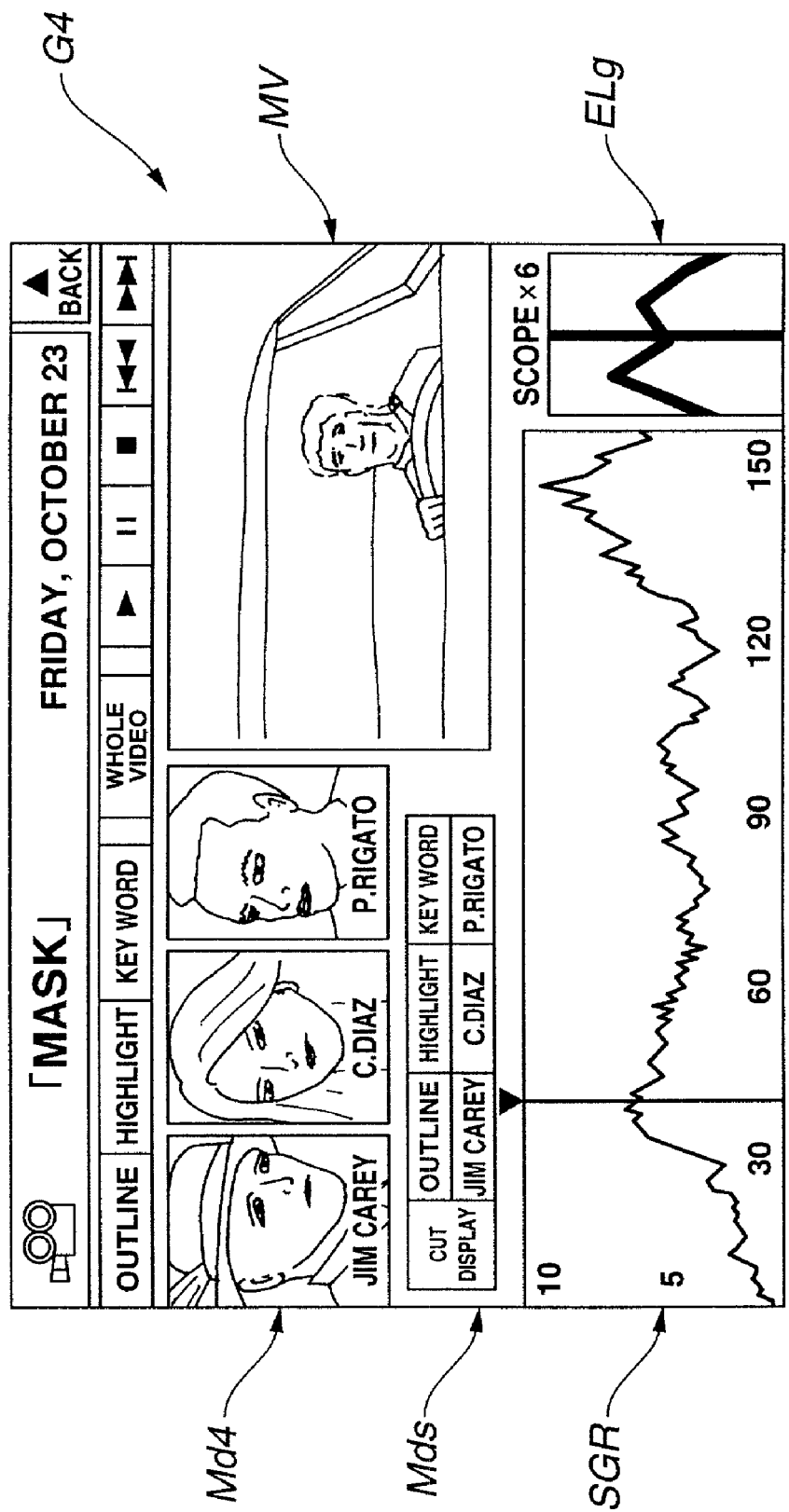
FIG. 8 shows an exemplary screen displayed in a video image browsing viewing phase.

FIG. 4 is an explanatory view showing each operation phase and the structure for each control screen of the video image replaying device VP1. FIGS. 6 to 8 show exemplary main screens.

As shown in FIG. 4, in the video image title intake recording phase Ph1, a control screen G1 for contents filing is displayed. When a desired video image title is taken in, transition is made to the video image title selection phase Ph2.

FIG. 6 shows an example of the control screen G2 displayed in the video image title selection phase Ph2 in FIG. 4. There are six windows at the center of the screen, in which thumbnail pictures sdt1 to sdt6 of the respective video image titles are displayed. Selection of a desired video image title is carried out by pointing and clicking an upper end part of each window with the cursor or by ten-key input.

In the display of FIG. 6, the third video image title having the thumbnail picture sdt3 is selected.

Clicking twice in the window causes an effect that the replay start input i41 (FIG. 2) is generated in this phase Ph2. Thus, transition to the feature video image full screen viewing phase Ph5 is immediately made by the processing by the browsing interface means Pg1 and full screen replay of this video image title is started.

If the video image title is selected by clicking at the upper end part of the window and then one of the preview video image mode selection buttons in the upper second row is selected, transition to the preview video image mode selection phase Ph3 is automatically made after a time lag for confirmation.

Alternatively, it is possible to constitute the preview video image mode in a preset form. In this case, transition to the preview video image mode selection phase Ph3 is automatically made as soon as the video image title is selected.

FIG. 7 shows an example of the semantic browsing screen G3 displayed in the preview video image mode selection phase Ph3 in FIG. 4. This screen is displayed when "MASK" is selected as the video image title. The name of the video image title "MASK" is presented in the uppermost row, and the mode selection/display buttons ("outline", "highlight" and the like in FIG. 7) are arranged on the left side in the second and third rows.

Moreover, the thumbnail picture sdt1 of the video image title "MASK" is presented in the window on the right side in the third row, and the introductory text txt1 of the video image title "MASK" is presented in the bottom row.

At this stage, replay of the preview video image is not started yet, and the thumbnail picture sdt1 displayed in the window of the screen is the still picture of the video image title "MASK". Of the mode selection/display buttons, the button corresponding to the mode designated in the previous video image title selection phase Ph2, that is, the "outline" button in FIG. 7, is highlighted.

The mode selection/display button itself has a display effect. The button of the mode selected in the video image title selection phase Ph2 is lit. Thus, the user can confirms the selected mode.

Then, when the user operates a control button in the window of the screen so as to make an input to start replay of the preview video image, replay of the preview video image of this mode is started and motion picture images of the preview video image of the "outline" mode of the video image title "MASK" are displayed in the window.

If clicking is made in the window during replay of the preview video image, the preview video image is displayed on the entire screen. If clicking is made in the screen during this full screen replay, the window appears again and restores the original screen.

Normally, accounting is not carried out for this replay of the preview video image. However, it is possible to employ a system where accounting is carried out.

When the buttons other than the highlighted "outline" of the mode selection/display buttons are operated, the "outline" mode designated in the previous phase is canceled and automatically switched to the newly operated "highlight" mode. Thus, replay of the preview video image in the latter mode is made possible.

In this manner, the mode can be changed by operating the mode selection/display buttons. The display of the thumbnail picture in the window can be changed for each mode.

As the user thus watches the preview video image of a desired mode on this screen or watches the preview video images of various modes, then decides to purchase, and operates the "S1. graph" button, the screen shifts to the video image browsing viewing phase Ph4.

Alternatively, as the user decides to purchase and operates the button of "MASK", there is caused an effect that the replay start input i41 (FIG. 2) is generated in this phase Ph3. Transition to the feature video image full screen viewing phase Ph5 is immediately made by processing by the browsing interface means Pg1, and full screen replay of this video image title is started.

Figure 9:
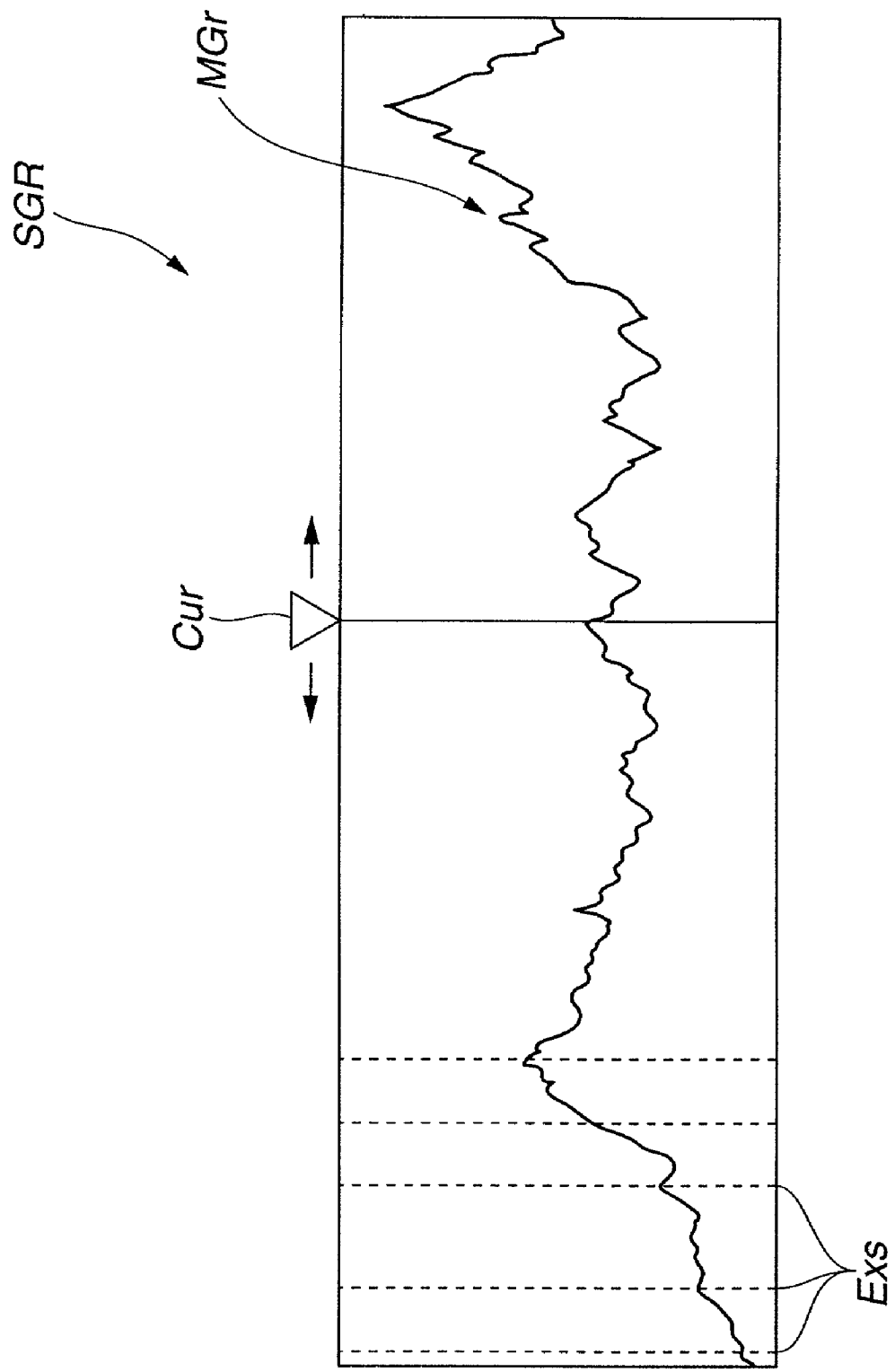
FIG. 9 is an explanatory view showing the structure of a semantic graph.

When transition to the video image browsing viewing phase Ph4 is made, a semantic browsing screen G4 of the video image browsing viewing phase Ph4 as shown in FIG. 8 is displayed. FIG. 9 is an explanatory view showing a semantic graph in the semantic browsing screen G4.

The uppermost row in the semantic browsing screen G4 is a title display section, where the name of title of the contents "MASK", genre and date are displayed and a "back" button is provided. The left side in the second row and the left side in the third row are a replay button section for each mode Md4, where "outline", "highlight", "key word", "actor A1", "actor A2" and "actor A3" buttons for preview modes and a "whole video image" button for replay of the feature video image are provided. By operating these buttons, the display of status and the replay area are limited. For example, the summary video image described with reference to FIGS. 20 A to 20C is displayed by operating the "outline" button. The summary video images of the highlight summaries for the respective actors described with reference to FIGS. 21A to 21G are selectively displayed by operating the "actor A1", "actor A2" and "actor A3" buttons.

The right side in the second row is a movie play button section, where five function buttons for movie control are arranged. These buttons are used for selecting the respective functions such as replay. These buttons will be described in the order from the leftmost button.

A "playback" button: if this button is selected and executed during a stop period, replay starts at the beginning of the replay phase. If this button is selected and executed during pause, replay starts at the time point of pause.

A "pause" button: if this button is selected and executed during replay, a still image of the movie at that time point is displayed.

A "stop" button: if this button is selected and executed during replay or during pause, a still image of the title (initial state) is displayed.

A "return" button: if this button is selected and executed during replay, replay returns to and starts again at the beginning of the currently replayed scene. If the execution button is pressed a plurality of times, replay returns for the scenes corresponding to the number of times of pressing and starts at the beginning of the scene thus reached. In the case of the preview mode, the scenes are often discontinuous and the scenes included in that mode are counted. If this button is selected and executed during pause, the displayed scene is shifted in conformity with the same rule as in the case of replay and a still image at the beginning of the corresponding scene is displayed. If this button is selected and executed during a stop period, no operation is carried out.

A "feed" button: if this button is selected and executed during replay, replay starts at the beginning of the scene next to the currently replayed scene. If the execution button is pressed a plurality of times, replay skips the scenes corresponding to the number of times of pressing and starts at the beginning of the scene thus reached. In the case of the preview mode, the scenes are often discontinuous and the scenes included in that mode are counted. If this button is selected and executed during pause, the displayed scene is shifted in conformity with the same rule as in the case of replay and a still image at the beginning of the corresponding scene is displayed. If this button is selected and executed during a stop period, no operation is carried out.

By selecting and executing these buttons through a remote controller or keyboard, replay in the corresponding phase is started. If, after pause in one replay phase, another replay phase is selected and executed, replay of the new phase starts at the position of the scene of pause (see state transition of FIG. 4). Depending on the set, the number of buttons on the screen can be reduced by providing the buttons directly on the remote controller.

On the right side in the third row, a movie screen section MV is provided in a window.

The feature video image or the preview video image is displayed in this window. In the initial state before execution of the playback button, a thumbnail still picture as the cover of the video image title is displayed.

On the left side in the fourth row, extracted scene display selection buttons (cut display buttons) MdS corresponding to the respective preview video image modes are provided. If a cut display button of an arbitrary preview video image mode is pressed during replay of the feature video image, the position of the extracted scene of that mode can be displayed in the form of a vertical strip on a semantic graph SGR provided in the bottom row. By moving a cursor slider section to the left and right with reference to the semantic graph SGR, viewing of the feature video image can be continued from a preferred scene. That is, the replaying position can be set.

In the bottom row, the semantic graph SGR shown in FIG. 9 is displayed.

The semantic graph SGR includes a main graph MGr as a segmented graph representing the course of the story of the video image title, produced by integrating the index values (e.g., evaluation values) of the respective shots or scenes along with the temporal transition, a cursor Cur indicating the current replaying position of the video image and having a slider section for movement (in FIG. 9, triangular portion on the top), and an extracted scene strip Exs indicating the position of the extracted scene included in the preview video image mode, in the form of a vertical strip.

The abscissa of the main graph MGr represents the scenes of the feature video image as the units and the ordinate represents the integration value of the evaluation values, that is, of the scene scores. In the example of the film "MASK" as actual example, a feature video image of 1 hour, 34 minutes, 35 seconds is divided into 150 scenes and the maximum value of the main graph MGr is 9.8.

The scene scores, which are provided conditions, have negative and positive values dispersed from −1 to 0 and further to +1. In the case of complication in the semantic evaluation, the scene score has a positive value. On the other hand, in the case of tranquillization in the semantic evaluation, the scene score has a negative value. Therefore, a rightward ascent at an acute angle means large complication of the scene, and a rightward descent at an acute angle means large tranquillization of the scene.

Marks are put on main peaks of the main graph MGr.

An upward slope and a downward slope constituting a main peak roughly represent one episode included in the story. From peak and valley patterns of the graph, the introductory part of the story (introduction), the development of various episodes (development), the climax (change), and the finale (conclusion) are grasped. These peaks can be interpreted as follows. The upward slope to the first peak corresponds to the introductory part (introduction). The subsequent plural peaks represent the development of episodes (i.e., development). The upward slope to the last peak represents the climax (change), and the portion following the last peak represents the finale (conclusion). From acute upward and downward slopes of the graph, dramatic development of the story can be anticipated. From a long upward slope, increase in tension and development of a large episode can be anticipated. From a long downward slope, pause of a large episode and solution of a problem can be considered.

The abscissa of the main graph MGr may represent the time code of the start or end point of the scenes, in place of the scenes. By showing the time code on the abscissa, the inclination of the scenes in the graph changes relatively, but the relation of upward and downward slopes and the value on the ordinate do not change. The interpretation of the graph can be carried out similarly to the above-described interpretation.

The cursor Cur shifts along with replay of the video image and displays the position of the scene in which the currently displayed video image is included. By sliding the slider section on the top of the cursor to the left and right, an arbitrary scene can be selected while watching the main graph MGr.

If the cursor is slid during replay of the feature video image, the replaying position is updated and replay is resumed at the position of the cursor at the end point of sliding. If the similar operation is carried out during pause, a still image at the cursor position at the end point of the operation is displayed.

On the other hand, if the similar operation is carried out during replay of the preview video image, replay of the preview video image is continued from the scene at the cursor position at the end point of the operation or the nearest scene subsequent thereto. If the similar operation is carried out during pause, a still image of the scene at the cursor position at the end point of the operation or the nearest scene subsequent thereto is displayed.

To display the details of the graph of the current time point, an enlarged graph ELg can be provided which displays a partially enlarged view of a portion around the cursor position on a predetermined scale. In FIG. 8, an enlarged graph on the scale of 6 is displayed. In this case, the vertically extending cursor is fixed and the graph at the back shifts to the left along with the progress of replay. The point of intersection between the enlarged graph and the cursor is coincident with the point of intersection with the cursor in the main graph.

By using the extracted scene display selection buttons MdS for the preview video image, the display mode of the extracted scene of the preview video image to be displayed on the main graph MGr can be selected. The type of the extracted scene display mode is coincident with the preview video image replay mode. In the example shown in FIG. 8, "outline", "highlight", "key word", "actor A1 (Jim Carey)", "actor A2 (C. Diaz)", and "actor A3 (P. Rigato)" modes are prepared.

In the browsing between the preview video image and the feature video image, transition from the replaying position of the preview video image to replay of the corresponding feature video image, and transition from the replaying position of the feature video image to replay of the corresponding preview video image can be made. Specifically, the following operation is carried out.

By pressing the "pause" button during replay of the preview video image and then pressing the "whole video image" button, transition to continuous replay of the feature video image from the beginning of the currently replayed scene of the preview video image can be made.

Similarly, by pressing the "pause" button during replay of the feature video image and then pressing one of the preview replay buttons Md4, transition to replay of the preview video image scene belonging to the currently replayed scene of the feature video image or the nearest scene subsequent thereto can be made.

Also, by pressing the "pause" button during replay of the preview video image of one mode and then pressing another button, the similar operation is carried out. For example, it is the case where after replay is carried out halfway in the "outline" mode, the "pause" button is pressed and then the preview replay button of the "actor A2" mode is pressed.

In this case, the scene of the pause might not be included in the scene of the preview video image of the next preview mode, that is, the "actor A2" mode in this example. In such case, transition to replay of the preview video image scene of the "actor A2" mode belonging to the nearest scene subsequent to the scene of the pause is made.

In replay of the whole video image, clicking an arbitrary place in the movie screen section MV causes an effect that the replay start input i41 (FIG. 2) is generated in this phase Ph4. Transition to the feature video image full screen viewing phase Ph5 is immediately made by processing by the browsing interface means Pg1 and full screen replay of this video image title is started. Thus, it is possible to view the feature video image on the full screen. Also, clicking an arbitrary place during full screen replay, it is possible to return to the browsing screen of FIG. 8.

As described above, according to the present invention, in viewing a video image title having a story such as a movie, a television drama or a documentary program, the flow of complication and tranquillization of the story can be intuitively grasped through the semantic graph, and the level of appreciation can be improved by viewing motion picture images while grasping the development of the whole story and the development of episodes.

Through the browsing function between the preview video image and the feature video image, new ways to appreciate the video image title based on the characteristics of the story can be realized, for example, by understanding the outline of the story through the preview video image and then thoroughly watching the feature video image of a desired part, or by continuously replaying feature video image scenes of only the necessary part and then summarizing the other parts through the preview video image.

As the preview video images of various modes can be selected, title selection and video image retrieval can be carried out in view of the viewer's preference. Since the scene belonging to the preview video image is necessarily included in the feature video image, it is possible to shift from a desired part of the preview video image to the feature video image corresponding to that part.

By moving the cursor slider while watching the semantic graph, the video image can be quickly shifted to a desired part in the flow of the story.

Moreover, by changing the threshold value of the semantic score while watching in the video image browsing viewing phase Ph4, the time of the preview video image of each mode can be adjusted and preview video images in accordance with the user's preference can be utilized such as a more detailed preview video image or a simple short-time preview video image.

Next, a computer-readable recording medium as an embodiment of the present invention has recorded thereon a program for causing a computer to function as the semantic browser means shown in FIG. 2.

As the recording medium, a data carrier unit such as a flexible disk or a memory stick can be used as well as a read-only semiconductor memory chip (ROM chip).

The function generated when this computer-readable recording medium is read and executed by the computer is similar to the function of the semantic browser means C1 and therefore will not be described further in detail.

A marker function will now be described.

Figure 10:
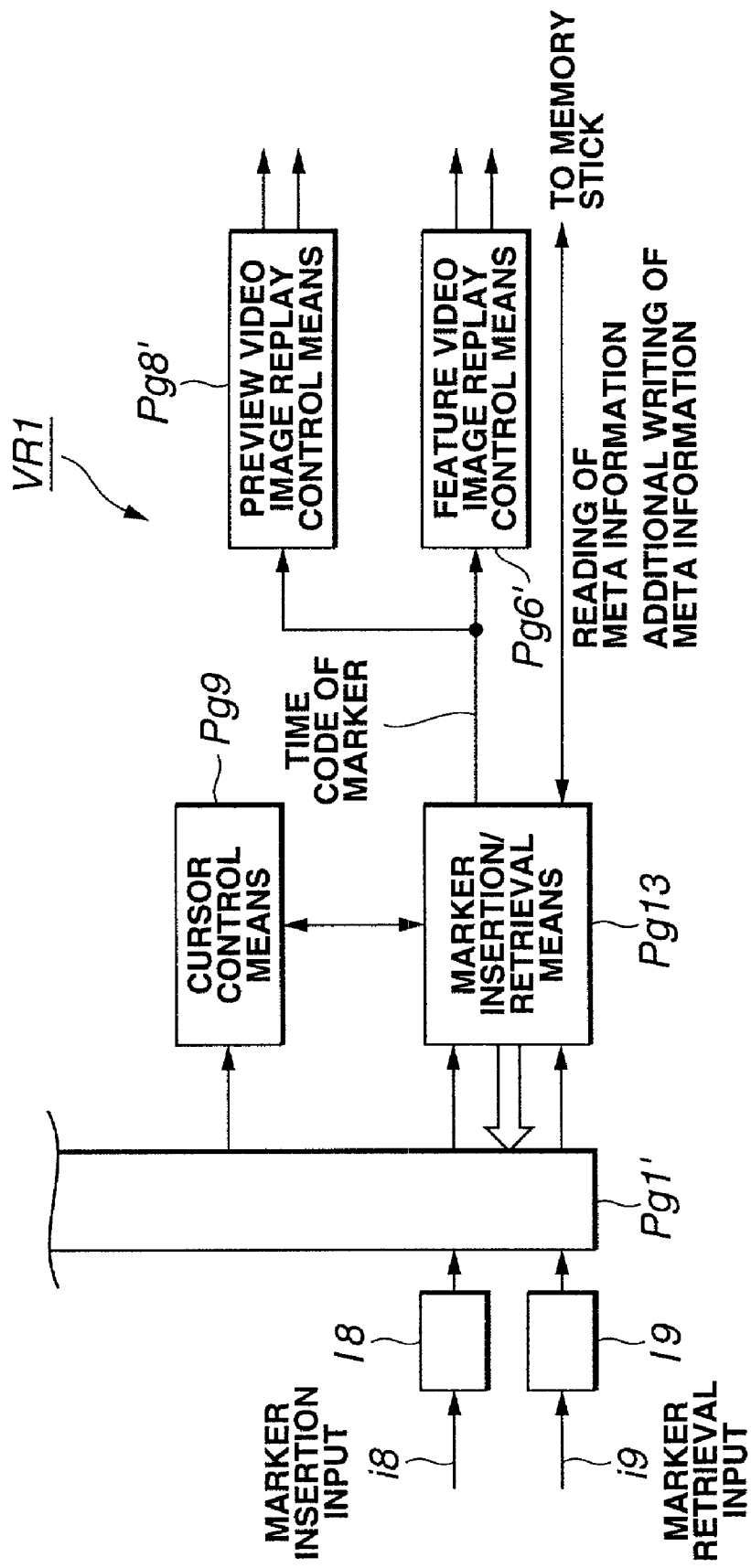
FIG. 10 is a block diagram showing the structure of an essential portion for processing of a marker.

FIG. 10 is a block diagram showing the structure of an essential portion for marker processing, of a video image information recording device according to an embodiment of the present invention. The same parts as in the previous embodiment are not shown in the drawing.

As shown in FIG. 10, a video image information recording device VR1 according to the present embodiment has browsing interface means Pg1' having an interface function and displaying, as a semantic graph, the recording position information of respective shots or scenes of the feature video image and the value obtained by sequentially integrating index values of the respective shots or scenes on the basis of meta information having the index values of the respective shots or scenes, cursor control means Pg9 for designating an arbitrary position on the graph, marker insertion input means PgI8 for using the designated position on the graph as the position to insert a marker, and marker insertion/retrieval means Pg13 for additionally recording to the meta information at least the recording position information corresponding to the designated position on the graph as the marker position.

The marker insertion operation will now be described. The semantic graph produced by sequentially integrating the index values by the browsing interface means Pg1' is displayed on the screen. The user shifts the cursor managed by the cursor control means Pg9 and stops the cursor at a desired position where the user wants to insert a marker. As the user in this state operates the marker insertion input means I8 to makes an input iS for marker insertion, the time code corresponding to the cursor position on the semantic graph is additionally recorded to the meta information as the marker position by the marker insertion/retrieval means Pg13, and this marker position is saved into the memory stick or the high-speed storage unit. The recording position information related to the marker position is read out at arbitrary timing.

A video image replaying device capable of detecting a marker according to the present invention has browsing interface means Pg1' having an interface function and displaying, as a semantic graph, the recording position information of respective shots or scenes of the feature video image and the value obtained by sequentially integrating index values of the respective shots or scenes on the basis of meta information having the index values of the respective shots or scenes, cursor control means Pg9 for designating an arbitrary position on the graph, marker retrieval input means PgI9 for instructing retrieval of a marker, and marker insertion/retrieval means Pg13 for reading out the marker position from the meta information saved in the memory stick or the high-speed storage unit, as shown in FIG. 10.

The marker detection operation will now be described. As the user makes an input for marker retrieval i9 from the marker retrieval input means 19 in the state where the browsing interface means Pg1' is displaying the semantic graph, the marker insertion/retrieval means Pg13 reads out the meta information file in the memory stick M2 and retrieves the time code of the marker. Then, the marker insertion/retrieval means Pg13 inputs the time code to feature video image replay control means Pg6' or preview video image replay control means Pg8' so as to execute replay of the feature video image or the preview video image from the marker position.

Furthermore, the time code of the marker is inputted from the marker insertion/retrieval means Pg13 to the browsing interface means Pg1', and the browsing interface means Pg1' displays the marker position on the currently displayed semantic graph, using an appropriate mark. As the start of replay is instructed in this state, the cursor is moved to the marker position by the cursor control means Pg9 and replay is started.

A computer-readable recording medium according to the present invention has recorded thereon a program for causing a computer to function as browsing interface means Pg1' having an interface function and displaying, as a semantic graph, the recording position information of respective shots or scenes of the feature video image and the value obtained by sequentially integrating index values of the respective shots or scenes on the basis of meta information having the index values of the respective shots or scenes, cursor control means Pg9 for designating an arbitrary position on the graph, marker insertion input means PgI8 for using the designated position on the graph as the position to insert a marker, and marker insertion/retrieval means Pg13 for additionally recording to the meta information at least the recording position information corresponding to the designated position on the graph as the marker position.

As the recording medium, a data carrier unit such as a flexible disk or a memory stick can be used as well as a read-only semiconductor memory chip (ROM chip).

The function generated when this computer-readable recording medium is read and executed by the computer is similar to the above-described function for marker processing of the video image information recording device and therefore will not be described further in detail.

A computer-readable recording medium according to the present invention has recorded thereon a program for causing a computer to function as browsing interface means Pg1' having an interface function and displaying, as a semantic graph, the recording position information of respective shots or scenes of the feature video image and the value obtained by sequentially integrating index values of the respective shots or scenes on the basis of meta information having the index values of the respective shots or scenes, cursor control means Pg9 for designating an arbitrary position on the graph, marker retrieval input means PgI9 for instructing retrieval of a marker, and marker insertion/retrieval means Pg13 for reading out the marker position from the meta information saved in the memory stick or the high-speed storage unit.

As the recording medium, a data carrier unit such as a flexible disk or a memory stick can be used as well as a read-only semiconductor memory chip (ROM chip).

The function generated when this computer-readable recording medium is read and executed by the computer is similar to the above-described function for marker retrieval of the video image information replaying device and therefore will not be described further in detail.

Thus, according to the present invention, as the marker function is provided, a scene noted by the user is stored with a marker inserted therein and can be used for later retrieval and replay.

Hereinafter, several other embodiments of the video image replaying device according to the present invention will be sequentially described. The video image replaying devices of the following embodiments are capable of replaying a feature video image produced by connecting a plurality of shots or scenes in a predetermined order. These video image replaying devices have the semantic browser means C1 of different structures but have the entire block structure similar to that described with reference to FIG. 1.

Thus, the following description is limited to the description of the structure and operation of each semantic browser means provided inside the devices.

Figure 11:
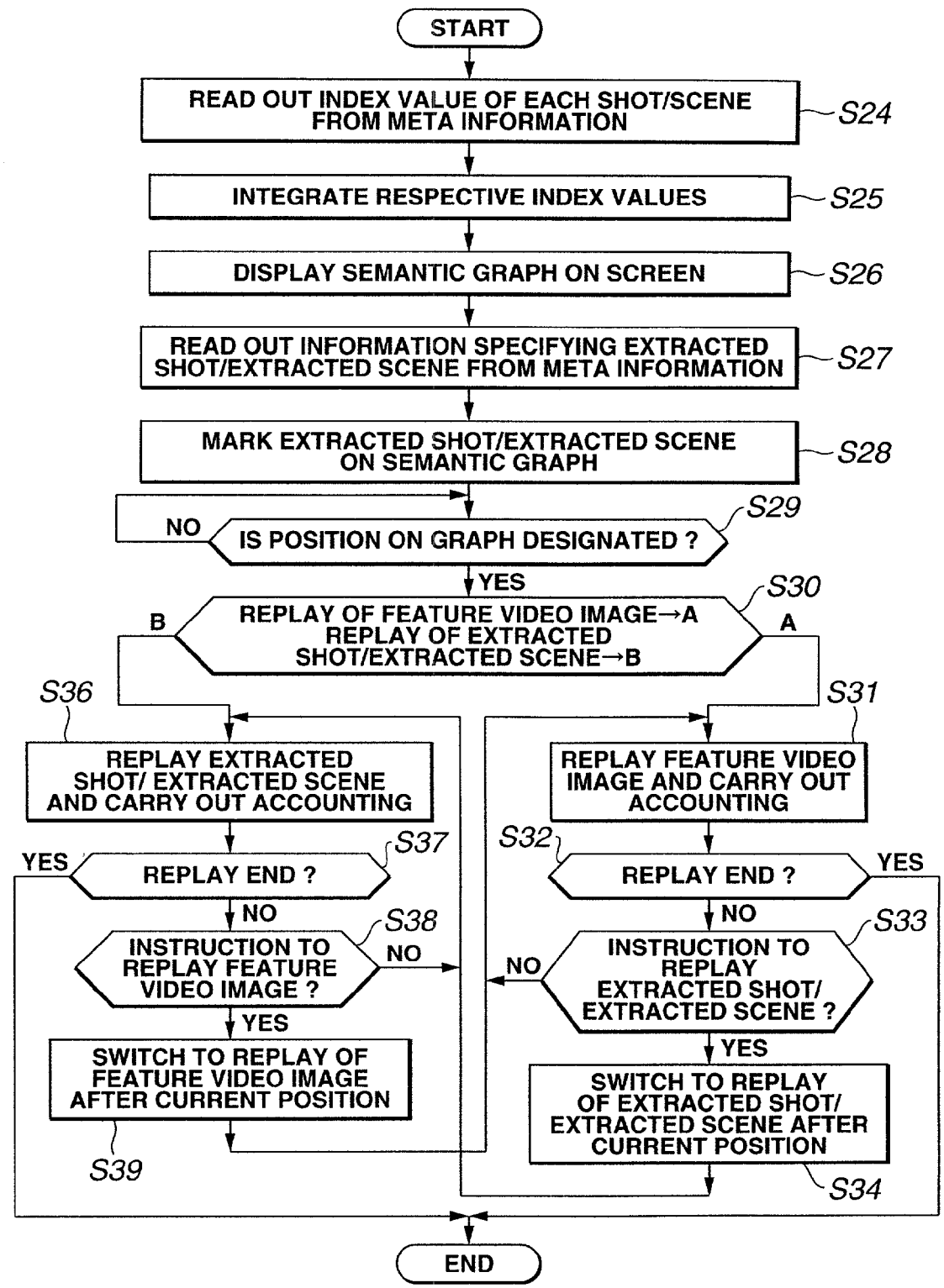
FIG. 11 is a flowchart showing the operation of another embodiment of the video image replaying device according to the present invention.

The semantic browser means of the video image replaying device as another embodiment of the present invention has the following structure and the flowchart of its operation is shown in FIG. 11.

This semantic browser means has at least browsing interface means Pg1, display screen organization means Pg2, feature video image replay control means Pg6, preview video image organization means Pg7, preview video image replay control means Pg8, cursor control means Pg9, preview/feature video image switch means Pg10, and accounting control means Pg11. The function and operation of each of these means will be described with reference to FIG. 11.

In the flowchart of FIG. 11, the browsing interface means Pg1 takes out the index values of respective shots or scenes from the meta information (step S24), then integrates the index values of the respective shots or scenes (step S25), and displays the integration value on the screen as a semantic graph of the video image title (step S26).

Then, information specifying each extracted shot or extracted scene is read out from the meta information (step S27), and a mark is put at the position on the semantic graph corresponding to the extracted scene or shot (step S28).

If the user shifts the cursor to a desired position on the semantic graph, the position on the semantic graph is designated by the cursor control means Pg9 (step S29).

Then, the browsing interface means Pg1 waits for either an input instructing the start of replay of the preview video image or an input instructing the start of replay of the feature video image from the user (step S30).

If the instruction for replay of the feature video image is inputted, the browsing interface means Pg1 sends a control instruction to the feature video image replay control means Pg6 and replay of the descrambled feature video image is started at the current position of the cursor. At the same time, the feature video image replay control means Pg6 sends a control instruction to the accounting control means Pg11. On the basis of this control instruction, the accounting control means Pg11 instructs the accounting section C18 to carry out accounting processing, thus carrying out either batched accounting or meter-rate accounting for this replay of the feature video image (step S31).

Then, replay of the feature video image is continued at step S31 while monitoring whether the feature video image has ended or not (step S32) and also monitoring whether a preview/feature video image switch instruction is inputted or not (step S33).

If the feature video image ends (step S32), the operation ends.

If the preview/feature video image switch instruction is inputted (step S33), the preview/feature video image switch means Pg10 determines that it is the instruction to replay the preview video image after the current position, and instructs the preview video image replay control means Pg8 to shift to step S36 (step S34). Thus, browsing from the feature video image to the preview video image is carried out.

On the other hand, if the preview replay start instruction is inputted at step S30, the preview video image organization means Pg7 sends the time code of the extracted shot nearest to the cursor position, which is read out from the meta information, to the preview video image replay control means Pg8. The preview video image replay control means Pg8 sends a control signal for instructing replay of the scene of the time code to the driving mechanism C13 and also sends an actuation signal to the descrambling section C14.

The signal which is read out and replayed by the driving mechanism C13 is descrambled by the descrambling section C14 and buffered by the pre-reading control means Pg12. The signal then is organized to a window size by the display screen organization means Pg2 and is displayed in the window of the screen of the display unit C15 via the browsing interface means Pg1 (step S36).

If the disclosure level of the preview video image is suitable for accounting, the preview video image organization means Pg7 inputs a preview accounting signal to the accounting control means Pg11. On the basis of this preview accounting signal, the accounting control means Pg11 instructs the accounting section C18 to carry out accounting processing (step S36).

Then, replay of the preview video image is continued at step S36 while monitoring whether the preview vide has ended or not (step S37) and also monitoring whether the preview/feature video image switch instruction i43 is inputted or not (step S38).

If the preview video image ends (step S37), the operation ends.

If the preview/feature video image switch instruction i43 is inputted (step S38), the preview/feature video image switch means Pg10 determines that it is the instruction for replay of the feature video image after the current position, and shifts to step S31 so as to input the current time code to the feature video image replay control means Pg6 (step S39). At the same time, the operation of the preview video image organization means Pg7 is stopped. After that, replay of the feature video image is continuously carried out.

Thus, browsing from the preview video image to the feature video image is carried out.

If the user inputs a cursor shift instruction in the above-described process, interrupt handling is carried out to enter step S29. The cursor control means Pg9 sends the time code of the shot corresponding to that position to the feature video image replay control means Pg6 in the case of replay of the feature video image, or sends the time code to the preview video image replay control means Pg8 in the case of replay of the preview video image.

Consequently, the semantic graph produced by sequentially integrating the index values of the respective shots or scenes can be displayed and the structure of the whole feature video image can be thus presented on the screen.

Moreover, by displaying a mark at the positions corresponding to the extracted shots or scenes on the graph with reference to the information specifying the extracted shots or scenes supplied as provided conditions from the meta information, the positional relation of the extracted shots or scenes in the whole feature video image can be clarified.

Also, if an arbitrary position on the semantic graph is designated by the user and replay of the feature video image is instructed, the scene or shot corresponding to that position is specified and replay of the feature video image from this recording position is carried out with reference to the time code of the specified scene or shot. If replay of the extracted shot or scene is instructed by the user during replay of the feature video image, the current replay is switched to replay of the extracted shot or scene after the recording position of the current replay.

On the other hand, if a mark indicating the extracted shot or scene on the semantic graph is designated by the user and replay of the extracted shot or scene is instructed, the extracted scene or shot corresponding to that position is specified and the extracted scene or shot is replayed from this recording position with reference to the recording position information of the specified extracted scene or shot. If replay of the feature video image is instructed by the user during replay of the extracted scene or shot, the current replay is switched to replay of the feature video image after the currently replayed recording position.

By alternately carrying out designation of an arbitrary position on the graph and instruction of replay of the feature video image, and designation of a mark indicating the extracted shot or scene and instruction of replay of the extracted shot or scene, browsing between the feature video image and the extracted video image can be performed. In addition, by repeating these designations and instructions, browsing is repeatedly carried out.

A computer-readable recording medium as another embodiment of the present invention has recorded thereon a program for causing a computer to function as the semantic browser means which operates in accordance with the flowchart of FIG. 11. As the recording medium, a data carrier unit such as a flexible disk or a memory stick can be used as well as a read-only semiconductor memory chip (ROM chip).

The function generated when this computer-readable recording medium is read and executed by the computer is similar to the above-described function of the semantic browser means and therefore will not be described further in detail.

Figure 12:
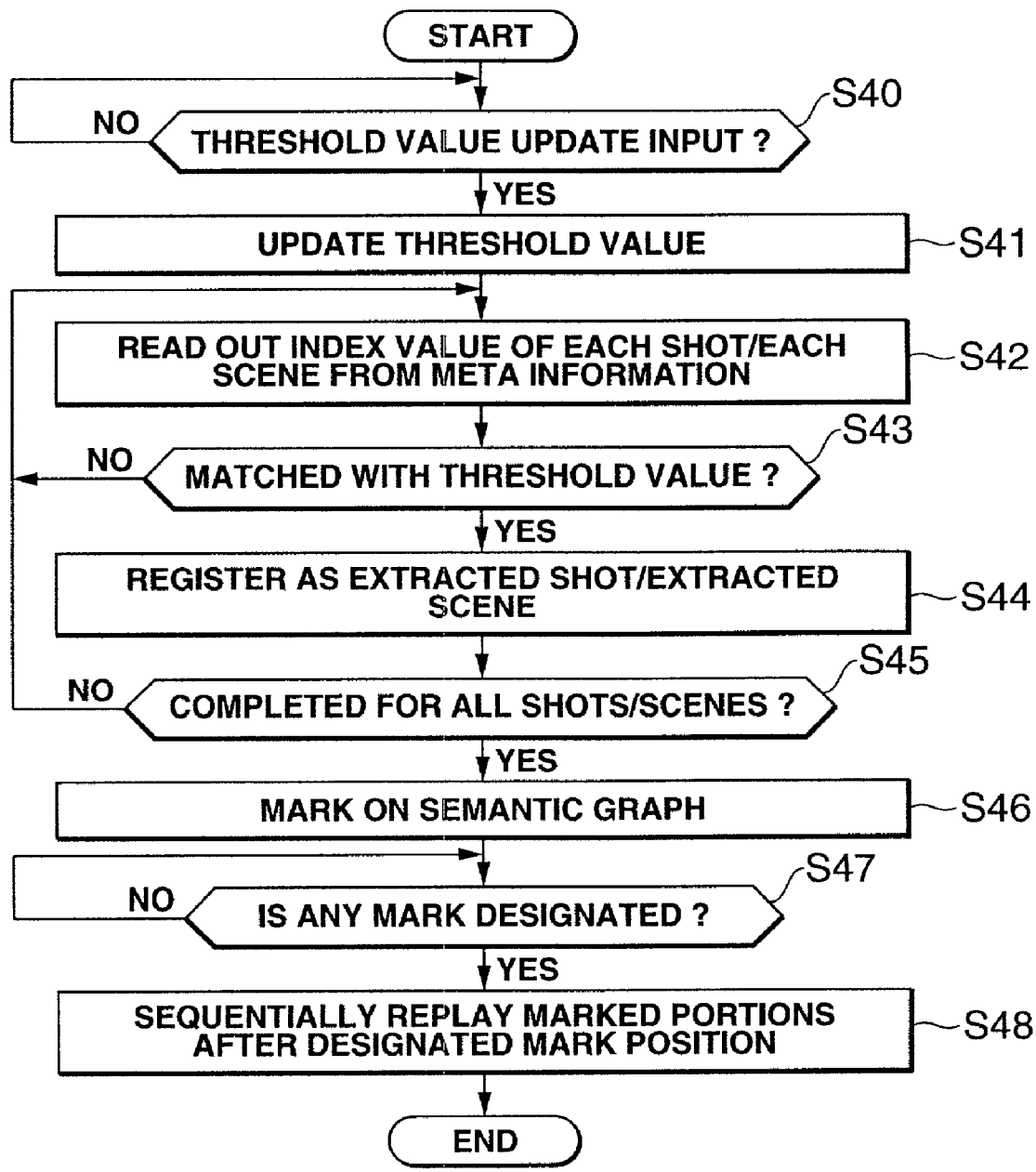
FIG. 12 is a flowchart showing the operation of another embodiment of the video image replaying device according to the present invention.

The semantic browser means of the video image replaying device as still another embodiment of the present invention has the following structure and the flowchart of its operation is shown in FIG. 12.

This semantic browser means has at least browsing interface means Pg1, display screen organization means Pg2, feature video image replay control means Pg6, preview video image organization means Pg7, preview video image replay control means Pg8, and cursor control means Pg9. The function and operation of each of these means will be described with reference to FIG. 12.

In the flowchart of FIG. 12, on receiving a "threshold value" update input i44 from the user (step S40) in the video image browsing viewing phase Ph4, the browsing interface means Pg1 updates the threshold value (step S41).

The timing for the user to make such a "threshold value" update input is preferably in the video image browsing viewing phase Ph4 where the semantic graph is displayed on the screen. This is because the semantic graph displayed on the screen enables the user to grasp the flow of the whole feature video image and then set an appropriate "threshold value". This is not limited to the present embodiment and also applies to the other embodiments.

Then, the preview video image organization means Pg7 reads out the index values of respective shots or scenes from the meta information including the time codes of the shots or scenes and the index value preset for each shot or each scene (step S42), then checks whether the index values are coincident with the threshold value (step S43), and registers the shot or scene of the index value coincident with the threshold value as the extracted shot or scene (step S44). This processing is executed for all the shots or scenes (step S45).

Meanwhile, the browsing interface means Pg1 integrates the index values of the respective shots or scenes taken out from the meta information and displays the integration value on the screen as a semantic graph of the video image title.

Then, a mark is put at the position on the semantic graph corresponding to each extracted scene or shot registered by the preview video image organization means Pg7 (step S46).

If the user shifts the cursor to a desired mark of the marks on the semantic graph, the position on the semantic graph is designated by the cursor control means Pg9 (step S47). In accordance with an instruction from the cursor control means Pg9, the feature video image replay control means Pg6 or the preview video image replay control means Pg8 sequentially replays the marked portions after the designated mark position (step S48).

Consequently, the semantic graph produced by sequentially integrating the index values of the respective shots or scenes can be displayed and the structure of the whole feature video image can be thus presented on the screen.

Moreover, by determining the shots or scenes to be extracted on the basis of the updated threshold value with reference to the index values of the extracted shots or scenes supplied as provided conditions from the meta information and then displaying a mark at the positions corresponding to the extracted shots or scenes on the graph, the positional relation of the extracted shots or scenes in the whole feature video image can be clarified.

If one of the marks on the graph is designated, the recording position of the extracted shot or scene corresponding to this mark can be specified on the basis of the time code, and the partial video image corresponding to the recording position in the feature video image can be sequentially replayed in a predetermined order.

Moreover, since the threshold value is changed in accordance with an instruction, it is possible for the user to set an arbitrary threshold value. Consequently, the user can adjust the total number of shots or scenes to be extracted, by setting a strict or moderate threshold value, and therefore can adjust the replay time of the extracted video image, A computer-readable recording medium as another embodiment of the present invention has recorded thereon a program for causing a computer to function as the semantic browser means which operates in accordance with the flowchart of FIG. 12. As the recording medium, a data carrier unit such as a flexible disk or a memory stick can be used as well as a read-only semiconductor memory chip (ROM chip).

The function generated when this computer-readable recording medium is read and executed by the computer is similar to the above-described function of the semantic browser means and therefore will not be described further in detail.

Figure 13:
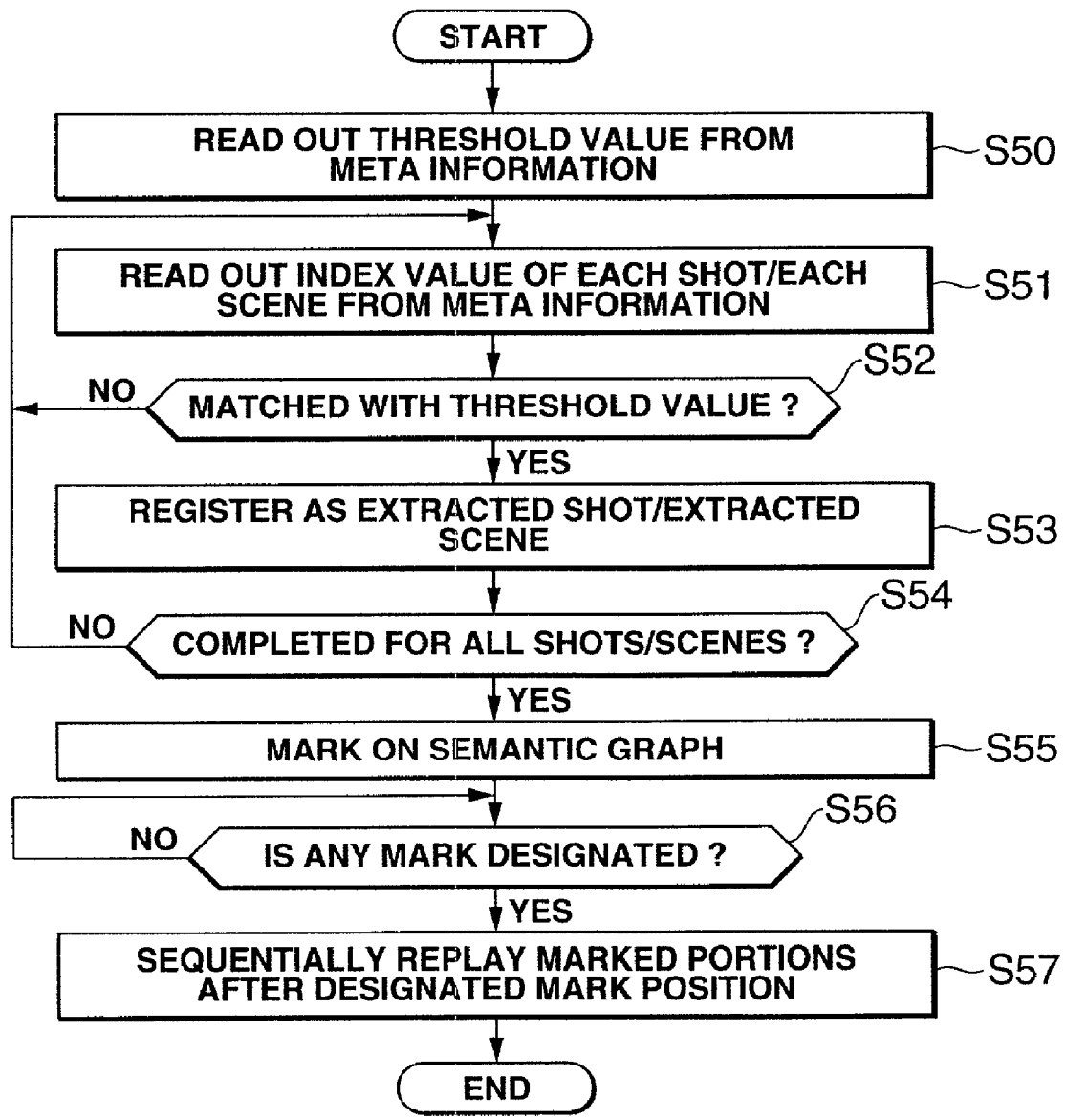
FIG. 13 is a flowchart showing the operation of still another embodiment of the video image replaying device according to the present invention.

The semantic browser means of the video image replaying device as still another embodiment of the present invention has the following structure and the flowchart of its operation is shown in FIG. 13.

This semantic browser means has at least browsing interface means Pg1, display screen organization means Pg2, feature video image replay control means Pg6, preview video image organization means Pg7, preview video image replay control means Pg8, and cursor control means Pg9. The function and operation of each of these means will be described with reference to FIG. 13.

In the flowchart of FIG. 13, the preview video image organization means Pg7 reads out the threshold value from the meta information (step S50), then reads out the index values of respective shots or scenes (step S51), then extracts only the shot or scene of the index value coincident with the threshold value from among the respective shots or scenes (step S52), and registers the extracted shot or scene (step S53). This processing is executed for all the shots or scenes (step S54).

Meanwhile, the browsing interface means Pg1 integrates the index values of the respective shots or scenes taken out from the meta information and displays the integration value on the screen as a semantic graph of the video image title.

Then, a mark is put at the position on the semantic graph corresponding to each extracted scene or shot registered by the preview video image organization means Pg7 (step S55).

If the user shifts the cursor to a desired mark of the marks on the semantic graph, the position on the semantic graph is designated by the cursor control means Pg9 (step S56). In accordance with an instruction from the cursor control means Pg9, the feature video image replay control means Pg6 or the preview video image replay control means Pg8 sequentially replays the marked portions after the designated mark position (step S57).

Consequently, the semantic graph produced by sequentially integrating the index values of the respective shots or scenes can be displayed and the structure of the whole feature video image can be thus presented on the screen. Moreover, by determining the shots or scenes to be extracted on the basis of the updated threshold value with reference to the index values of the extracted shots or scenes supplied as provided conditions from the meta information and then displaying a mark at the positions corresponding to the extracted shots or scenes on the graph, the positional relation of the extracted shots or scenes in the whole feature video image can be clarified.

If one of the marks on the graph is designated, the recording position of the extracted shot or scene corresponding to this mark can be specified on the basis of the time code, and the partial video image corresponding to the recording position in the feature video image can be sequentially replayed in a predetermined order.

A computer-readable recording medium as another embodiment of the present invention has recorded thereon a program for causing a computer to function as the semantic browser means which operates in accordance with the flowchart of FIG. 13. As the recording medium, a data carrier unit such as a flexible disk or a memory stick can be used as well as a read-only semiconductor memory chip (ROM chip).

The function generated when this computer-readable recording medium is read and executed by the computer is similar to the above-described function of the semantic browser means and therefore will not be described further in detail.

Figure 14:
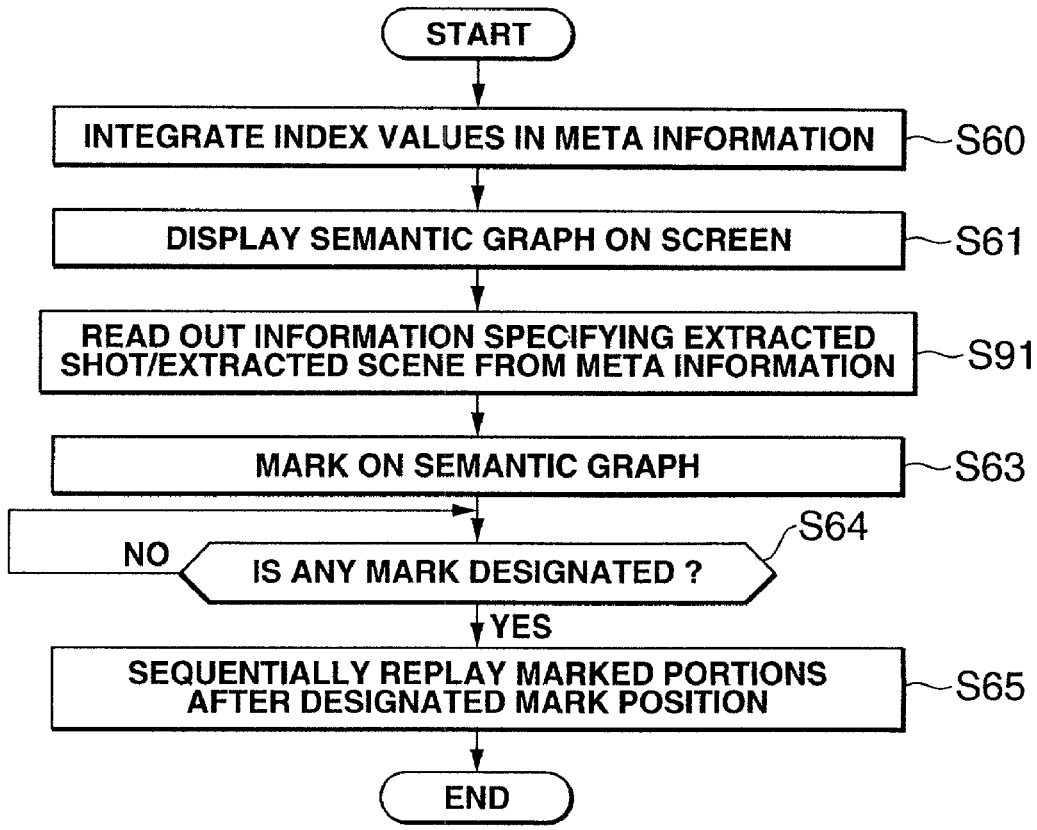
FIG. 14 is a flowchart showing the operation of still another embodiment of the video image replaying device according to the present invention.

The semantic browser means of the video image replaying device as still another embodiment of the present invention has the following structure and the flowchart of its operation is shown in FIG. 14.

This semantic browser means has at least browsing interface means Pg1, display screen organization means Pg2, feature video image replay control means Pg6, preview video image organization means Pg7, preview video image replay control means Pg8, and cursor control means Pg9. The function and operation of each of these means will be described with reference to FIG. 14.

In the flowchart of FIG. 14, the browsing interface means Pg1 integrates the index values of respective shots or scenes taken out from the meta information (step S60) and displays the integration value on the screen as a semantic graph of the video image title (step S61).

In this case, the browsing interface means Pg1 reads out information specifying extracted shots or scenes from the meta information (step S62). Then, a mark is put at the position on the semantic graph corresponding to each extracted scene or shot registered by the preview video image organization means Pg7 (step S63).

If the user shifts the cursor to a desired mark of the marks on the semantic graph, the position on the semantic graph is designated by the cursor control means Pg9 (step S64). In accordance with an instruction from the cursor control means Pg9, the feature video image replay control means Pg6 or the preview video image replay control means Pg8 sequentially replays the marked portions after the designated mark position (step S65).

Consequently, the semantic graph produced by sequentially integrating the index values of the respective shots or scenes can be displayed and the structure of the whole feature video image can be thus presented on the screen.

Moreover, by determining the shots or scenes to be extracted on the basis of the designated threshold value with reference to the information specifying the extracted shots or scenes supplied as provided conditions from the meta information and then displaying a mark at the positions corresponding to the extracted shots or scenes on the semantic graph, the positional relation of the extracted shots or scenes in the whole feature video image can be clarified.

If one of the marks on the semantic graph is designated, the recording position of the extracted shot or scene corresponding to this mark can be specified on the basis of the time code, and the partial video image corresponding to the recording position in the feature video image can be sequentially replayed in a predetermined order.

As a result, by displaying a mark at the positions corresponding to the extracted shots or scenes on the graph with reference to the information specifying the extracted shots or scenes supplied as provided conditions from the meta information, the positional relation of the extracted shots or scenes in the whole feature video image can be clarified.

If one of the marks on the graph is designated, the recording position of the extracted shot or scene corresponding to this mark can be specified on the basis of the time code, and the partial video image corresponding to the recording position in the feature video image can be sequentially replayed in a predetermined order.

A computer-readable recording medium as another embodiment of the present invention has recorded thereon a program for causing a computer to function as the semantic browser means which operates in accordance with the flowchart of FIG. 14. As the recording medium, a data carrier unit such as a flexible disk or a memory stick can be used as well as a read-only semiconductor memory chip (ROM chip).

The function generated when this computer-readable recording medium is read and executed by the computer is similar to the above-described function of the semantic browser means and therefore will not be described further in detail.

Figure 15:
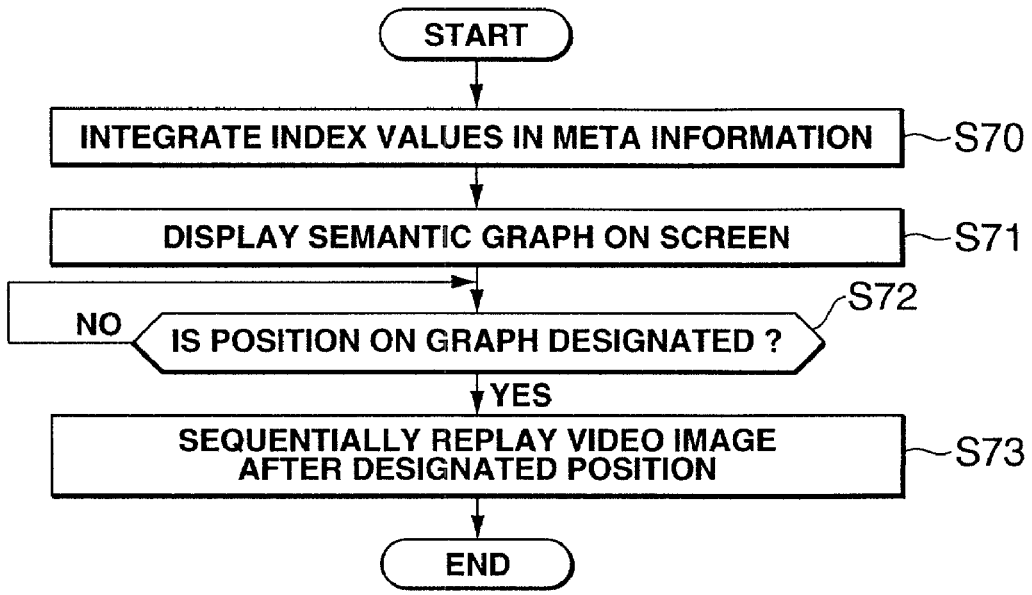
FIG. 15 is a flowchart showing the operation of still another embodiment of the video image replaying device according to the present invention.

The semantic browser means of the video image replaying device as still another embodiment of the present invention has the following structure and the flowchart of its operation is shown in FIG. 15.

This semantic browser means has at least browsing interface means Pg1, display screen organization means Pg2, feature video image replay control means Pg6, preview video image organization means Pg7, preview video image replay control means Pg8, and cursor control means Pg9. The function and operation of each of these means will be described with reference to FIG. 15.

In the flowchart of FIG. 15, the browsing interface means Pg1 integrates the index values of respective shots or scenes taken out from the meta information (step S70) and displays the integration value on the screen as a semantic graph of the video image title (step S71).

If the user shifts the cursor to a desired position on the semantic graph, the position on the semantic graph is designated by the cursor control means Pg9 (step S72). In accordance with an instruction from the cursor control means Pg9, the feature video image replay control means Pg6 or the preview video image replay control means Pg8 sequentially replays the video image after the designated position (step S73).

Consequently, the semantic graph produced by sequentially integrating the index values of the respective shots or scenes can be displayed and the structure of the whole feature video image can be thus presented on the screen.

Moreover, if a certain position on the semantic graph is designated, the recording position of the video image portion corresponding to this position can be specified on the basis of the time code, and the feature video image or the preview video image can be sequentially replayed from the portion corresponding to the recording position.

A computer-readable recording medium as another embodiment of the present invention has recorded thereon a program for causing a computer to function as the semantic browser means which operates in accordance with the flowchart of FIG. 15. As the recording medium, a data carrier unit such as a flexible disk or a memory stick can be used as well as a read-only semiconductor memory chip (ROM chip).

The function generated when this computer-readable recording medium is read and executed by the computer is similar to the above-described function of the semantic browser means and therefore will not be described further in detail.

Figure 16:
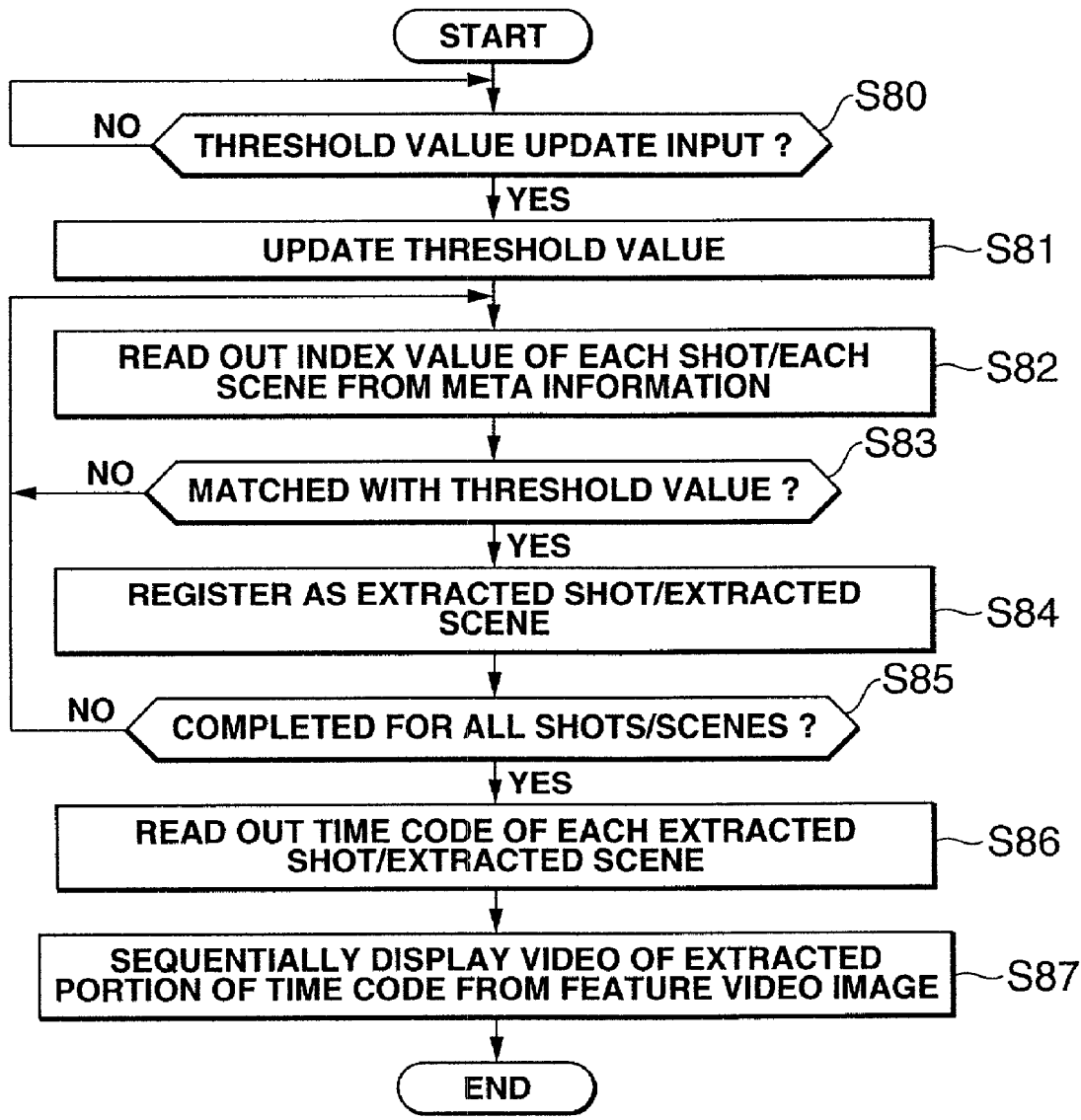
FIG. 16 is a flowchart showing the operation of still another embodiment of the video image replaying device according to the present invention.

The semantic browser means of the video image replaying device as still another embodiment of the present invention has the following structure and the flowchart of its operation is shown in FIG. 16.

This semantic browser means has at least browsing interface means Pg1, display screen organization means Pg2, feature video image replay control means Pg6, preview video image organization means Pg7, and preview video image replay control means Pg8. The function and operation of each of these means will be described with reference to FIG. 16.

In the flowchart of FIG. 16, on receiving a threshold value update input from the user (step S80), the browsing interface means Pg1 updates the threshold value (step S81).

Then, the preview video image organization means Pg7 reads out the index values of respective shots or scenes from the meta information including the time codes of the shots or scenes and the index value preset for each shot or each scene (step S82), then checks whether the index values are coincident with the threshold value (step S83), and registers the shot or scene of the index value coincident with the threshold value as the extracted shot or scene (step S84). This processing is executed for all the shots or scenes (step S85).

Then, the preview video image organization means Pg7 reads out the time code of the registered extracted shot or scene (step S86), and the preview video image replay control means Pg8 sequentially replays and displays the video image of the extracted portion corresponding to the time code from the feature video image in a predetermined order (step S87).

Consequently, the shots or scenes to be extracted can be determined on the basis of the inputted updated threshold value with reference to the index values of the extracted shots or scenes supplied as provided conditions from the meta information, and the extracted video image can be sequentially replayed by specifying the time code of the extracted shots or scenes.

A computer-readable recording medium as another embodiment of the present invention has recorded thereon a program for causing a computer to function as the semantic browser means which operates in accordance with the flowchart of FIG. 16. As the recording medium, a data carrier unit such as a flexible disk or a memory stick can be used as well as a read-only semiconductor memory chip (ROM chip).

The function generated when this computer-readable recording medium is read and executed by the computer is similar to the above-described function of the semantic browser means and therefore will not be described further in detail.

Figure 17:
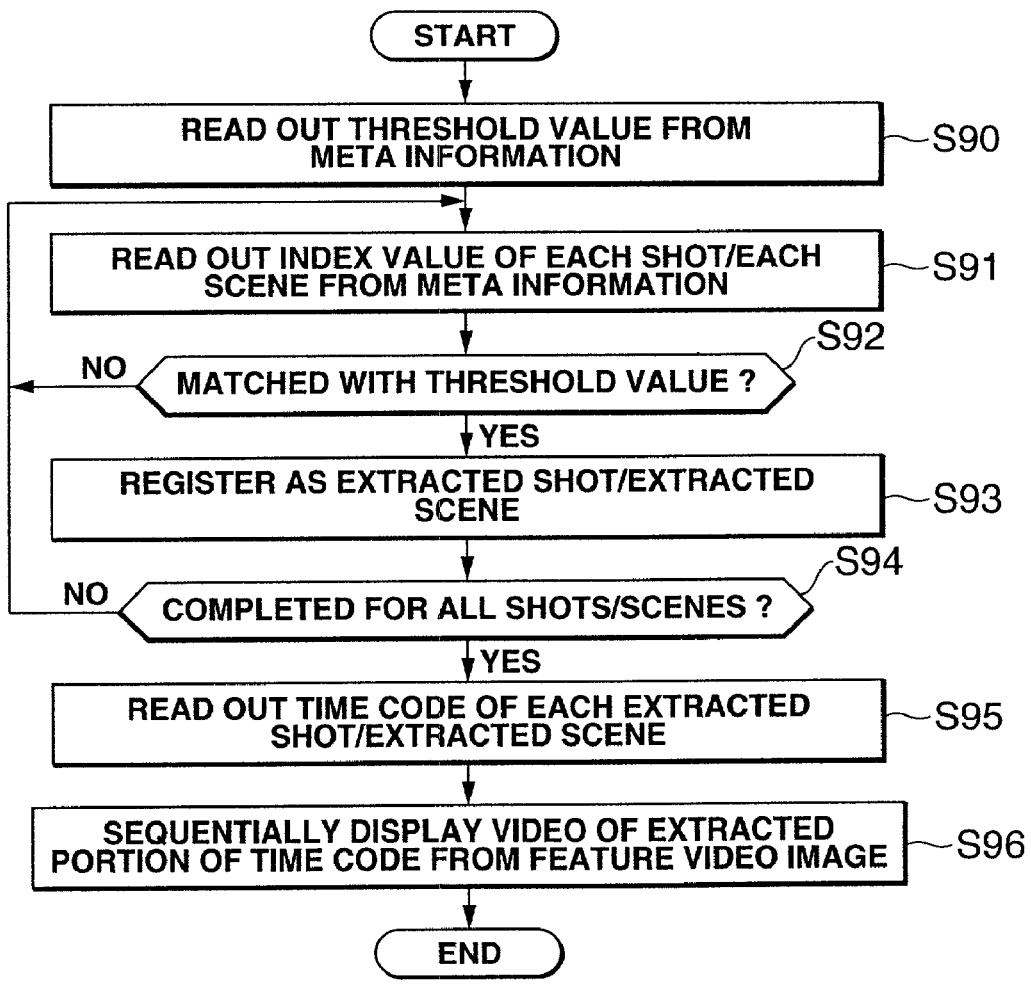
FIG. 17 is a flowchart showing the operation of still another embodiment of the video image replaying device according to the present invention.

The semantic browser means of the video image replaying device as still another embodiment of the present invention has the following structure and the flowchart of its operation is shown in FIG. 17.

This semantic browser means has at least browsing interface means Pg1, display screen organization means Pg2, feature video image replay control means Pg6, preview video image organization means Pg7, and preview video image replay control means Pg8. The function and operation of each of these means will be described with reference to FIG. 17.

In the flowchart of FIG. 17, the preview video image organization means Pg7 reads out the threshold value from the meta information including the threshold value, the time codes of shots or scenes and the index values preset for respective shots or scenes (step S90), then reads out the index values of respective shots or scenes (step S91), then checks whether the index values are coincident with the threshold value (step S92), and registers the shot or scene of the index value coincident with the threshold value as the extracted shot or scene (step S93). This processing is executed for all the shots or scenes (step S94).

Then, the preview video image organization means Pg7 reads out the time code of the registered extracted shot or scene (step S95), and the preview video image replay control means Pg8 sequentially replays and displays the video image of the extracted portion corresponding to the time code from the feature video image in a predetermined order (step S96).

Consequently, the shots or scenes to be extracted can be determined on the basis of the designated threshold value with reference to the index values of the extracted shots or scenes supplied as provided conditions from the meta information, and the extracted video image can be sequentially replayed by specifying the time code of the extracted shots or scenes.

A computer-readable recording medium as another embodiment of the present invention has recorded thereon a program for causing a computer to function as the semantic browser means which operates in accordance with the flowchart of FIG. 17. As the recording medium, a data carrier unit such as a flexible disk or a memory stick can be used as well as a read-only semiconductor memory chip (ROM chip).

The function generated when this computer-readable recording medium is read and executed by the computer is similar to the above-described function of the semantic browser means and therefore will not be described further in detail.

Figure 18:
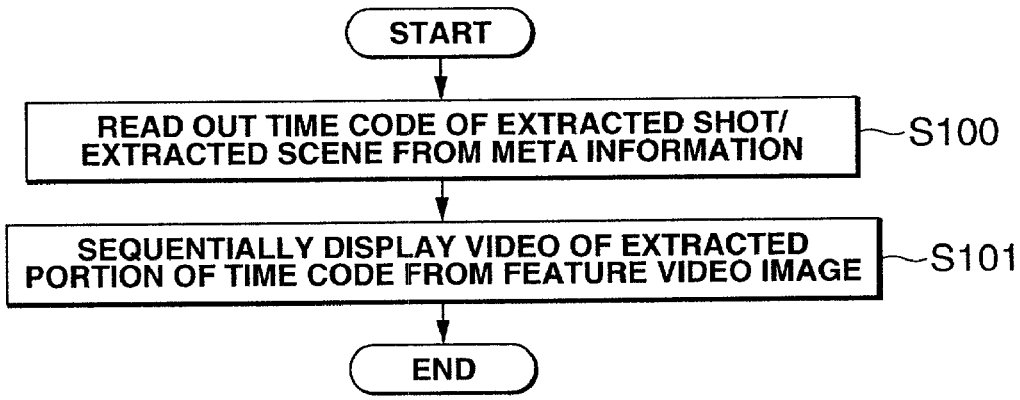
FIG. 18 is a flowchart showing the operation of still another embodiment of the video image replaying device according to the present invention.

The semantic browser means of the video image replaying device as still another embodiment of the present invention has the following structure and the flowchart of its operation is shown in FIG. 18.

This semantic browser means has at least browsing interface means Pg1, display screen organization means Pg2, feature video image replay control means Pg6, preview video image organization means Pg7, and preview video image replay control means Pg8. The function and operation of each of these means will be described with reference to FIG. 18.

In the flowchart of FIG. 18, the preview video image organization means Pg7 reads out the time code of an extracted shot or scene from the meta information including the time codes of shots or scenes and the information specifying the extracted shot or scene (step S100). The preview video image replay control means Pg8 sequentially replays the video image of the extracted portion corresponding to the time code from the feature video image in a predetermined order (step S101).

Consequently, the extracted shot or scene to be replayed can be determined with reference to the information specifying the extracted shot or scene supplied as a provided condition from the meta information, and the extracted video image can be sequentially replayed by specifying the time code of the extracted shot or scene.

A computer-readable recording medium as another embodiment of the present invention has recorded thereon a program for causing a computer to function as the semantic browser means which operates in accordance with the flowchart of FIG. 18. As the recording medium, a data carrier unit such as a flexible disk or a memory stick can be used as well as a read-only semiconductor memory chip (ROM chip).

The function generated when this computer-readable recording medium is read and executed by the computer is similar to the above-described function of the semantic browser means and therefore will not be described further in detail.

Meanwhile, though the driving mechanism C13 is shown as a built-in equipment in FIG. 1, it is not limited to such built-in equipment and can also be connected to a separate home server as an external unit having a mass storage medium and applied as a home-use equipment. Moreover, not only to such home server, the driving mechanism can also be connected to a professional-use server equipment at a remote location through a network such as a public telephone line.

The method for obtaining a feature video image and meta information related thereto is exemplified as follows.

1. To simultaneously or separately obtain a feature video image file and accompanying meta information by receiving from digital broadcast.

2. To obtain meta information by down-loading from a network such as the Internet.

3. To obtain a feature video image and accompanying meta information at a time through a package medium system.

4. To obtain a feature video image through a broadcasting system or a package medium system, and separately obtain meta information from a data carrier memory unit (e.g., a memory stick, memory card, or memory tag) or through a package medium system.

In the case of receiving meta information through the broadcasting system, the meta information to be received and obtained is temporarily recorded into a high-speed storage unit or the like, and by using this recorded meta information, a predetermined portion is extracted from a feature video image file recorded on a mass storage medium or a package medium such as DVD, thus obtaining a preview video image.

It is appropriate to receive both the feature video image and the accompanying meta information through the broadcasting system, then extract the preview video image from the feature video image in real time, and record the extracted video image without displaying on the screen. However, it is not appropriate to receive the feature video image, extract the preview video image in real time, and display the extracted video image on the screen. This is because the displaying of the extracted video image on the screen is not suitable for the preparation of preview video images of various modes in real time extraction. Since the extraction depends on the temporal flow of the feature video image, there is no concept of search and an idle time frequently occurs in the display of the preview video image on the screen. Also, it is not preferably as the preview video image and the idle time require the same time period as the video image time of the feature video image.

Therefore, in the case of simultaneously receiving both the feature video image and the meta information through the broadcasting system, it is preferred to temporarily record the feature video image and the meta information to recording means and separately organize and replay the preview video image using the feature video image and the meta information.

As is described above in detail, the video image replaying device or method according to the present invention is for supplying the index values of respective shots or scenes as meta information. Therefore, the structure of the whole feature video image can be shown by displaying on the screen a graph produced by sequentially integrating the index values of the respective shots or scenes.

If the video image replaying device or method according to the present invention displays marks at positions corresponding to extracted shots or scenes on the graph produced by sequentially integrating the index values of the respective shots or scenes with reference to information specifying the extracted shots or scenes supplied as provided conditions from the meta information, the positional relation of the extracted shots or scene in the whole feature video image can be clarified by the marks.

If the video image replaying device or method according to the present invention specifies extracted shots or scenes to be replayed in replaying the extracted video image with reference to information specifying the extracted shots or scenes supplied as provided conditions from the meta information, the recording positions of the extracted shots or scenes can be specified on the basis of the recording position information supplied as a provided condition from the meta information, and the respective extracted video images corresponding to the recording positions in the feature video image can be sequentially replayed in a predetermined order.

Particularly, when one of the marks provided for the extracted shots or scenes on the graph is designated by the user, the recording position of the extracted shot or scene corresponding to this mark can be specified on the basis of the recording position information supplied as a provided condition from the meta information, and the respective partial video images corresponding to the recording position in the feature video image can be sequentially replayed in a predetermined order.

If the video image replaying device or method according to the present invention designates an arbitrary position on the graph produced by sequentially integrating the index values of the respective shots or scenes in replaying the feature video image, the video image after the corresponding recording position of the feature video image can be sequentially replayed on the basis of the recording position information supplied as a provided condition from the meta information with reference to the recording position information of the shot or scene corresponding to the designated position on the graph.

If the video image replaying device or method according to the present invention displays marks indicating the extracted shots or scenes on the graph, and designation of an arbitrary position on the graph and instruction of replay of the feature video image are carried out by the user, the feature video image after that position is replayed. If designation of one of the marks and instruction of replay the extracted shot or scene are carried out by the user during replay of the feature video image, replay of the feature video image is switched to replay of the extracted shot or scene after the current position. If designation of the mark indicating the extracted shot or scene on the graph and instruction of replay thereof are carried out by the user, the extracted shot or scene after that position is replayed. If replay of the feature video image is instructed by the user during the replay of the extracted shot or scene, the replay is switched to replay of the feature video image after the current position.

With the above-described structure, if the user designates an arbitrary position on the graph and instructs replay of the feature video image, the shot or scene corresponding to that position is specified and the feature video image from the recording position is replayed with reference to the recording position information of the specified scene or shot. If the user instructs replay of the extracted shot or scene during replay of the feature video image, replay of the feature video image can be switched to replay of the extracted shot or scenes after the currently replayed recording position. Thus, effective browsing between the feature video image and the extracted video image can be carried out.

On the other hand, if the user designates a mark indicating the extracted shot or scene on the graph and instructs replay of the extracted shot or scene, the extracted shot or scene corresponding to that position is specified and the extracted shot or scene from the recording position is replayed with reference to the recording position information of the specified extracted scene or shot. Moreover, if the user instructs replay of the feature video image during replay of the extracted shot or scene, replay of the extracted shot or scene can be switched to replay of the feature video image after the currently replayed recording position. Thus, effective browsing between the feature video image and the extracted video image can be carried out.

If the video image replaying device or method according to the present invention determines shots or scenes having index values reaching the threshold value as extracted shots or scenes on the basis of the designated threshold value with reference to the index values of the respective shots or scenes supplied as provided conditions from the meta information, the type or total number of shots or scenes to be extracted can be adjusted by setting a strict or moderate threshold value.

Alternatively, if the video image replaying device or method changes the threshold value in accordance with an instruction from the user, the user can set an arbitrary threshold value. As a result, the type or total number of shots or scenes to be extracted can be adjusted by arbitrarily setting a strict or moderate threshold value. Therefore, the type or replay of the extracted video image can be adjusted in a desired manner.

If the video image information recording device or method according to the present invention displays on the screen a graph showing the value produced by sequentially integrating the index values of respective shots or scenes supplied as provided conditions from the meta information, and an arbitrary position on the graph is designated by the user as the position for inserting a marker, at least the recording position information corresponding to the designated position on the screen is additionally recorded as the marker position to the meta information. Therefore, a marker can be inserted into an arbitrary video image. Since this marker position is additionally recorded to the meta information and thus saved, it can be read out at arbitrary timing.

The video image replaying device or method according to the present invention is for retrieving the meta information, reading out the recording position information as the recorded marker position, and replaying the video image from the recording position. Therefore, after the marker inserted at an arbitrary position is detected, the video image can be replayed and displayed from that portion.

Also, the video image replaying device or method according to the present invention is for carrying out batched accounting or meter-rate accounting with respect to the feature video image or the extracted video image. Therefore, failure to carry out accounting can be eliminated and rational accounting is made possible.

As is clear from the above description, according to the present invention, it is possible to shift to a desired portion and watch the desired video image while confirming the transition of the whole video image on the graph in replaying the video image, and to freely carry out browsing between the feature video image and the extracted video image.

Consequently, not only the function convenient for determination of purchase or selection of a video image title can be provided, but also the browsing function convenient for viewing the selected and purchased video image title can be provided.

In addition, since various types of accounting can be carried out with respect to the feature video image and the extracted video image, an outstanding effect can be realized such that highly reliable accounting processing convenient both for the video image title supply side and for the user side is made possible.

The invention claimed is:

1. A screen control method applied to a continuous video image display phase for displaying on a screen a feature video image consisting of continuous video images and an extracted video image display phase for sequentially displaying on the screen a plurality of sets of extracted video images obtained by extracting predetermined parts of the feature video image, the method comprising the steps of:
  displaying a first screen having at least a first video image display area, a first video image transition display area and a first switch input area, in the extracted video image display phase;
  displaying one of the plurality of sets of extracted video images replayed on the basis of a current video image recording position, in the first video image display area;
  displaying, in the first video image transition display area, a video image transition graph showing the transition of the video image recording position of the feature video image, a mark superimposed on the graph at the video image recording position corresponding to each of the extracted video images, and a cursor which constantly updates with the lapse of time of the current video image recording position in the extracted video image currently displayed in the first video image display area and which enables shift of the current video image recording position to an arbitrary video image recording position in an arbitrary one of the extracted video images, and
  wherein the video image transition graph is a function of a semantic evaluation;
  displaying in the first switch input area a first button which enables input of an instruction to shift from the first screen to a second screen displayed in the continuous video image display phase while cutting out and holding the current video image recording position;
  displaying a second screen having at least a second video image display area, a second video image transition display area and a second switch input area, in the continuous video image display phase;

displaying the feature video image replayed on the basis of the current video image recording position, in the second video image display area;

displaying, in the second video image transition display area, a second video image transition graph showing the transition of the video image recording position of the feature video image, and a cursor which constantly updates with the lapse of time the current video image recording position in the feature video image currently displayed in the second video image display area and which enables shift of the current video image recording position to an arbitrary video image recording position in the feature video image, and wherein the second video image transition graph is a function of a semantic evaluation;

displaying in the second switch input area a second button which enables input of an instruction to shift from the second screen to the first screen displayed in the extracted video image display phase while cutting out and holding the current video image recording position; and shifting between the extracted video image display phase and the continuous video image display phase on the basis of each of the instructions inputted during the display of the first button or the second button, so as to display either the first screen or the second screen.

2. A screen control device adapted for displaying a second screen in a continuous video image display phase for displaying a feature video image consisting of continuous video images as the second screen, and for displaying a first screen in an extracted video image display phase for sequentially displaying a plurality of sets of extracted video images obtained by extracting predetermined parts of the feature video image as the first screen, the device comprising:

means for displaying at least a first video image display area, a first video image transition display area and a first switch input area in the first screen;

means for displaying one of the plurality of sets of extracted video images replayed on the basis of a current video image recording position, in the first video image display area;

means for displaying, in the first video image transition display area, a video image transition graph showing the transition of the video image recording position of the feature video image and a mark superimposed on the graph at the video image recording position corresponding to each of the extracted video images;

means for displaying a cursor which constantly updates with the lapse of time of the current video image recording position in the extracted video image currently displayed in the first video image display area, wherein the cursor is superimposed on the video image transition graph and is enabled to shift the current video image recording position to an arbitrary video image recording position in an arbitrary one of the extracted video images, and wherein the video image transition graph is a function of a semantic evaluation;

means for displaying in the first switch input area a first button which enables input of an instruction to shift from the first screen to the second screen displayed in the continuous video image display phase while cutting out and holding the current video image recording position at the timing of the instruction;

means for arranging at least a second video image display area, a second video image transition display area and a second switch input area in the second screen;

means for displaying the feature video image replayed on the basis of the current video image recording position, in the second video image display area;

means for displaying, in the second video image transition display area, a second video image transition graph showing the transition of the video image recording position of the feature video image;

means for displaying a cursor which constantly updates with the lapse of time of the current video image recording position in the feature video image currently displayed in the second video image display area, wherein the cursor is superimposed on the second video image transition graph and is enabled to shift the current video image recording position to an arbitrary video image recording position in the feature video image, and wherein the second video image transition graph is a function of a semantic evaluation;

means for displaying in the second switch input area a second button which enables input of an instruction to shift from the second screen to the first screen displayed in the extracted video image display phase while cutting out and holding the current video image recording position at the timing of the instruction; and means for shifting between the extracted video image display phase and the continuous video image display phase on the basis of each of the instructions inputted during the display of the first button or the second button, so as to display either the first screen or the second screen.

* * * * *